United States Patent
Tatsukami et al.

(10) Patent No.: US 8,553,410 B2
(45) Date of Patent: Oct. 8, 2013

(54) ELECTRONIC APPARATUS

(75) Inventors: Ikki Tatsukami, Kawasaki (JP); Tadanori Tachikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/137,738

(22) Filed: Sep. 8, 2011

(65) Prior Publication Data
US 2012/0002363 A1    Jan. 5, 2012

Related U.S. Application Data

(63) Continuation of application No. PCT/JP2009/057533, filed on Apr. 14, 2009.

(51) Int. Cl.
*G06F 1/20* (2006.01)

(52) U.S. Cl.
USPC ............ 361/679.47; 361/679.49; 361/679.5; 361/695

(58) Field of Classification Search
None
See application file for complete search history.

(56) References Cited

U.S. PATENT DOCUMENTS

| | | | |
|---|---|---|---|
| 5,583,316 A * | 12/1996 | Kitahara et al. | 174/16.3 |
| 6,293,331 B1 * | 9/2001 | Wang | 165/80.3 |
| 6,567,269 B2 * | 5/2003 | Homer et al. | 361/700 |
| 7,057,897 B2 * | 6/2006 | Leu | 361/704 |
| 7,283,364 B2 * | 10/2007 | Refai-Ahmed et al. | 361/719 |
| 7,515,425 B2 | 4/2009 | Chikazawa et al. | |
| 7,995,343 B2 * | 8/2011 | Suzuki et al. | 361/699 |
| 2003/0002254 A1 * | 1/2003 | Faneuf et al. | 361/687 |
| 2005/0036287 A2 * | 2/2005 | Kosugi | 361/695 |
| 2008/0045057 A1 * | 2/2008 | Mizunaga et al. | 439/137 |
| 2008/0094802 A1 * | 4/2008 | Kumagai et al. | 361/709 |
| 2009/0041289 A1 * | 2/2009 | Watanabe et al. | 381/388 |
| 2009/0073655 A1 * | 3/2009 | Takakusaki et al. | 361/696 |
| 2010/0149750 A1 * | 6/2010 | Tomioka et al. | 361/679.47 |
| 2010/0182742 A1 * | 7/2010 | Mihara et al. | 361/679.09 |

FOREIGN PATENT DOCUMENTS

| | | |
|---|---|---|
| JP | 7-30025 | 1/1995 |
| JP | 2000-188493 | 7/2000 |
| JP | 2004-31610 | 1/2004 |
| JP | 2004-235258 | 8/2004 |
| KR | 10-2008-0030449 | 4/2008 |

OTHER PUBLICATIONS

International Search Report for PCT/JP2009/057533, mailed May 19, 2009.
Korean Patent Office Action issued in Korean Patent Application No. 10-2011-7022992 dated Apr. 29, 2013.

* cited by examiner

*Primary Examiner* — Adrian S Wilson
*Assistant Examiner* — Abhishek Rathod
(74) *Attorney, Agent, or Firm* — Staas & Halsey LLP

(57) ABSTRACT

An electronic apparatus includes a heat dissipating module mounted at a position interposed between a shield plate and a main circuit board and air sent from a fan through a heat dissipating fin is discharged from an air vent, wherein the heat dissipating module includes the heat dissipating fin in contact with the heat generating electronic component; the fan sending the air; and a base body supporting the fan and the heat dissipating fin at a position closer to a side of the shield plate than a position of the fan, and having a slope between the fan and the heat dissipating fin for guiding the air sent from the fan to the heat dissipating fin, wherein the shield plate includes a cut and raised piece which faces the slope and obliquely guides the air sent from the fan to the heat dissipating fin along the slope.

4 Claims, 56 Drawing Sheets

ELECTRONIC APPARATUS

CROSS-REFERENCE TO RELATED APPLICATIONS

This application is a U.S. continuation application filed under 35 USC 111a and 365c of PCT application PCT/JP2009/057533, filed on Apr. 14, 2009. The foregoing application is hereby incorporated herein by reference.

FIELD

The embodiments discussed herein relates to an electronic apparatus having a heat generating electronic component and a mechanism for air-cooling the heat generating electronic component mounted.

BACKGROUND

In an example notebook type personal computer (hereinafter, referred to as a notebook PC), a heat generating electronic component such as a CPU chip is mounted on a circuit board. Further, an air-cooling mechanism for forcedly air-cooling the heat generating electronic component including a heat dissipating fin, a fan and an air-cooling mechanism. The heat dissipating fin is in close contact with the heat generating electronic component to absorb or transfer heat from the heat generating electronic component, dissipates the heat to the air with an air blow generated by the fan, and exhausts the air by the heat dissipating fin from an air vent provided in a casing to the outside. It is preferable that the heat dissipating fin is in close contact with the heat generating electronic component on the circuit board. Meanwhile, the fan has an air intake and blows air taken in from the air intake to the heat dissipating fin.

There are Japanese Laid-open Patent Publication No. 2004-235258 disclosing an air duct as an independent part, and Japanese Laid-open Patent Publication No. 2000-188493 disclosing a cooling device having an electromagnetic shield for restricting noise.

SUMMARY

According to an aspect of the embodiments, an electronic apparatus includes a casing, a shield plate, a main circuit board, and a heat generating electronic. The casing has an air vent. The shield plate extends along an inner face of the casing. The main circuit board extends along the casing interposing a gap between the shield plate and has a heat generating electronic component on a face of the main circuit board facing the shield plate. The heat dissipating module includes a heat dissipating fin, a fan, and a base body. Here, the heat dissipating fin is in contact with the heat generating electronic component, and the fan sends the air to the heat dissipating fin. The base body supports the fan and the heat dissipating fin at a position closer to a side of the shield plate than a position of the fan, and has a slope between the fan and the heat dissipating fin for guiding the air sent from the fan to the heat dissipating fin. Here, the shield plate includes a cut and raised piece which faces the slope and obliquely guides the air sent from the fan to the heat dissipating fin along the slope.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF THE DRAWINGS

FIG. 58B is a perspective view of the face on the first hook member side of the second hook member in.

DESCRIPTION OF EMBODIMENTS

In the example notebook PC described above, there may be a case where a requirement for compactness is satisfied when a heat dissipating fin and a fan are arranged in different heights inside an electronic apparatus. In this case, the base body which supports the fan and the heat dissipating fin may have a slope for guiding the air blow sent from the fan to the heat dissipating fin. However, even if only the slope is formed, the air from the fan leaks. In order to effectively guide the air blow from the fan to the heat dissipating fin, it is preferable to form a structure like a duct along the slope. The base body may be a thick and heavy member such as a die-casted metal because the base body is used to support the heat dissipating fin for pushing toward the heat generating electronic component. In this case, it is difficult to form the duct by bending the base body. Then, in order to form the duct, another part may be prepared to introduce the air blow in association with the slope of the base body. However, the number of the parts increases.

Figure 58A:
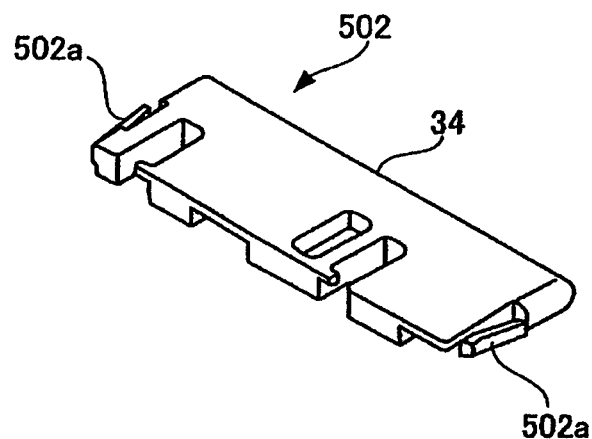
FIG. 58A is a perspective view of the face on the hook holder side of the second hook member.
Figure 58B:
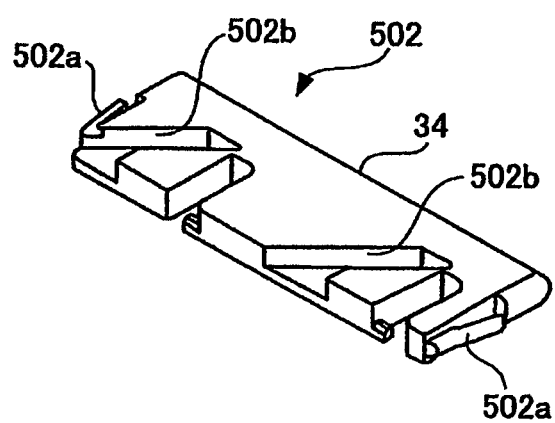

A description is given below, with reference to FIG. 1 through FIG. 58B of Embodiments of the present invention.

(Outer Appearance)

Figure 1:
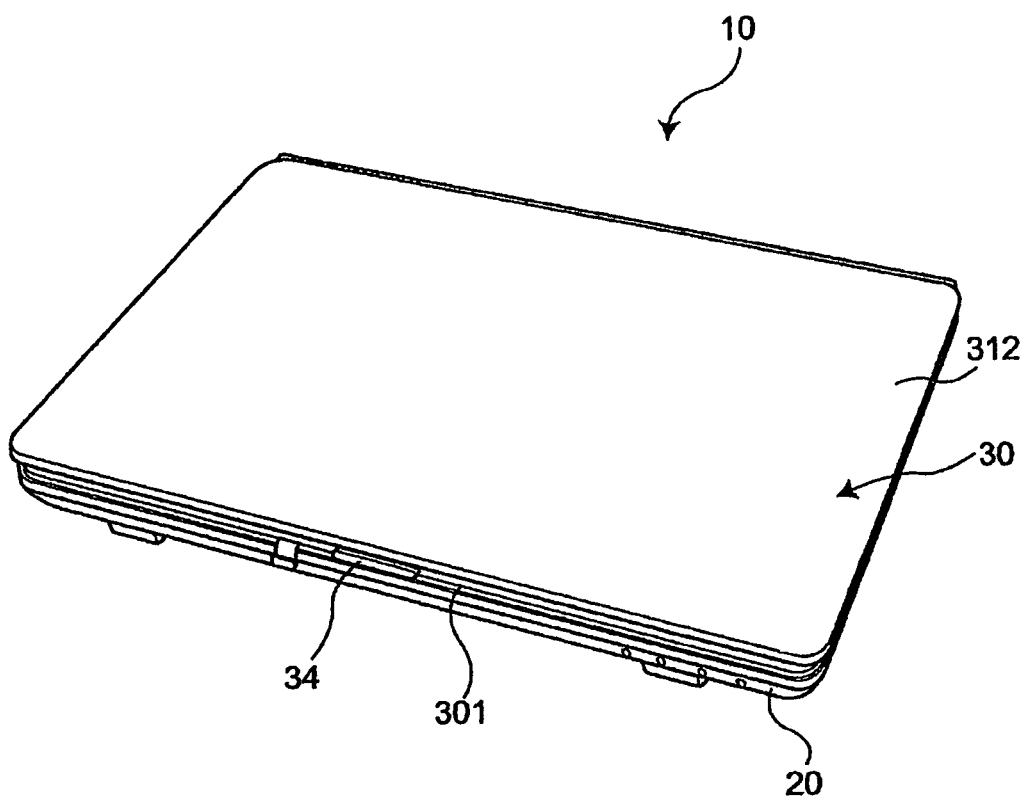
FIG. 1 is a perspective view of a notebook PC in a closed state.
Figure 2:
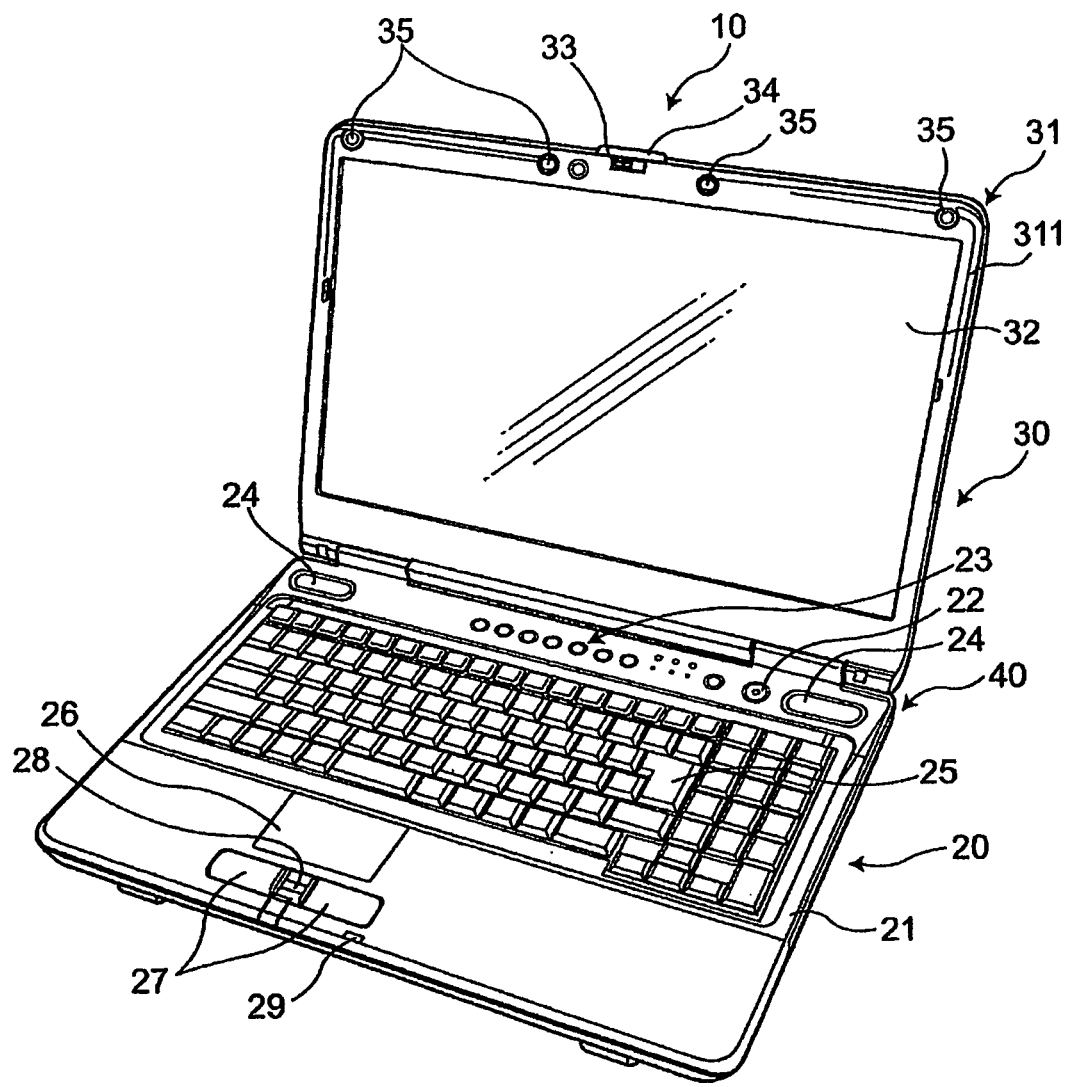
FIG. 2 is a perspective view of the notebook PC of FIG. 1 in an opened state.
Figure 3:
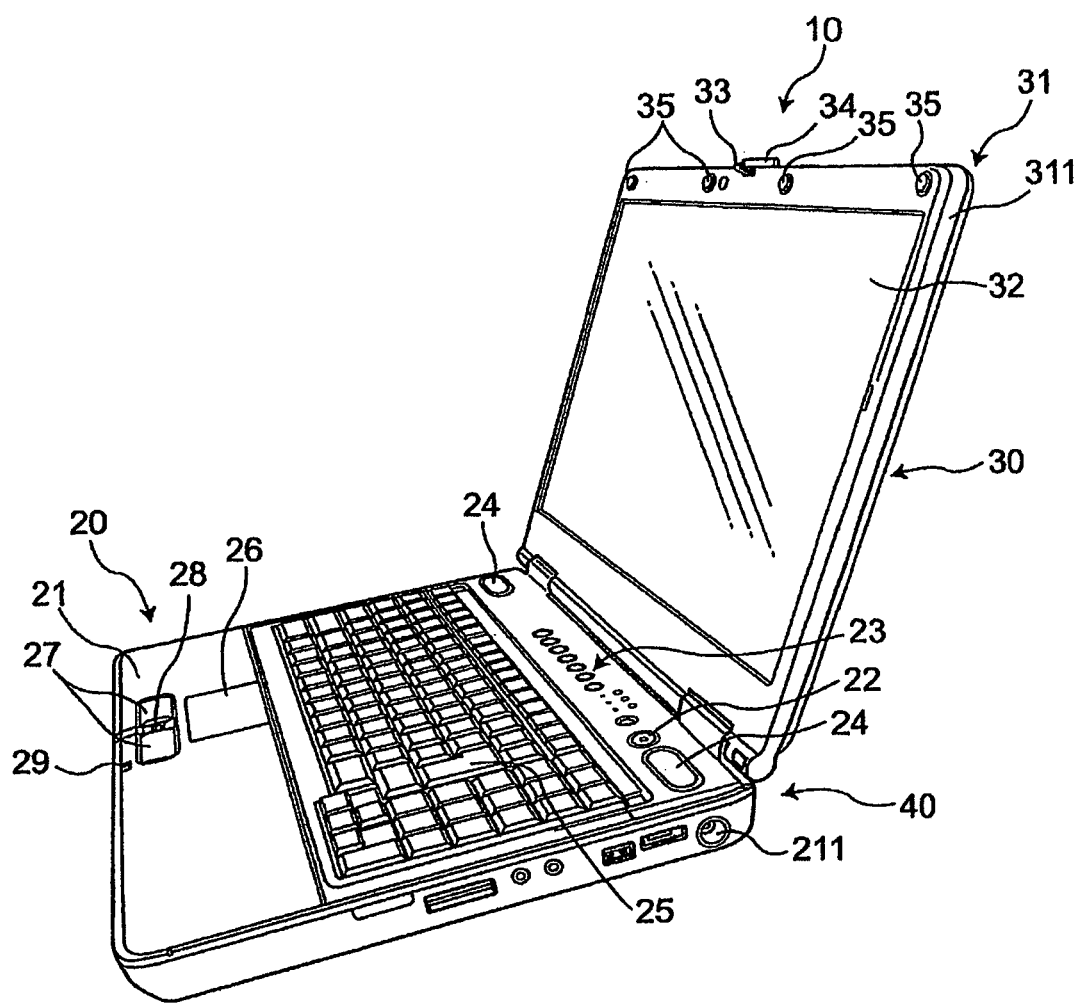
FIG. 3 is a perspective view illustrating a right side surface of the notebook in the opened state.
Figure 4:
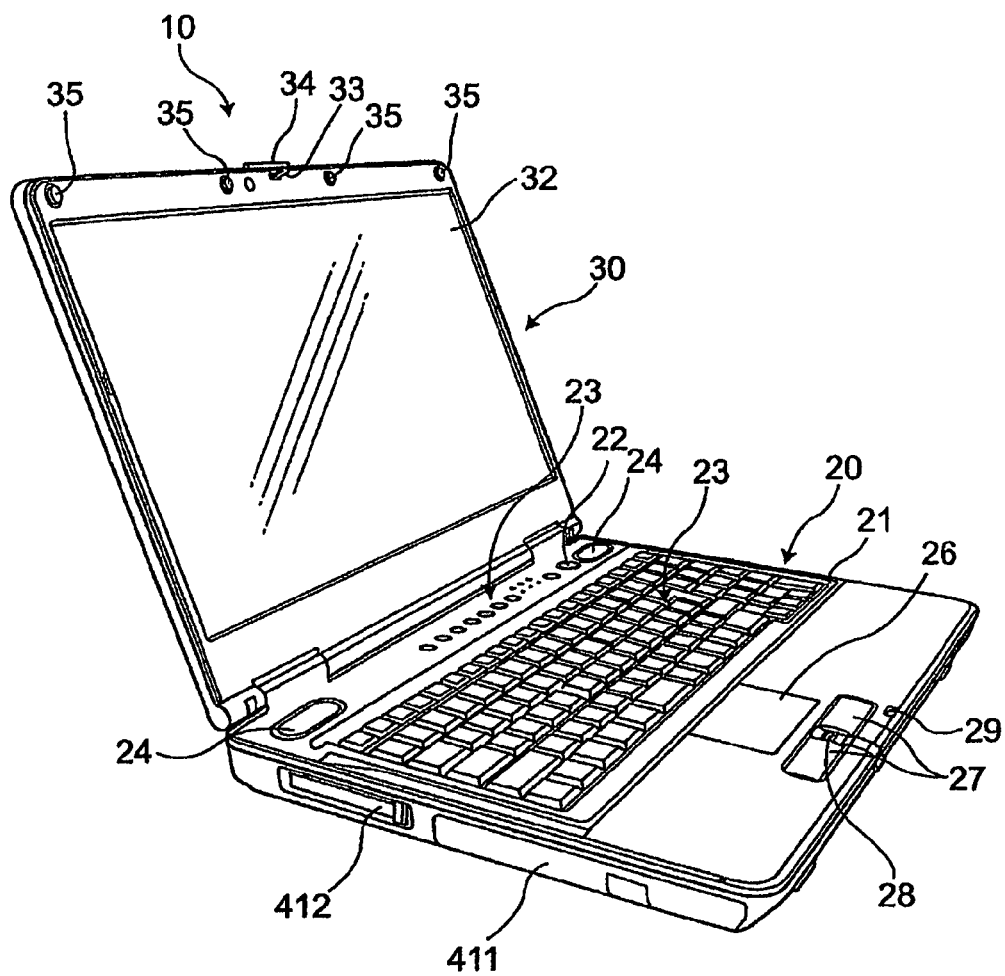
FIG. 4 is a perspective view illustrating a left side surface of the notebook in the opened state.
Figure 5:
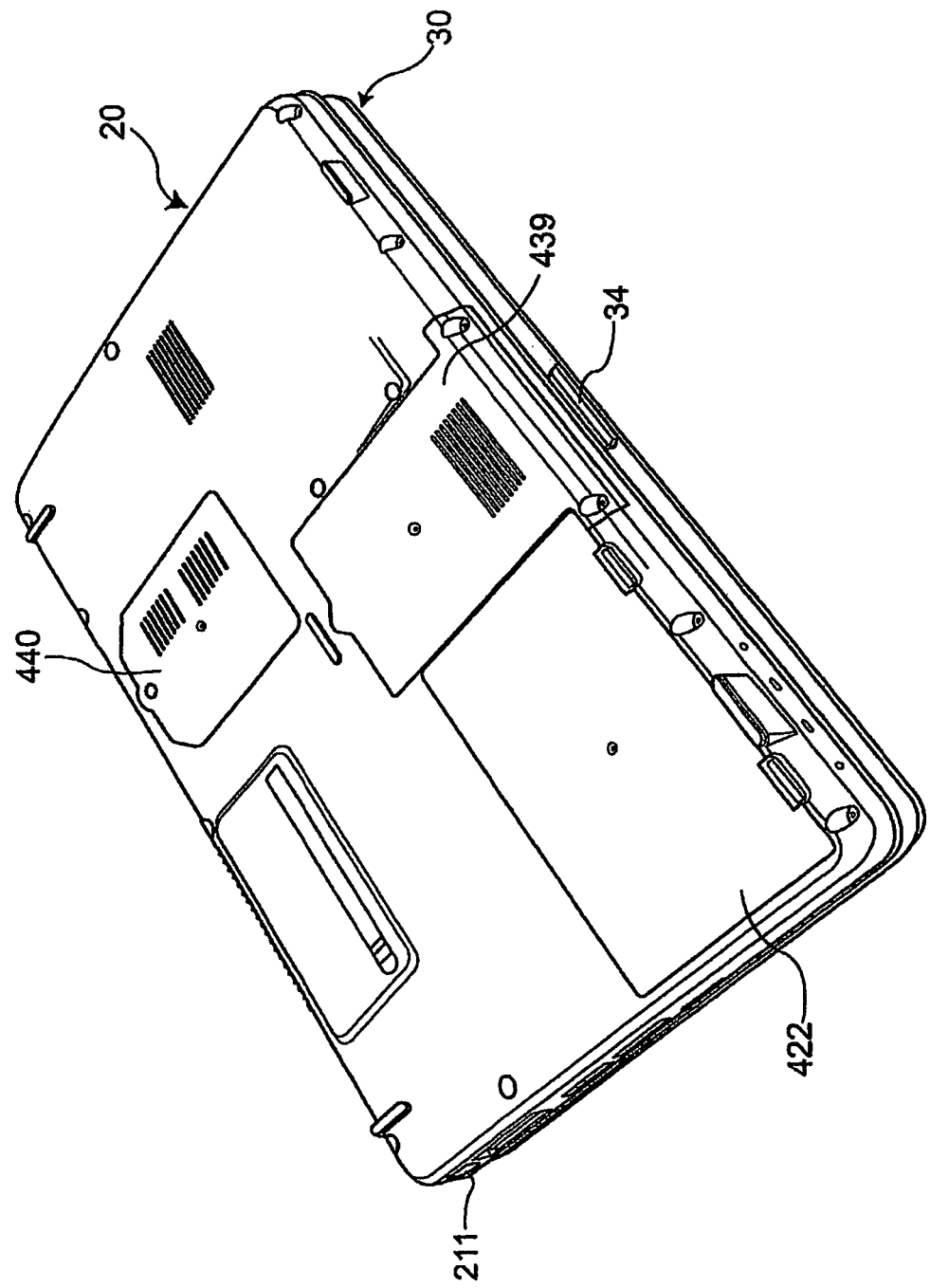
FIG. 5 is a perspective view illustrating a bottom surface of the notebook PC in the closed state.
Figure 6:
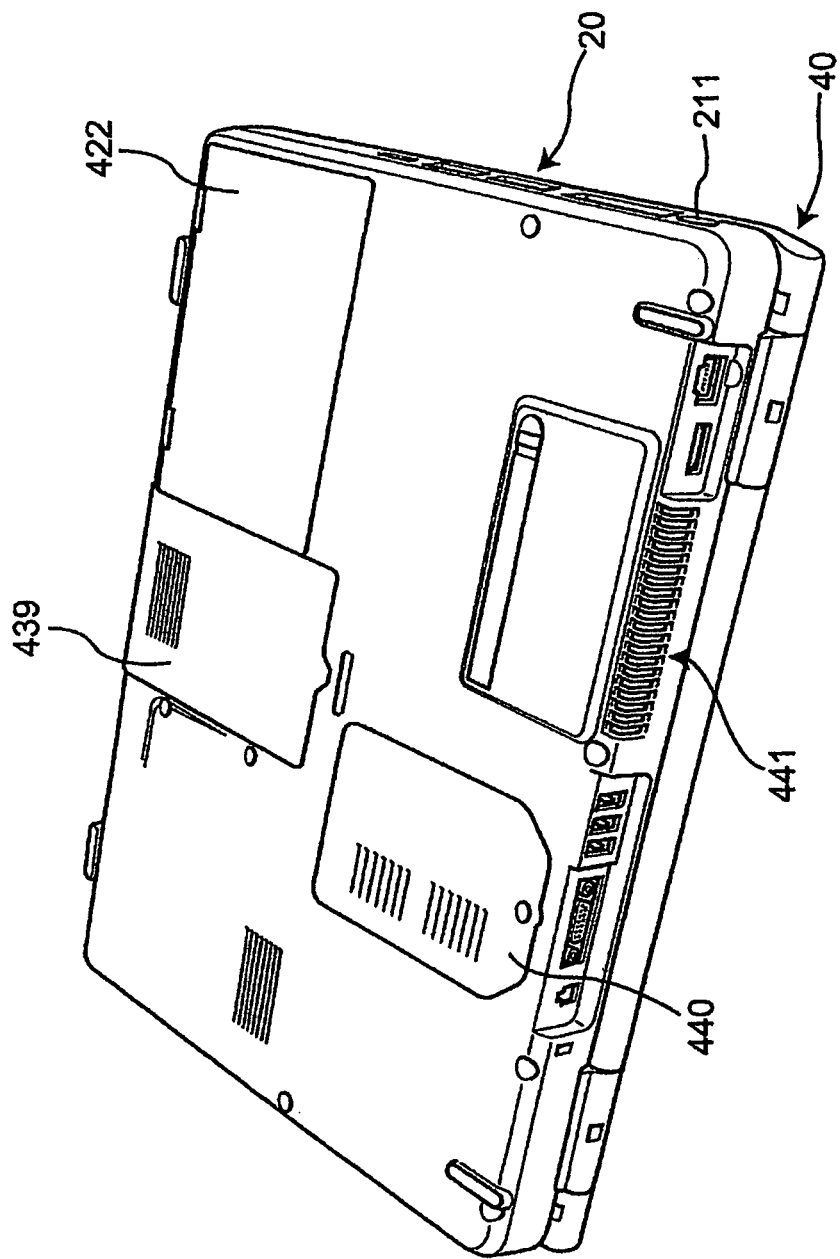
FIG. 6 is a perspective view illustrating the bottom surface of the notebook in the closed state which is viewed from a different angle.

FIG. 1 is a perspective view of a notebook type personal computer (notebook PC) of an Embodiment of an electronic apparatus where a cover is closed. FIG. 2 is a perspective view of the notebook PC of FIG. 1 where the cover is opened. FIG. 3 and FIG. 4 are perspective views of the notebook PC in the opened state which is viewed from right and left side surfaces. FIG. 5 and FIG. 6 are perspective views illustrating the bottom surface of the notebook PC in the closed state taken from different angles.

Referring to FIG. 1 to FIG. 6, an outer appearance of the notebook PC of the Embodiment is described.

The notebook PC includes a computing unit 20 and a display unit 30. The display unit 30 includes a rotational shaft 40 on a far side of the computing unit 20 from the front side of the notebook PC. A closed state of the display unit 30 overlapping the computing unit 20 as illustrated in FIG. 1 and an opened state of the display unit 30 opened from the computing unit 20 illustrated in FIG. 2 are switched over by rotation around the rotational shaft 40. In order to change the state of the display unit 30 from the closed state to the opened state, the display unit 30 is rotated around the rotational shaft 40 by lifting the front end surface 301 of the display unit 30 in the closed state. The front end surface 301 of the display unit 30 in the closed state becomes an upper surface in the opened state (hereinafter, referred to as the opened state) when the display unit 30 is vertically opened. The rotational shaft has a structure of rotating the display unit 30 with friction. The display unit 30 is structured to maintain an opened angle while the display unit 30 is opened by an arbitrary angle relative to the computing unit 20. As illustrated in FIG. 1, the computing unit 20 and the display unit 30 have an outer appearance of a substantially rectangular parallelepiped.

The computing unit 20 has many components such as a main circuit board having an arithmetic processing function in which a CPU chip and so on are installed and a hard disk drive unit (HDD unit) which stores information. The CPU chip is a heat generating electronic component which operates while generating heat and may include a heat dissipating module such as a fan provided to air-cool the CPU chip.

A power button 22 and various function buttons 23 are provided on the upper far side of the computing unit 20. A pair of sound emitting holes 24 is formed in the casing 21 of the computing unit 20. Speakers are positioned inside the sound emitting holes 24, and sound generated by the speakers is emitted from the sound emitting holes 24.

In the middle portion of the upper surface of the computing unit 20, a keyboard 25 for inputting various information and instructions to the PC notebook 10 is arranged.

On the near side of the keyboard 25, there are provided a track pad 26, right and left operations button 27 for the track pad 26, and a fingerprint sensor 28 in the middle of the operations buttons (right and left) 27.

The track pad 26 is provided to move a cursor on the display screen 32 described later in response to operations of sliding a finger on the track pad 26. The operations buttons (right and left) 27 correspond to right and left buttons of a mouse (not illustrated) and are used for designating an icon overlapping a cursor moved at an arbitrary position on the display screen and displaying a menu screen on the display screen 32. The fingerprint sensor 28 is provided for security. The notebook PC 10 may be activated only when a fingerprint matching a registered fingerprint is detected.

On a near side on the upper surface of the computing unit 20, a locking aperture 29 is provided on the casing 21 of the computing unit 20. A hook 33 provided on a front upper portion of the display unit 30 (described later) is inserted into and engaged with the aperture 29 when the state of the notebook PC changes from the opened state to the closed state. With the engagement, the display unit 30 maintains the closed state in which the display unit overlaps the computing unit 20. Thus, the notebook PC may not be inadvertently opened. An unhook button 34 protrudes from the front end surface 301 in the closed state (the upper surface in the opened state). If the unhook button 34 is pushed toward the front end surface (the upper surface) 301, the hook 33 moves to an unhook position thereby releasing engagement between the hook 33 and the locking aperture 29. By lifting up the front end surface (the upper surface) 311 while pushing the unhook button 34, the display unit 30 is opened as illustrated in FIG. 2. On the right side surface of the computing unit 20 illustrated in FIG. 3, a power connector hole 211 for inserting the connector of an AC adapter (not illustrated) for transforming AC power to DC power and supplying the DC power to the notebook PC 10 is formed. In an inside of the power connector 211, a power connector connected to the connector of the AC adaptor is provided. The notebook PC receives a power supply via the power connector of the AC adaptor and the power connector hole 211 connected to the power connector of the AC adaptor. A battery is built in the notebook PC 10 to be charged by receiving the power supply from the AC adaptor. As described later, the battery is detachable from the computing unit 20. The notebook PC 10 can continue to operate only with the battery power. The AC adaptor may include an AC/DC transforming part, a first cable part which connects the AC/DC transforming part to a commercial power outlet and includes a plug connected to the commercial power outlet on an end of the first cable part, a second cable part which connects the AC/DC transforming part to the notebook PC 10 and includes a connector inserted in the power connector of power connector hole on an end of the second cable part. On the right side surface of the computing unit 20, there are insertion holes for a USB connector, an audio microphone jack, an audio earphone jack or the like other than the power connector hole 211. On the left side of the computing unit 20 illustrated in FIG. 4, an outer face 411 of a CD/DVD drive unit, a card slot 412 and so on are provided.

Referring to FIG. 5 and FIG. 6, on the bottom surface of the computing unit 20, a battery lid 422, a lid 439 for covering an opening in which an HDD unit is accommodated, and a lid 439 for covering an opening which accommodates a connector for receiving a memory board are provided. Further, from the bottom surface of the casing 21 of the computing unit 20 to the back surface of the casing 21, an air vent 441 used for blowing air from an internal fan to the outside is formed as illustrated in FIG. 6. Several connectors and so on are arranged on a back surface of the computing unit 20.

The display screen 32 being a display panel for displaying an image in response to an instruction of the computing unit 20 is provided on a front surface of the display unit 30 in the opened state. The periphery of the display screen 32 is covered by a front face cover 311 forming the casing 31 of the display unit 30.

The casing 31 of the display unit 30 includes the front face cover 311 and a back surface cover 312 (see FIG. 1) covering the back side surface of the display screen. The display screen 32 is interposed between the front surface cover 311 and the back surface cover 312 and accommodated in the casing 31. The front surface cover 311 forms a front casing of the casing 31 of the display unit 30. The back surface cover 312 forms a back casing of the casing 31 of the display unit 30.

A hook 33 protrudes from a upper front surface of the display unit 30 in the opened state. The hook 33 enters the locking aperture 29 provided in the casing 21 of the computing unit 20 and is engaged with the inside of the locking aperture 29 in the closed state. Referring to FIG. 1, an unhook button 34 protrudes from the upper surface 301 in the opened state (the front end surface 301 in the closed state). If the unhook button 34 is pushed downward toward the upper surface in the opened state (the front surface in the closed state), the hook 33 moves to a position where the engagement between the hook 33 and the locking aperture 29 is released. Therefore, the display unit 30 in the closed state as illustrated in FIG. 1 can be opened as illustrated in FIG. 2 by rotating the display unit 30 so as to lift the front end surface 301 of the display unit 30 while pushing the unhook button 34.

The upper front portion of the display unit 30 in the opened state has plural pads 35 to be in contact with the upper surface of the computing unit 20 when the display unit 30 overlaps the computing unit 20.

(HDD Cover Attaching Structure)

Figure 7:
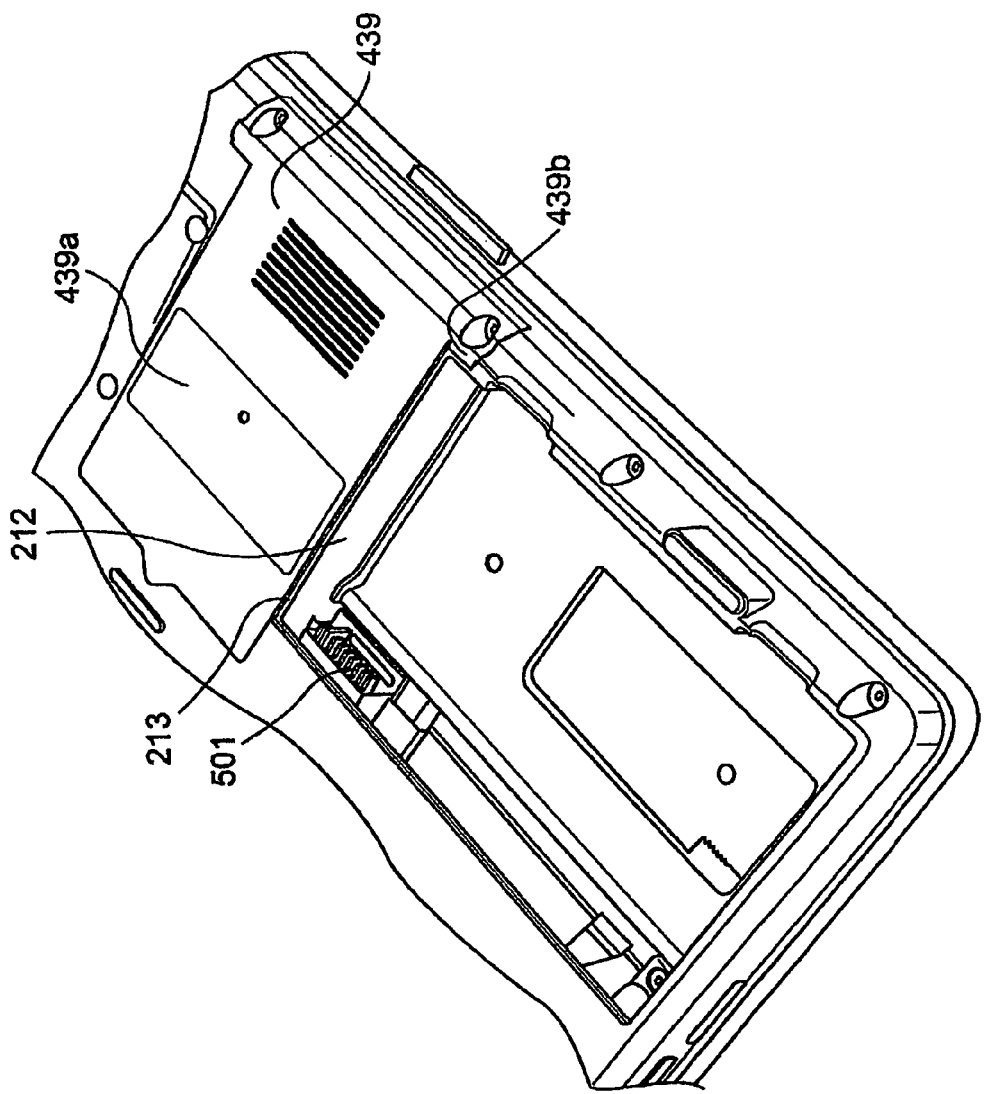
FIG. 7 is a view of an opening of a battery housing on the bottom surface of a computing unit where a battery is removed.

FIG. 7 is a view of an opening of a battery housing on the bottom surface of the computing unit from which the battery is removed.

Figure 8:
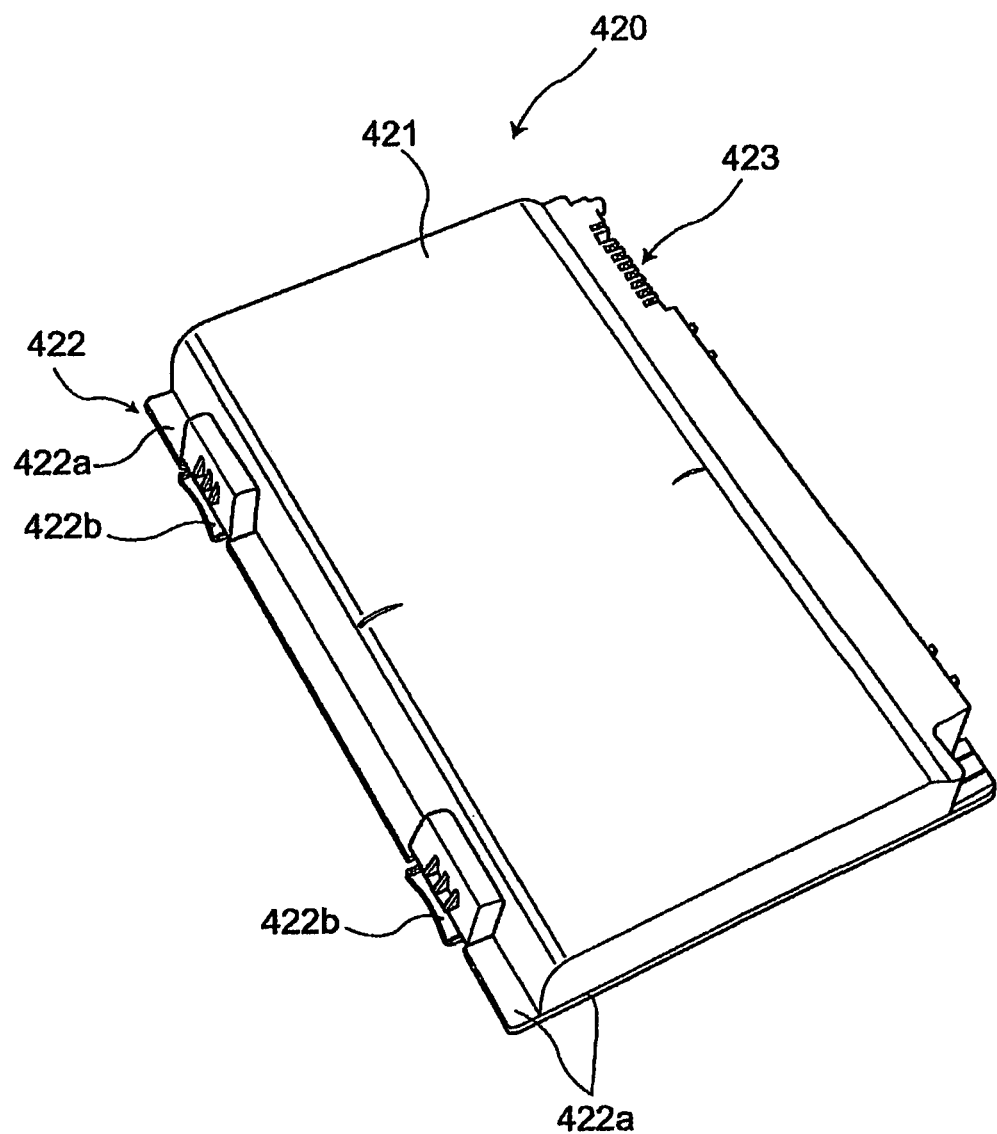
FIG. 8 illustrates a removed battery which is turned upside down.
Figure 10:
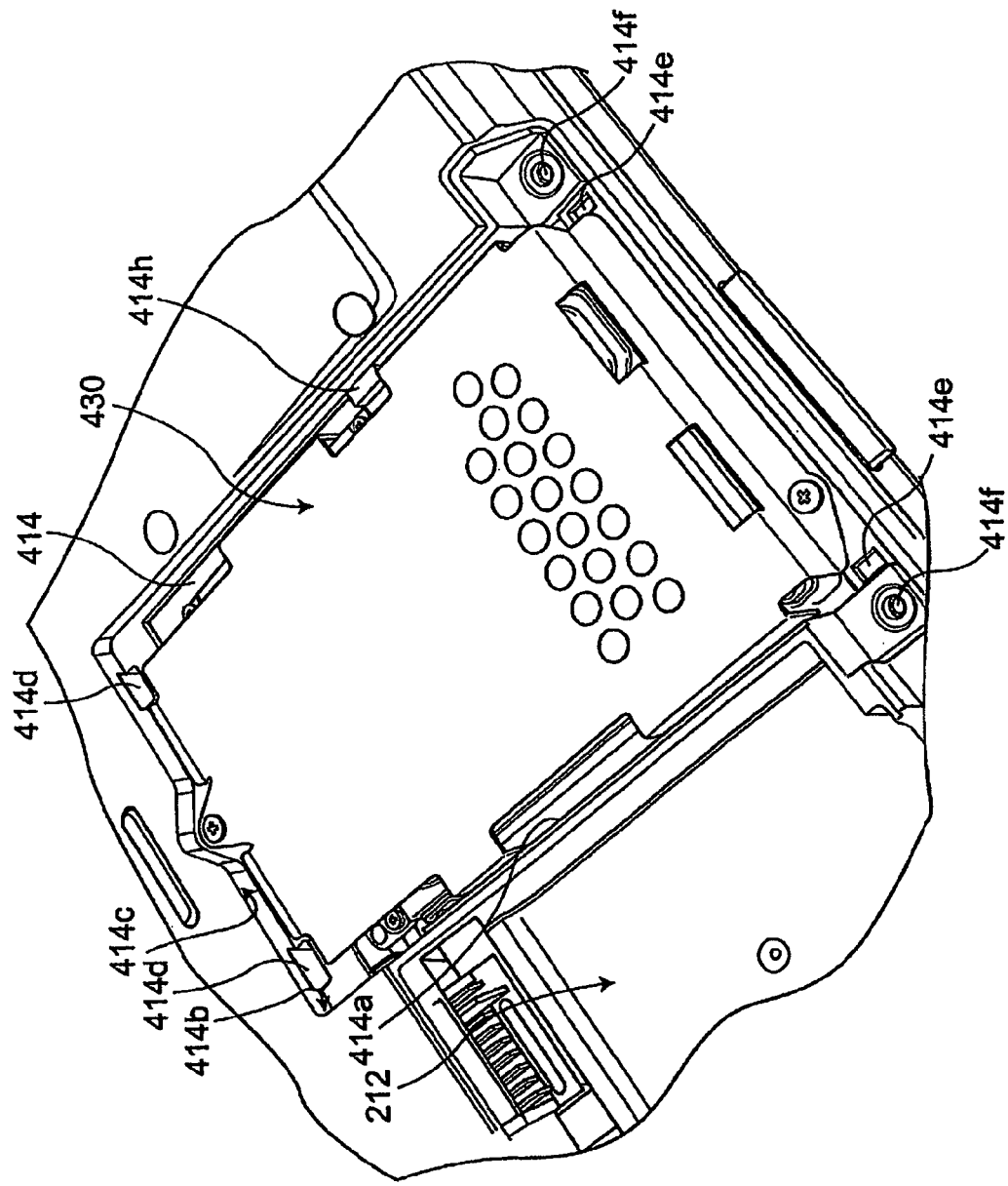
FIG. 10 illustrates an HDD unit accommodated in an opening of an HDD unit housing.

FIG. 8 illustrates a removed battery which is turned upside down. An opening 212 of a battery housing formed in a bottom surface of the casing 21 of the computing unit 20 is illustrated in FIG. 7. The battery 420 includes a body 421 and a lid 422. A battery cell is accommodated in the body 421. The battery 420 is attachable to and detachable from the opening 212 of battery housing. The battery body 421 is accommodated in the opening 212 of the battery housing. A connector 501 is exposed inside the opening 212 of the battery housing. The connector 501 is connected to a connector 423 provided in the battery body 421 of the battery 420 illustrated in FIG. 8. The battery 420 is charged via the connectors 501 and 423, and power stored in the battery 420 is supplied to various portions of the notebook PC 10 via the connectors 501 and 423. The lid 422 overlaps the area of the battery body 421 and forms a part of the outer surface of the casing. The lid 422 has a flange 422a extending along the surface area of the battery body 421 and protruding from the battery body 421. Meanwhile, the casing 21 has a supporting edge 213 extending along the opening 212 of the battery housing and in an inward direction from the opening 212 of the battery housing. The flange 422a of the battery 420 is supported by the supporting edge 213 formed around the opening 212 of battery housing and engaged with the opening 212 of battery housing by a locking part 422*b*. Referring to FIG. 10, on the bottom surface of the casing 21 of the computing unit 20, an opening 414 of an HDD unit housing which accommodates an HDD unit 430 is formed adjacent to the opening 212*a* of the battery housing. The HDD unit 430 is accommodated in the opening 414 of the HDD unit housing as illustrated in FIG. 10, and the HDD unit 430 is covered by the lid 439 as illustrated in FIG. 7. The lid 439 includes a cover portion 439*a* for covering the HDD unit 430 which is accommodated in the opening 414 of the HDD unit housing and an extending portion 439*b* which extends on the side of the opening 212 of the battery housing.

Figure 9:
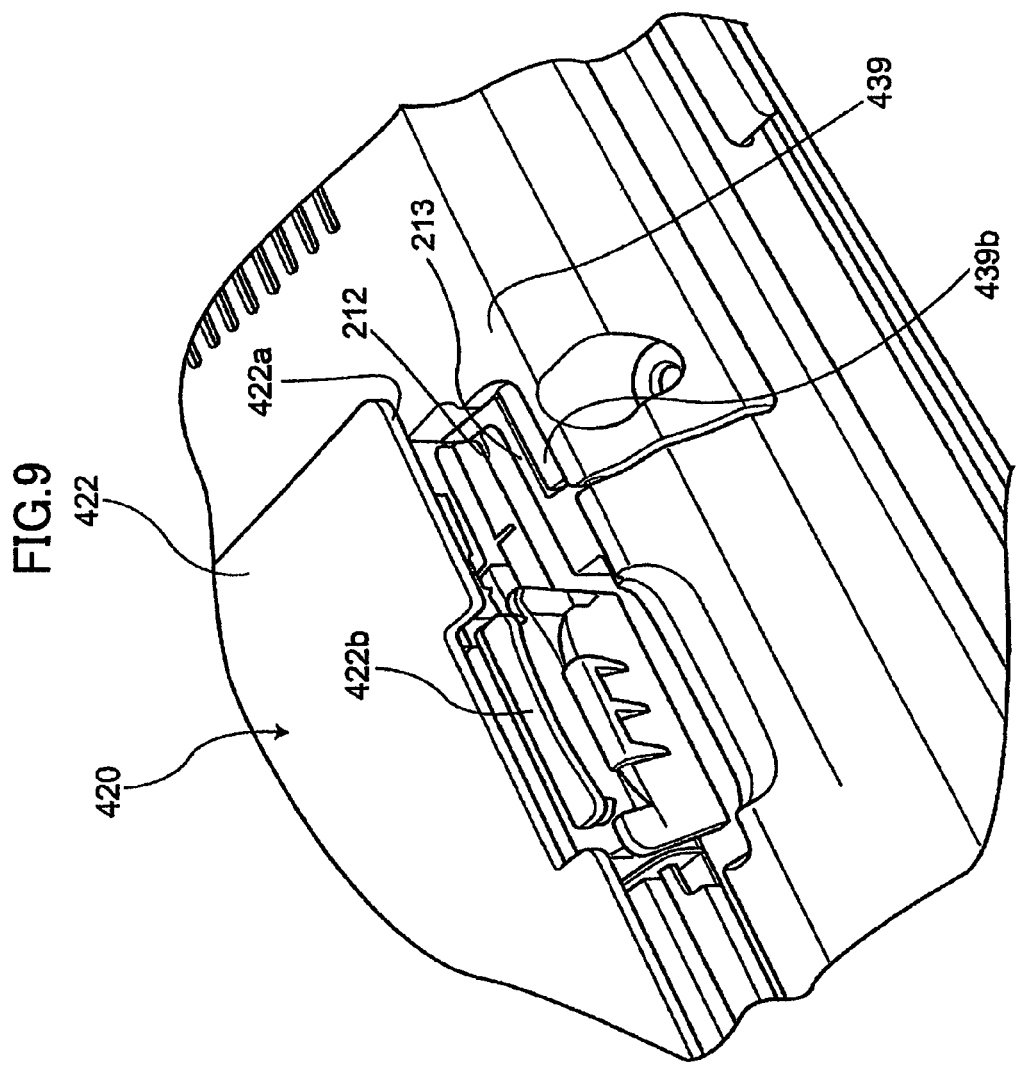
FIG. 9 is an enlarged perspective view of an extending portion covering an HDD unit and adjacent portions thereto.

FIG. 9 is an enlarged perspective view of an extending portion 439*b* covering the HDD unit 430 and adjacent portions thereto. Referring to FIG. 9, the battery 420 is slightly lifted up from the opening 212 of the battery housing.

The outer face of a supporting edge 213 formed around the opening 212 of the battery housing and the outer face of the extending portion 439*b* of the lid 439 adjacent to the opening 212 of the battery housing are formed substantially flat. The battery 420 is accommodated inside the opening 212 of the battery housing so that the flange 422*a* which is the peripheral portion of the battery lid 422 of the battery 420 covers both the supporting edge 213 and the extending portion 439*b*.

Therefore, the lid 439 is not removed as long as the battery 429 is accommodated in the opening 212 of the battery housing. Therefore, the HDD unit 430 accommodated inside the opening 414 of the HDD unit housing (see FIG. 10) is not removed from the opening 414 of the HDD unit housing. Therefore, the battery 420 is always removed before the removal of the HDD unit 430 if the HDD unit 430 is to be removed. With this, it is possible to prevent the HDD unit 430 having electric power applied from being removed from the notebook PC 10. Thus, the HDD unit 430 and information stored in the HDD unit 430 are prevented from being damaged.

Figure 11:
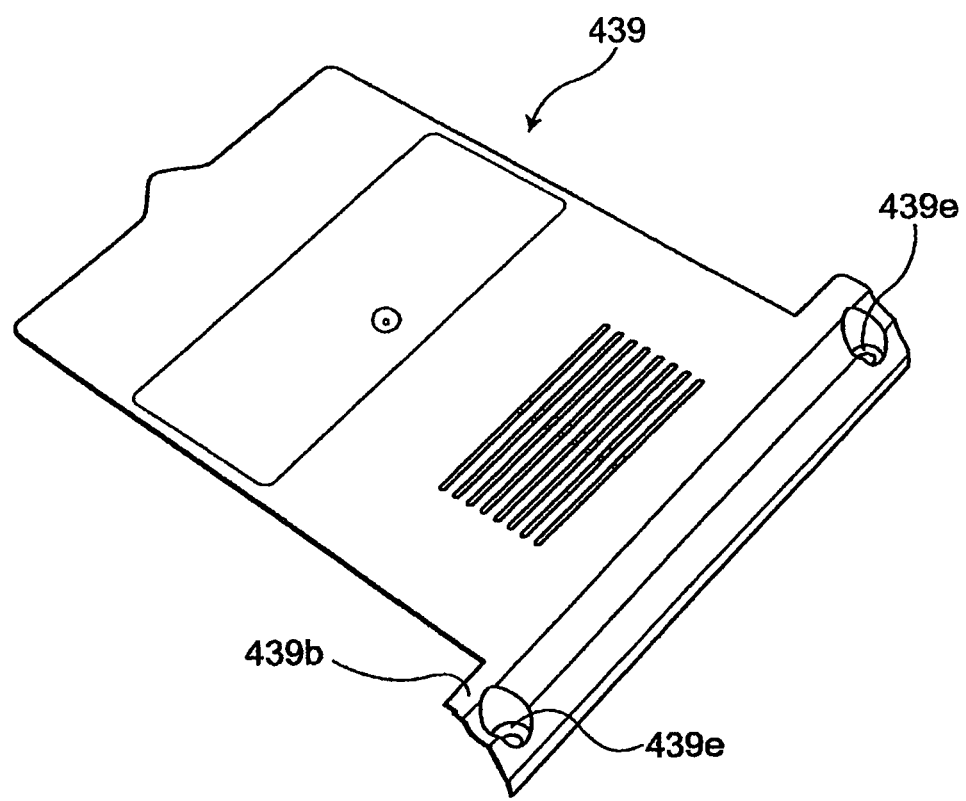
FIG. 11 is a perspective view of a lid which is removed from the opening of the HDD unit housing.
Figure 12:
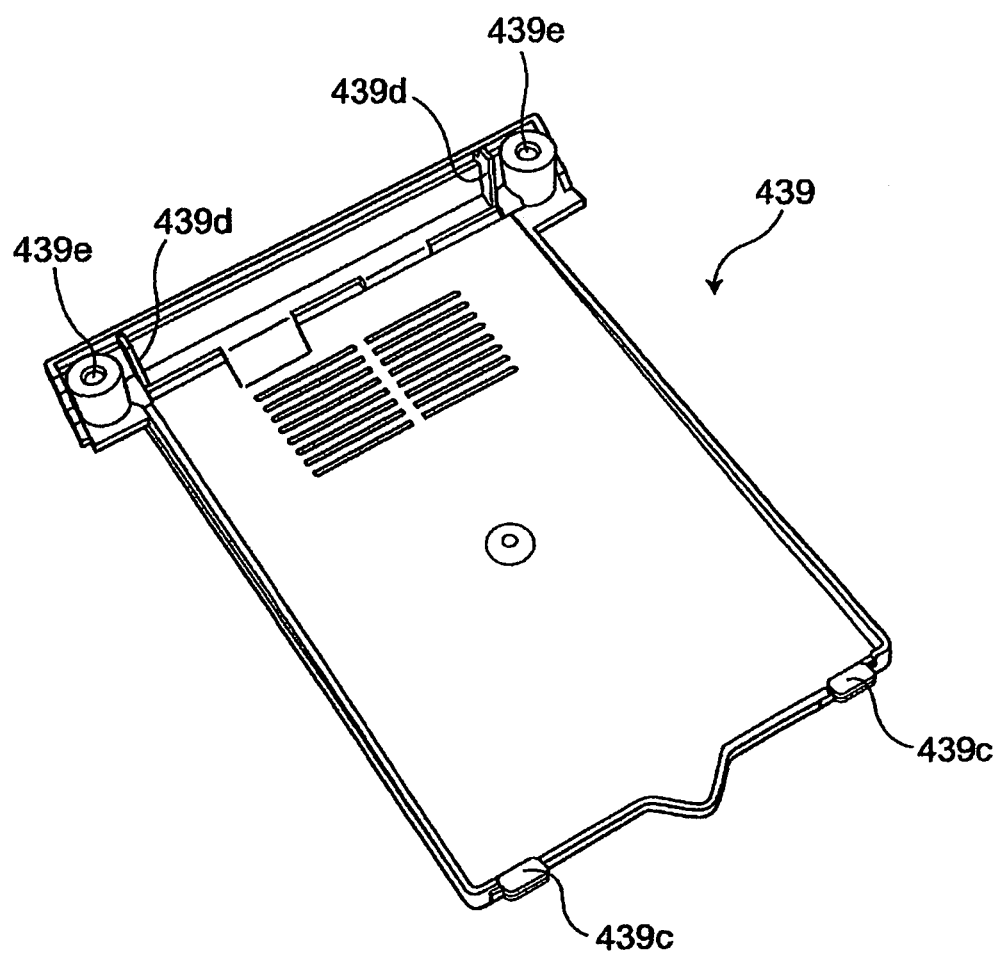
FIG. 12 is a perspective view of the inside of the lid.

FIG. 10 illustrates the HDD unit 430 accommodated in the opening 414 of the HDD unit housing. FIG. 11 is a perspective view of the lid 439 which is removed from the opening 414 of the HDD housing. FIG. 12 is a perspective view of the inside of the lid 439.

If the lid 439 covering the opening 414 of the HDD unit housing is removed as illustrated in FIG. 5 and FIG. 6, the HDD unit 430 accommodated in the opening 414 of the HDD unit housing can be viewed as illustrated in FIG. 10.

Figure 13:
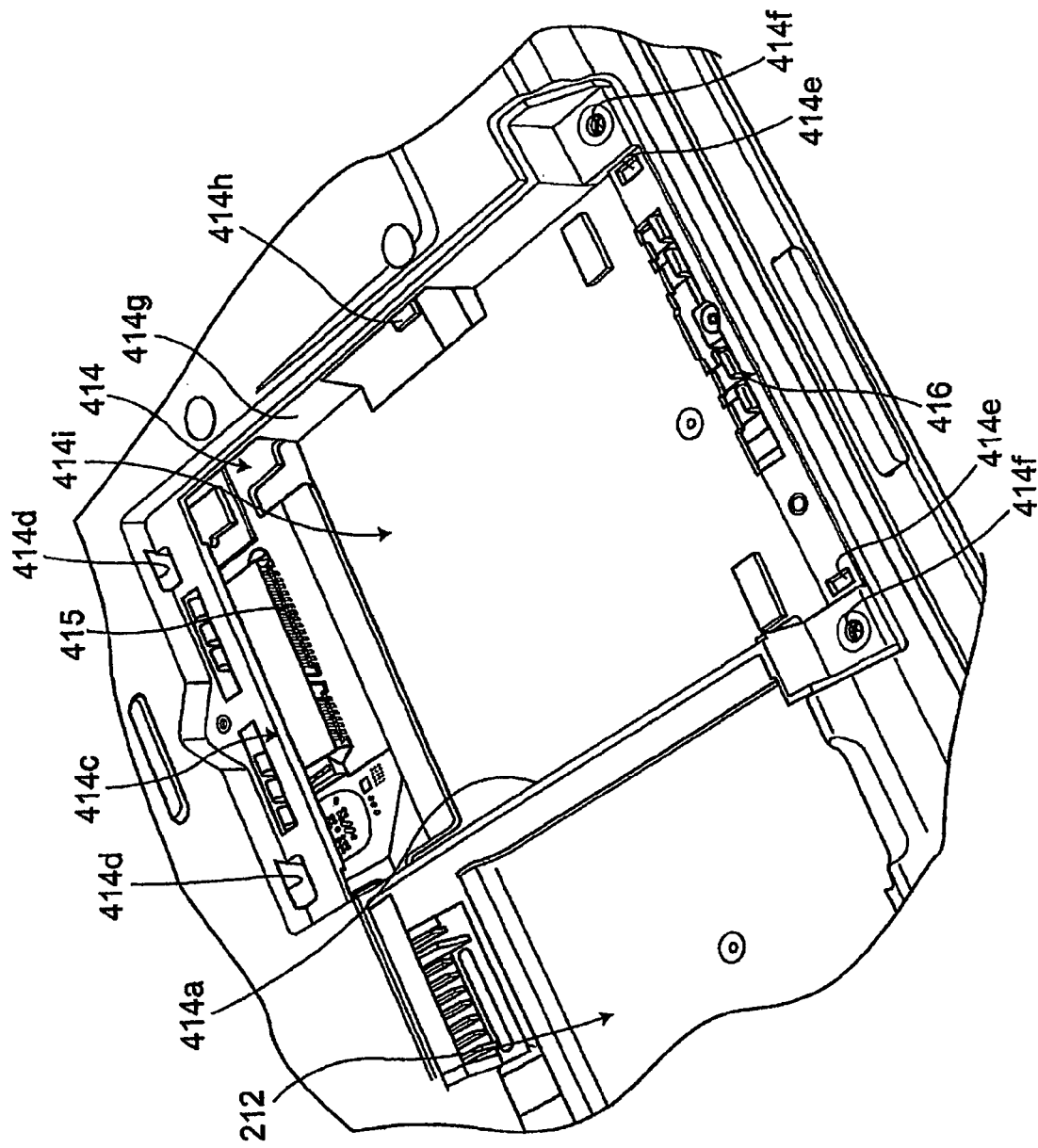
FIG. 13 is a perspective view of the opening of the HDD unit housing after the HDD unit is removed.

The opening 414 of the HDD unit housing is formed in a position adjacent to the opening 212 of the battery housing in which the battery 420 is accommodated as illustrated in FIG. 8. Referring to FIG. 10, the opening 414 of the HDD unit housing is formed by including a side wall 414*a* adjacent to the opening 212 of the battery housing, a front wall 414*c*, and a corner 414*b* connected in common with the side wall 414*a* and the front wall 414*c*. Further, the front wall 414*c* of the opening 414 of the HDD unit housing have two holes 414*d* into which two claw portions 439*c* formed in the lid 439 are inserted as illustrated in FIG. 12 and FIG. 13. The lid 439 has protruding portions 439*d* which are inserted into dents 414*e* which are formed on the opening 414 of the HDD unit housing on a side opposite to the claw portions 439*c*. The opening 414 of the HDD unit housing have two screw holes 414*f* at positions adjacent to the dents 414*e*. In association with the screw holes 414*f*, two holes 439*e* are formed in the lid 439 at corresponding positions of the two screw holes 414*f*. The lid 439 is fixed so as to cover the opening 414 of the HDD unit housing by inserting the claw portions 439*c* into the holes 414*d*, arranging the protruding portions 439*d* in the dents 414*e*, and screwing the lid 439 through the holes 439*e* to the screw holes 414*f*. Therefore, in order to remove the fixed lid 439 in the fixed state, the side of the lid having the holes 439*e* is lifted and rotated after removing the screws fixing the lid 439. The extending portion 439*b* of the lid 439 is formed at a corner apart from the corner 414*b* shared by the side wall 414*a* and the front wall 414*c* on the side of the opening 414 of the HDD unit housing. Said differently, the extending portion 439*b* is formed on the side to be lifted in removing the lid 439. Since the flange 422*a* of the battery 420 covers the extending portion 439*b*, it is possible to certainly prevent the lid 439 from being removed before the battery 420 is removed.

Although the HDD unit 430 is described, the Embodiment is applicable to other types of electronic components such as a memory board and a communication module.

(HDD Unit Attaching Structure)

Figure 14:
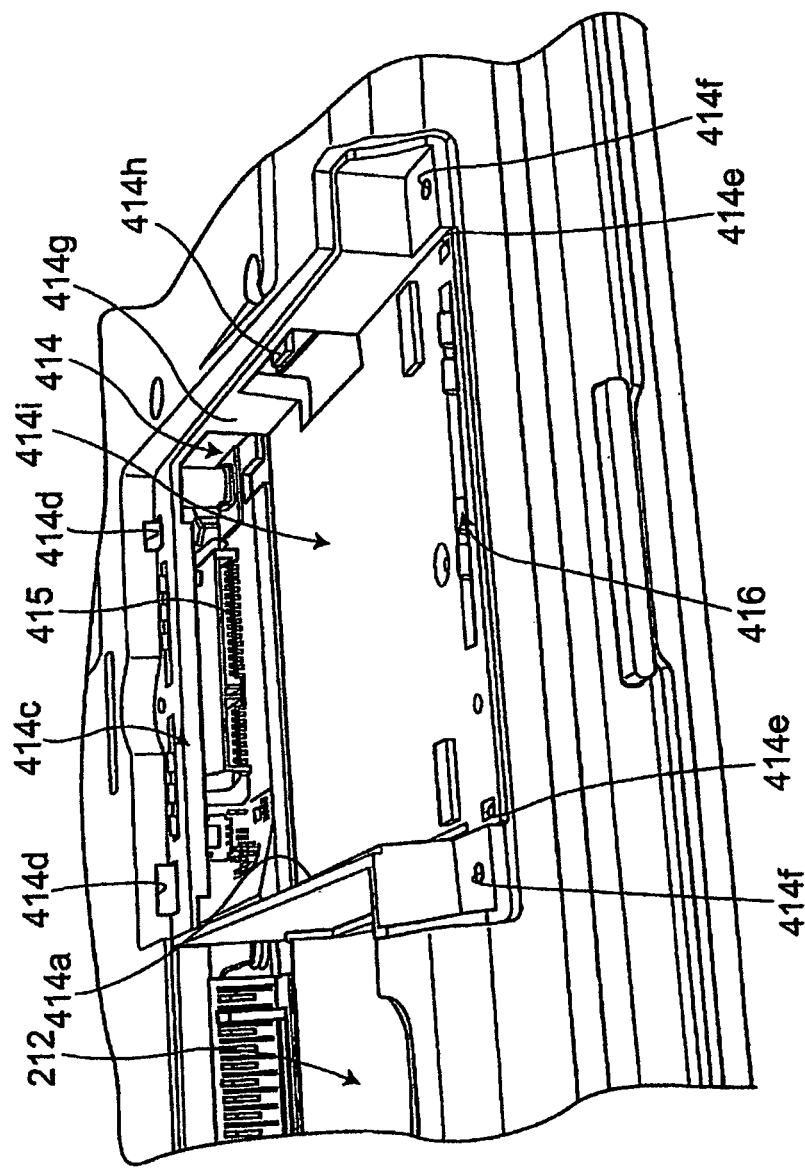
FIG. 14 is a perspective view of the opening of the HDD unit housing viewed from a different angle after removing the HDD unit.

FIG. 13 and FIG. 14 are perspective views of the opening 414 of the HDD unit housing viewed from different angles after removing the HDD unit.

Figure 15:
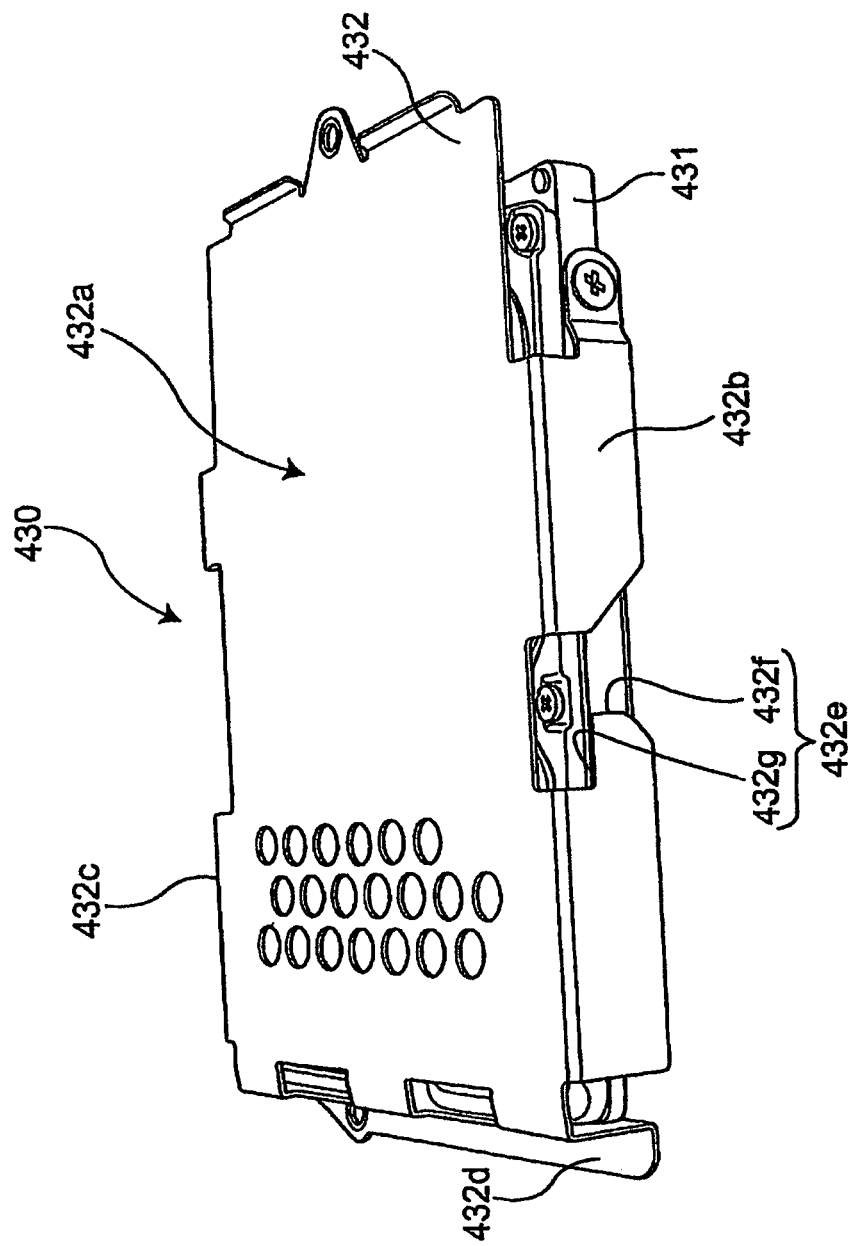
FIG. 15 is a perspective view of the HDD unit.
Figure 16:
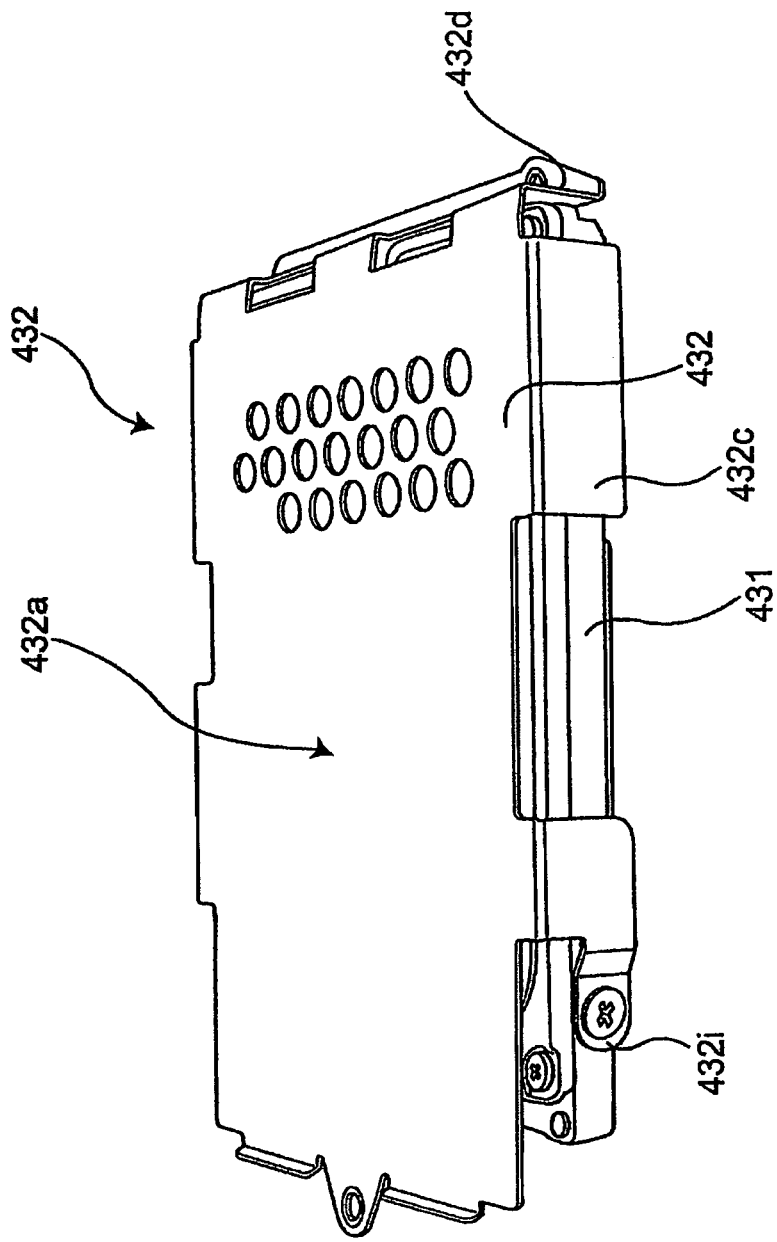
FIG. 16 is a perspective view of the HDD unit viewed from a different angle.
Figure 17:
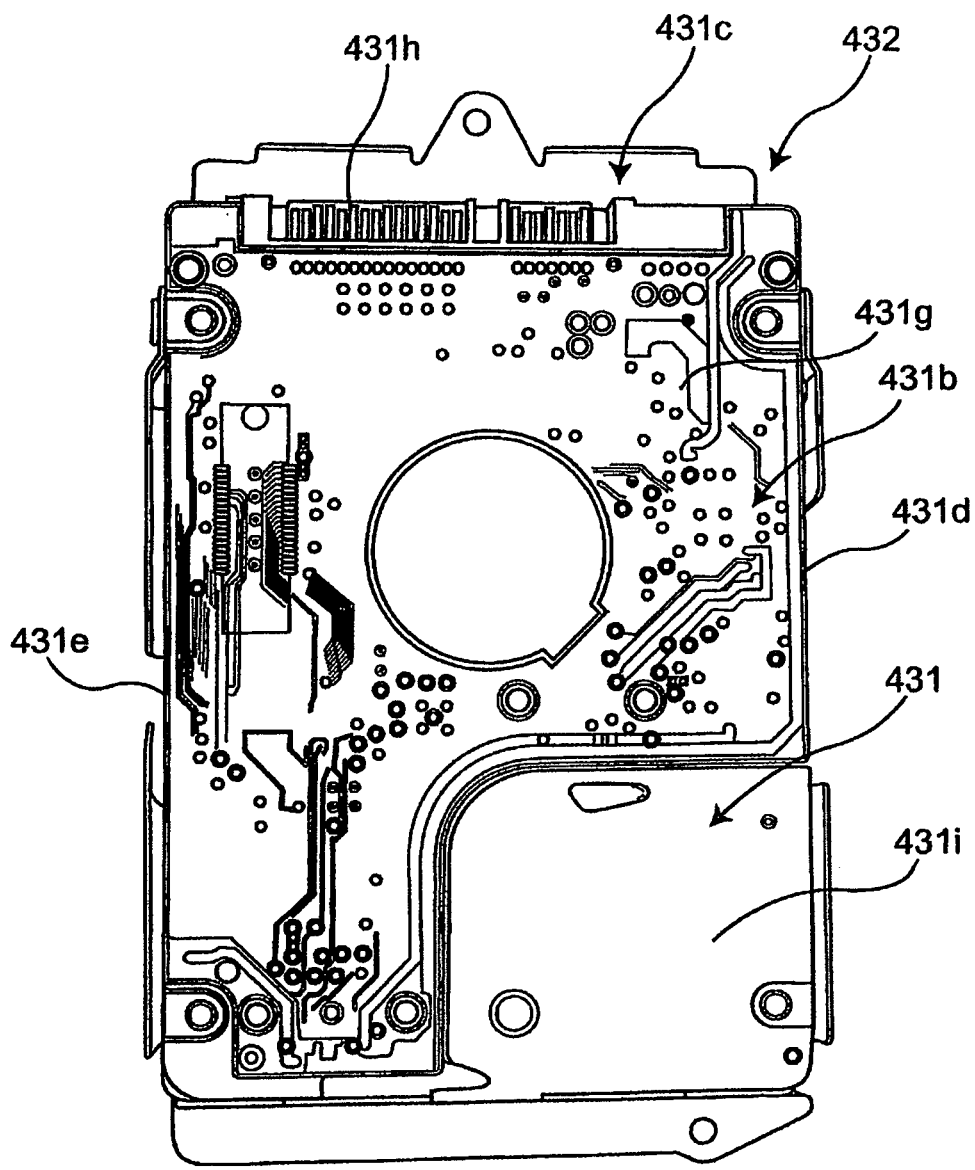
FIG. 17 illustrates the bottom surface of the HDD unit.
Figure 18:
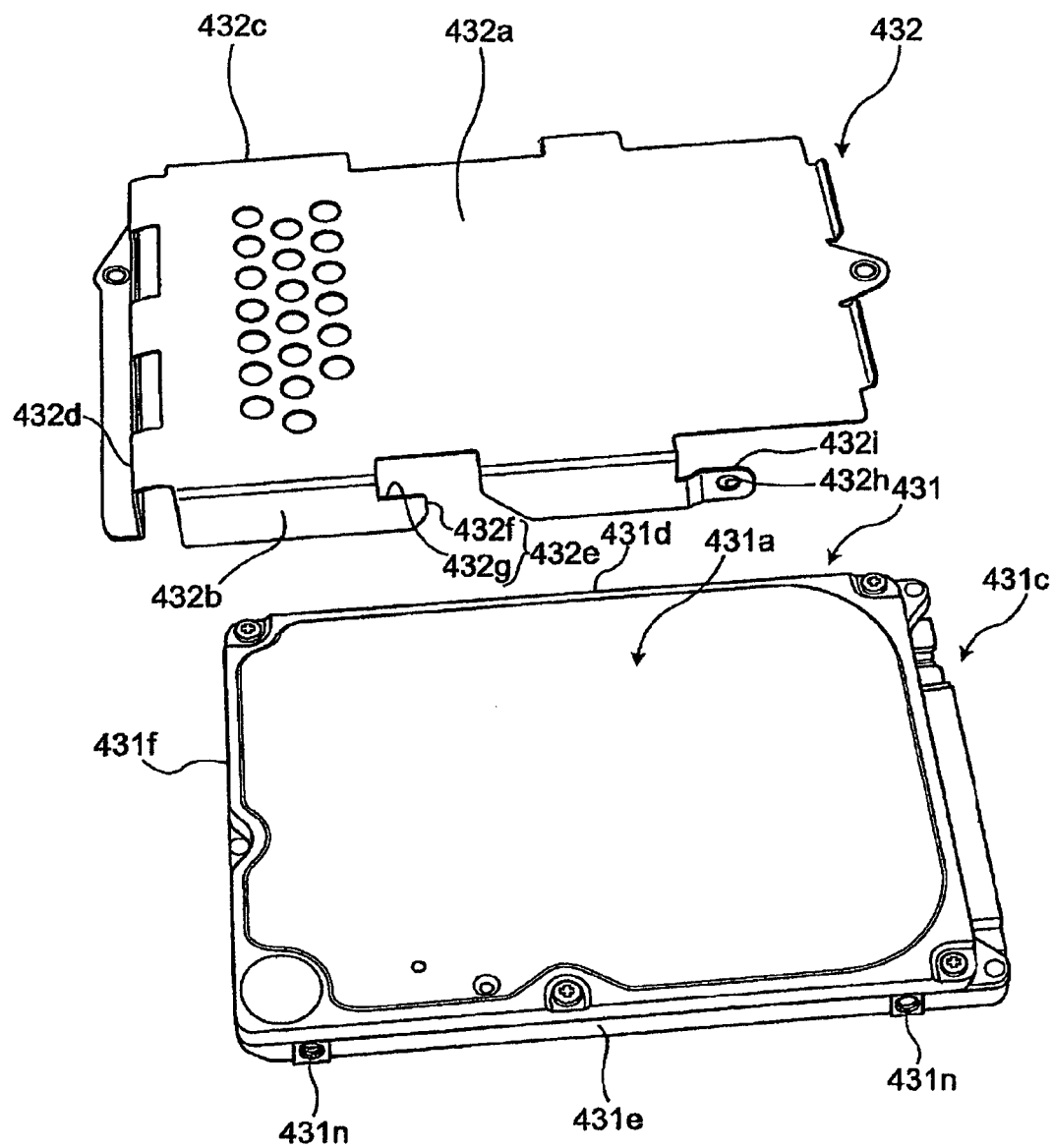
FIG. 18 is an exploded perspective view of the HDD unit separated into the HDD body and a cover member.
Figure 19:
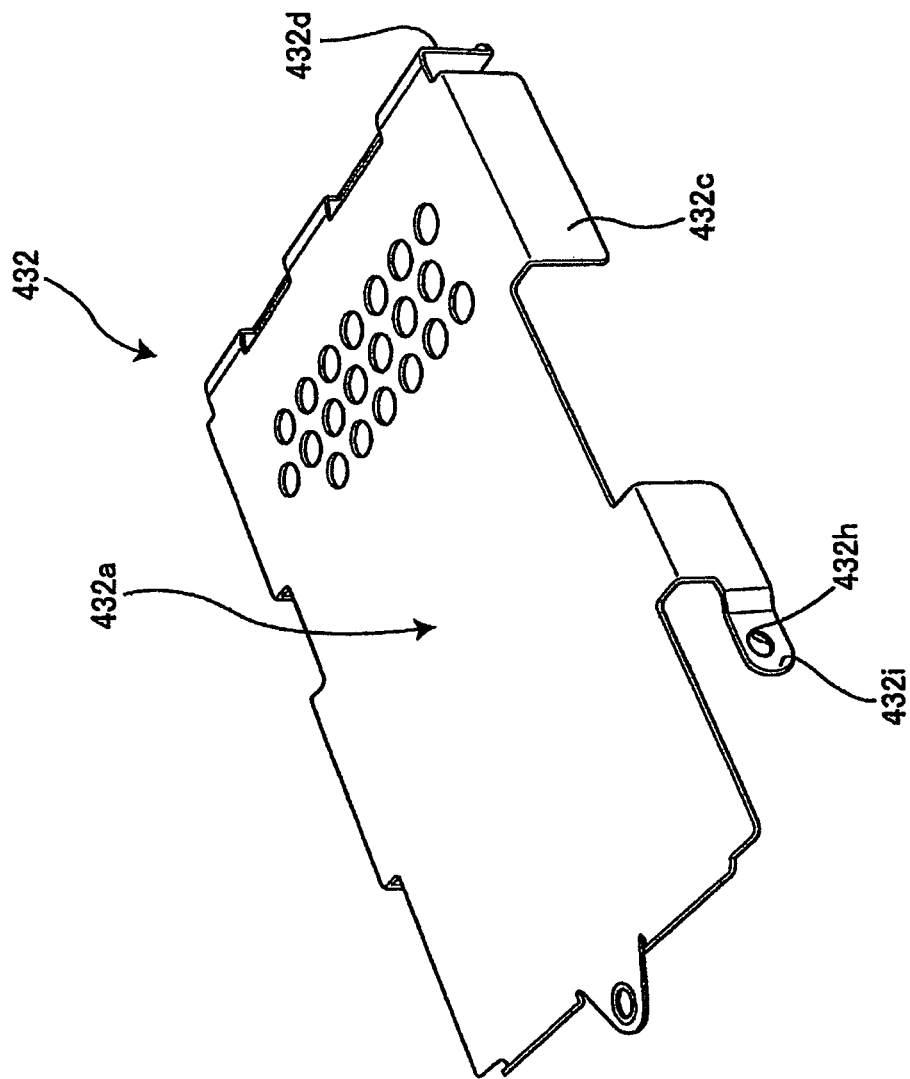
FIG. 19 is a perspective view of the cover member of the HDD unit.
Figure 20:
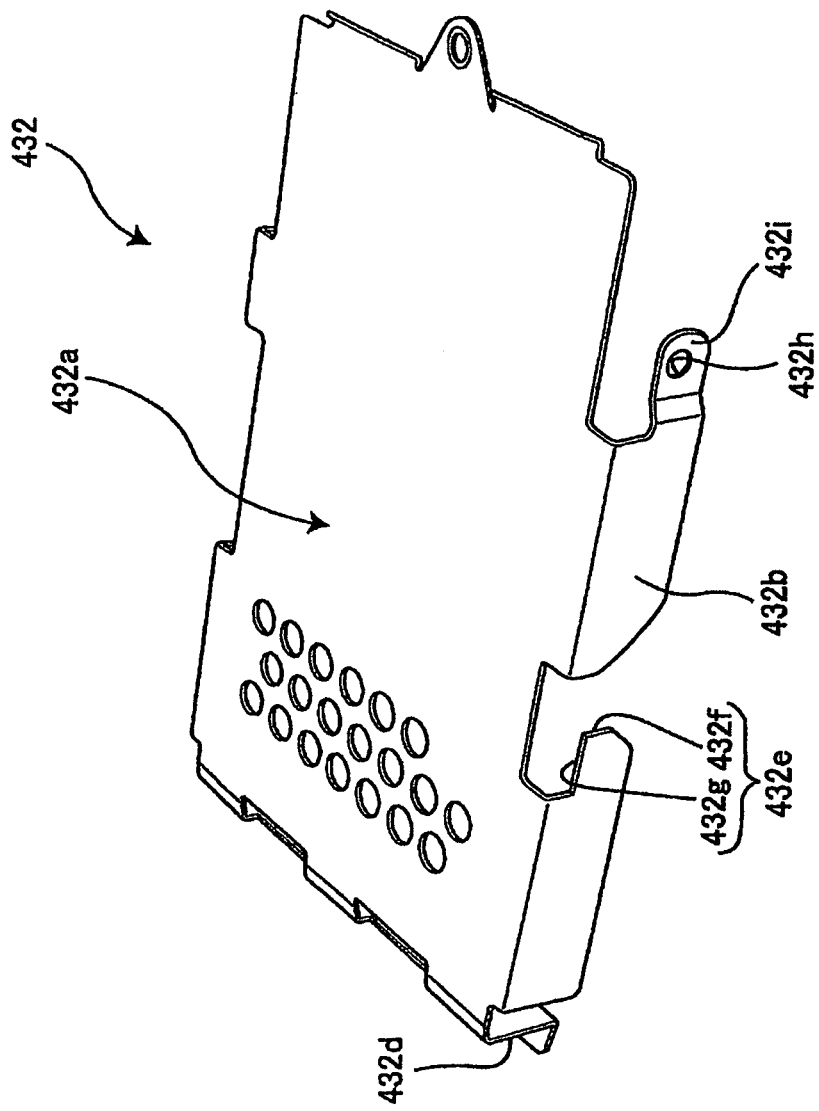
FIG. 20 is a perspective view of the cover member of the HDD unit viewed from a different angle.
Figure 21:
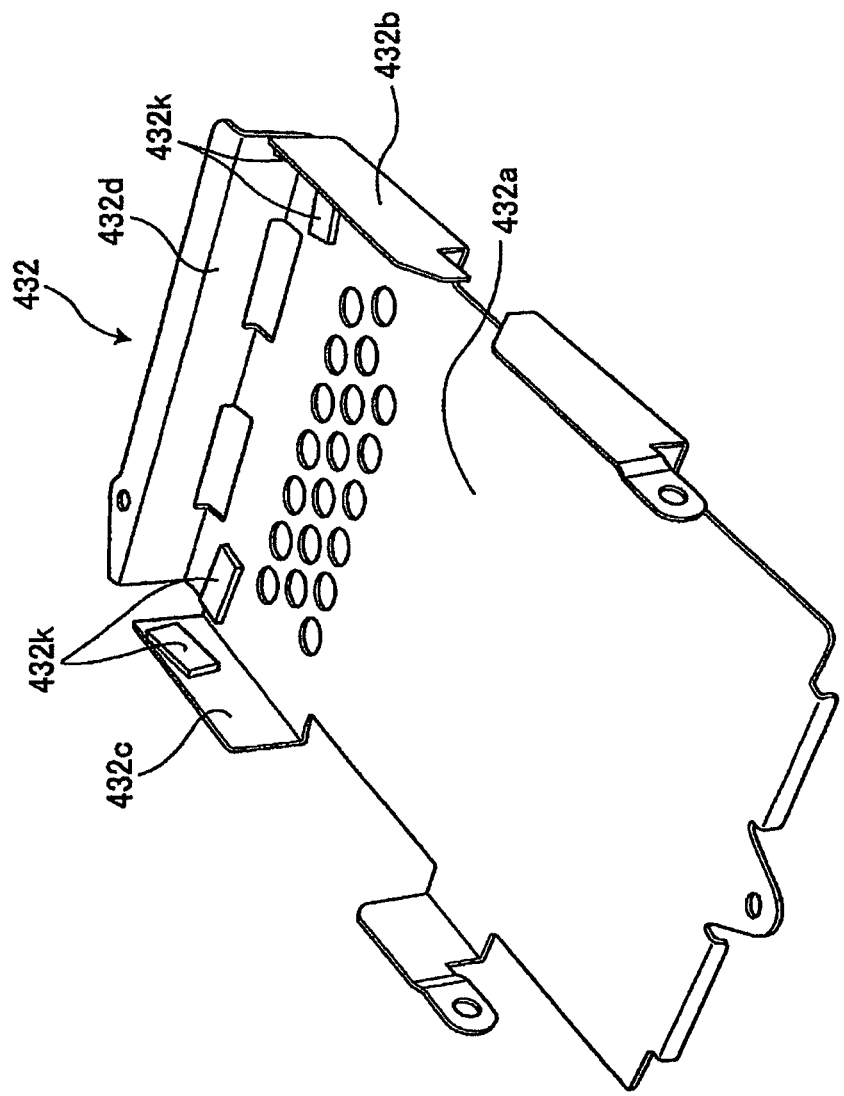
FIG. 21 is a perspective view of the cover member of the HDD unit viewed from a further different angle.

The opening 414 of the HDD unit housing includes an opposite side wall 414*g* and a bottom face 414*i* in addition to the side wall 414*a* on the side of the opening 212 of the battery housing and the front wall 414*c* described above. A connector 415 is arranged on the front wall 414*c*. A protrusion 414*h* is provided on the side wall 414*g* on a side far from the opening 212 of the battery housing so as to protrude toward the inside of the opening 414 of the HDD unit housing. A grounding member 416 protrudes from the bottom face 414*i* on an end portion far from the front wall 414*c*. FIG. 15 and FIG. 16 are perspective views of the HDD unit 430 viewed from different angles. FIG. 17 illustrates the bottom face of the HDD unit 430. FIG. 18 is an exploded perspective view of the HDD unit 430 separated into the HDD body 431 and a cover member 432. FIG. 19, FIG. 20 and FIG. 21 are perspective views of the cover member 432 viewed from different angles.

The HDD unit 430 includes the HDD body 431 and a cover member 432.

Referring to FIG. 18, the HDD body 431 includes a first face 431*a* covered by a cover member 432 and a second face 431*b* (see FIG. 17) being in contact with the bottom face 414*i* (see FIG. 13 and FIG. 14) of the opening 414 of the HDD unit housing and extending in parallel with the first face 431*a*. The HDD body 431 further includes a front end face 431*c*, left and right side faces 431*d* and 431*e*, and a back end face 431*f*, which surround the first surface 431*a* and the second surface 431*b*. As illustrated in FIG. 17, an exposed circuit board 431*g* is provided on the second face 431*b* and a connector 431*h* is provided on an end of the circuit board 431*g*. The connector 431*h* is positioned at around the front wall 414*c* of the opening 414 of the HDD unit housing and connected to the connector 415 as illustrated in FIG. 13 and FIG. 14. The circuit board 431*g* on the second surface 431*b* of the HDD body 431 extends entirely through the length of the HDD body 431. A base body 431*i* made of a resin extends within a partial area on one end of the bottom face of the HDD body 431.

The cover member 432 included in the HDD unit 430 is formed by sheet metal processing. The cover member 432 includes a cover 432*a* for covering the first face 431*a* (see FIG. 18) of the HDD body 431 and left and right bent portions 432*b* and 432*c* bent along the left and right side faces 432*d* and 432*e* of the HDD body 431. The cover member 432 includes a grounding part 432*d* bent along the back end face 431*f* of the HDD body 431. The grounding part 432*d* is in contact with a grounding member 416 (see FIG. 13 and FIG. 14) protruding from the bottom face 414*i* of the opening 414 of the HDD unit housing. The grounding member 416 (see FIG. 13) is positioned immediately outside the back end face 431*f* (see FIG. 18) of the HDD body 431 included in the HDD unit 430 where the HDD unit 430 is accommodated in the opening 414 of the HDD unit housing. Therefore, the grounding part 432d of the cover member 432 (see FIG. 18) mounts the grounding member 416 to thereby electrically connect the grounding part 432d to the grounding member 416.

A hook-like notch 432e is formed on the right side 432b of the cover member 412. The hook-like notch 432e is engaged with the protrusion 414h (see FIG. 13) protruding inside the opening 414 of the HDD unit housing from the right side face of the opening 414 of HDD unit housing. Referring to FIG. 18, the hook-like notch 432e includes a first notch 432f and a second notch 432g. The shape of the first notch 432f is wide in its open end for receiving the protrusion 414h. The first notch 432f accommodates and is engaged with the protrusion 414h when the HDD unit 430 is brought closer to the bottom face 414i while making the second face 431b of the HDD body 431 face the bottom face 414i of the opening 414 of the HDD unit housing. After moving the second face 431b (see FIG. 17) of the HDD body 431 to be in contact with the bottom face 414i of the opening 414 of the HDD unit housing, the front end face 431c of the HDD body 431 is moved in a direction approaching the front wall 414c (see FIG. 18) of the opening 414 of the HDD unit housing. Referring to FIG. 18, the second notch 432g continues from the first notch 432f and is provided to accommodate the protrusion 414h (see FIG. 13) while the front end face 431c of the HDD body 431 moves in the direction approaching the front wall 414c (see FIG. 18) of the front wall 414c of the opening 414 of the HDD unit housing. When the front end face 431c of the HDD body 431 is moved in the direction approaching the front wall 414c (see FIG. 18) of the front wall 414c of the opening 414 of the HDD unit housing, the connector 431h (see FIG. 17) is connected to the connector 415 in the front wall 414c (see FIG. 13) of the opening 414 of the HDD unit housing. With this connection, power is appropriately supplied to the HDD unit 430. Further, a signal is transmitted and received between the HDD unit 430 and the notebook PC 10.

As described, the second face 431b is directed to the bottom face 414i of the opening 414 of the HDD unit housing and the front end face 431c (see FIG. 18) of the HDD body 431 is directed to the front wall 414c (see FIG. 13) of the opening 414 of the HDD unit housing. Then, the HDD unit 431 is moved on a side of the bottom face 414i. Hereinafter, the mentioned movement is referred to as "first movement". After the first movement, the HDD unit 430 is moved in a direction of making the front end face 431c (see FIG. 17) approach the front wall 414c (see FIG. 13). Hereinafter, the mentioned movement is referred to as "second movement". The HDD unit 430 is accommodated in the opening of the HDD unit housing with two stage motions of the first movement and the second movement. A positional relationship between the protrusion 414h and the first notch 432f may be determined such that the grounding member 416 is in contact with the base body 431i (see FIG. 17) of the second face 431b of the HDD body 431 with the first movement. Therefore, in the second movement after the first movement, the grounding member 416 (see FIG. 13) grazes only the base body 431i of the HDD body 431 in the second movement (see FIG. 17) after the first movement. The grounding member 416 is not in contact with the exposed circuit board 431g in the motions of accommodating the HDD unit 430 in the opening 414 of the HDD unit housing and of taking out the HDD unit 430 from the opening 414 of the HDD unit housing. As described, the circuit board 431g is prevented from being in contact with or grazing the grounding member 416. Thus, the breakage of circuit board can be prevented. By forming the protrusion 414h and the hook-like notch 432e, the grounding member 416 can be securely arranged on the bottom face 414i of the opening 414 of the HDD unit housing. As described, a degree of freedom in laying out the parts and components using the protrusion 414h and the hook-like notch 432e.

Referring to FIG. 13, the protrusion 414h is formed on only the right side face 414g of the right and left side faces 414a and 414g of the opening 414 of the HDD unit housing and is not formed on the left side face 414a adjacent to the opening 212 of the battery housing. The HDD unit 430 is relatively pervious to the vibration and it is preferable to prevent vibration around the HDD unit 430 as far as possible. The reason why the protrusion 414h is formed only on the side face 414g of the both side faces 414a and 414g is to prevent the vibration. As described, by making the only the side face 414g be in contact with the HDD unit 430, a vibration transmission amount to the HDD unit 430 is restricted. Further, another reason is that it is sufficient to restrict the motion of the HDD unit 430 only on one side using the protrusion 414h and the hook-like notch 432e.

Referring to FIG. 18, screw holes 431n are formed at two positions respectively on the side faces 431d and 431d near the front end face 431c and the back end face 431f. A screw hole 432h is formed in each of the left and right bent portions 432b and 432c of the cover member 432. The hole 432h is formed in an arm 432i in a cantilever shape of each of the left and right bent portions 432b and 432c. The cover member 432 is fixed to the HDD body 431 by two screws inserted into the right and left holes 432h and the corresponding screw holes 431n near the front end face 431c, namely at one right position and one left position. The reason why only the one right position and the one left position are used is to prevent vibration from transmitting to the HDD body.

Referring to FIG. 21, cushions 432k are attached to the inner face of the cover 432a on the side of the grounding part 432d and the inner faces of the left and right bent portions 432b and 432c on the side of the grounding part 432d. With the cushions 432k, portions of the HDD body 431 at portions on the first face 431a near the back end face 431f and portions on the left and right side faces 431d and 431d near the back end face 431f are supported. The reason why only the cushions 432k are used is to prevent vibration from transmitting to the HDD body 431.

(Speaker Attaching Structure)

As illustrated in FIG. 2 and FIG. 3, the pair of right and left sound emitting holes 24 is formed on the far side on the upper surface of the computing unit 20. The speakers (described below) are arranged immediately inside the sound emitting holes 24. Sound generated by the speakers are emitted outside from the sound emitting holes 24.

Figure 22:
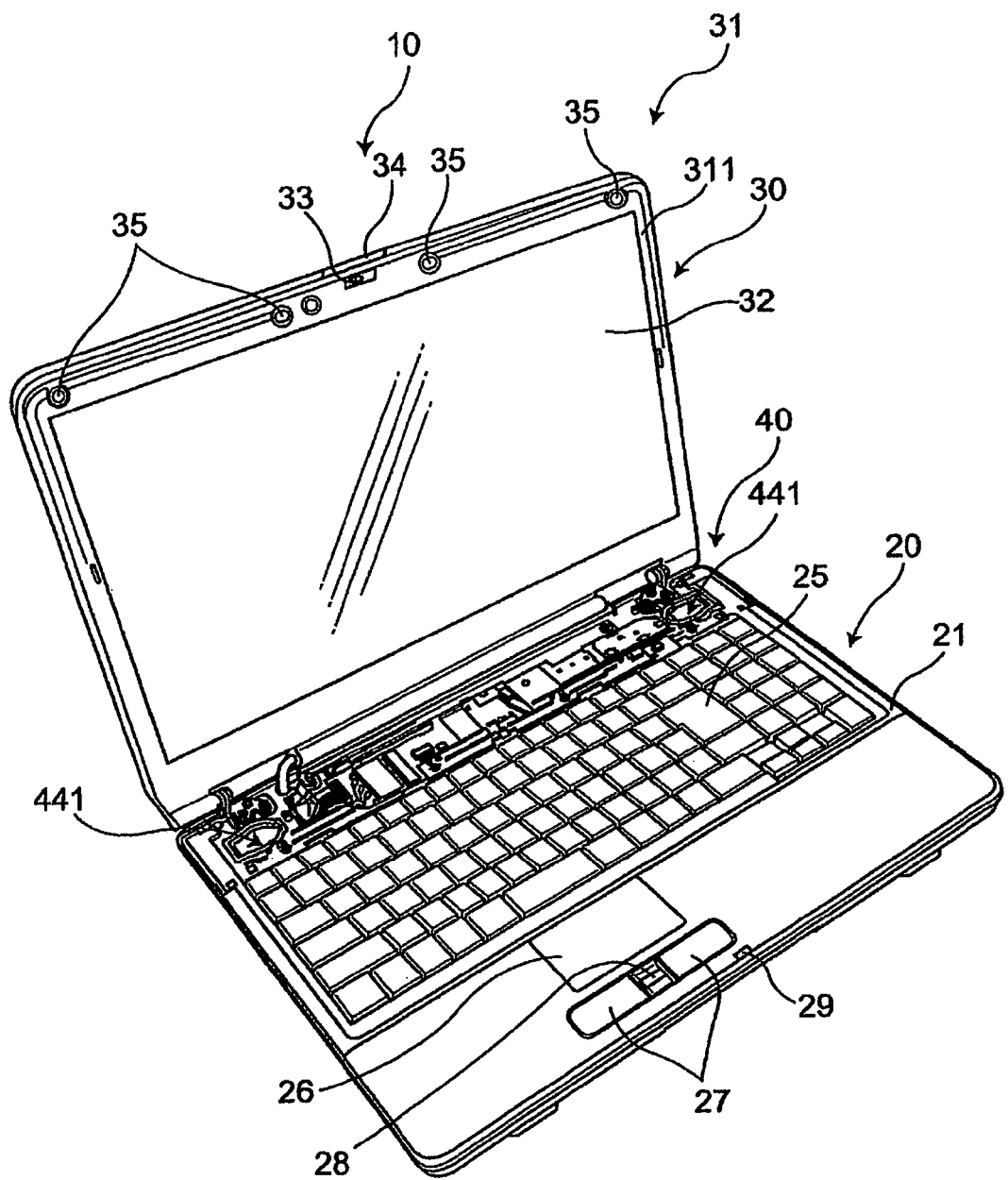
FIG. 22 illustrates the notebook PC from which a cover member on an upper side of the computing unit and a speaker are removed.
Figure 23:
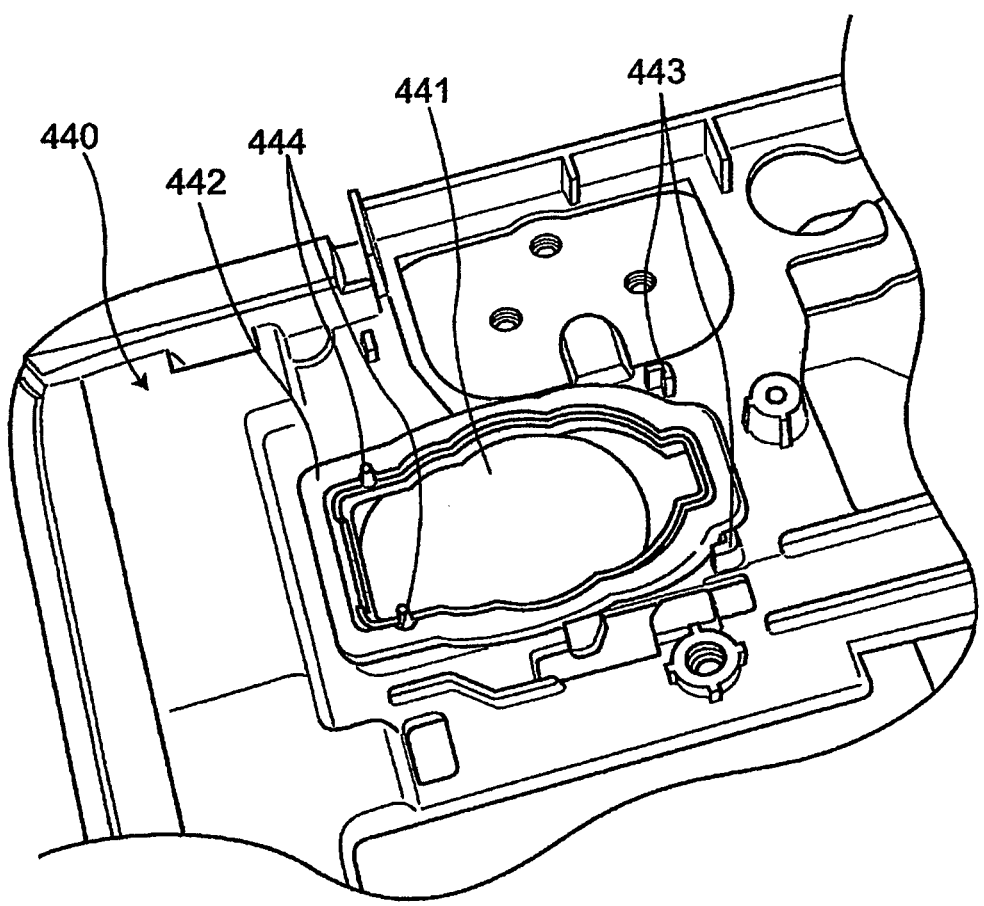
FIG. 23 is an enlarged perspective view of a speaker area on the left side of the notebook PC.
Figure 24:
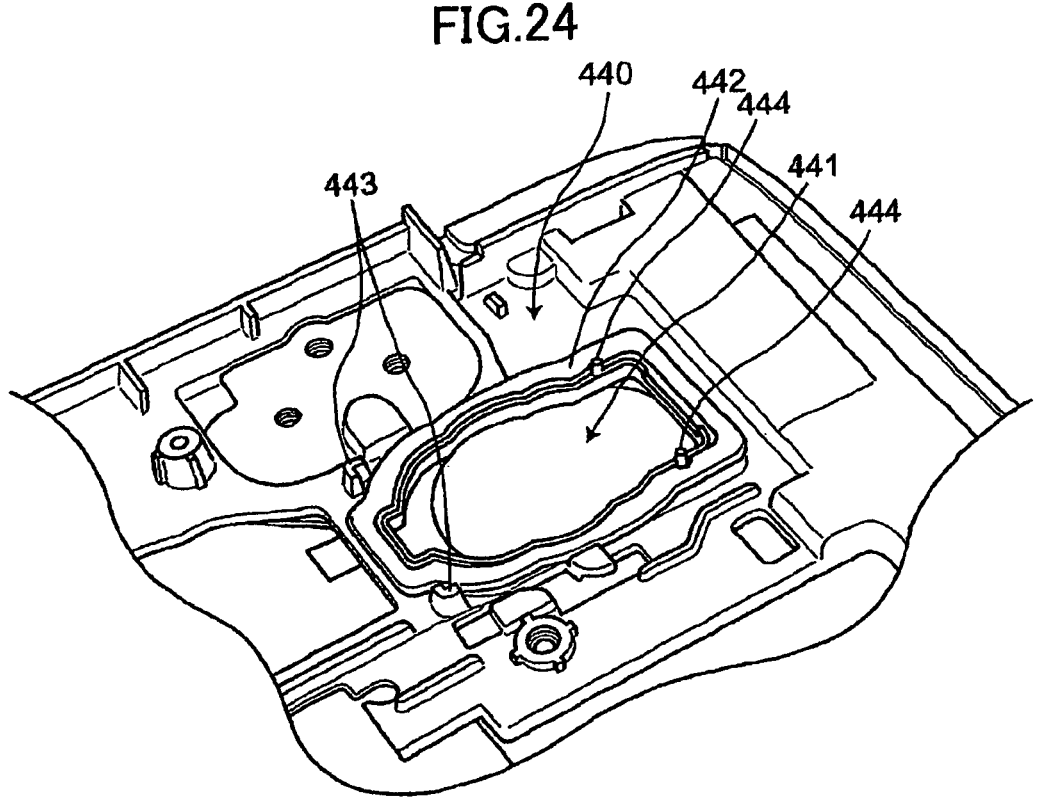
FIG. 24 is an enlarged perspective view of the speaker area on the right side of the notebook PC.

FIG. 22 illustrates the notebook PC from which a cover member on an upper side of the computing unit and the speakers are removed. The power button 22, the function buttons 23, and the sound emitting holes are provided in the cover member and removed along together with the cover member. FIG. 23 and FIG. 24 are enlarged views of the left and right speaker areas. Referring to FIG. 23 and FIG. 24, disassembly of the notebook PC 10 has further proceeded, namely the keyboard 25 is removed from the state illustrated in FIG. 22 and the display unit 30 is also removed.

The pair of right and left speaker areas 441 is formed on the base plate 440. These speaker areas 441 include openings of special shapes which are formed on the base plate 440. Around the openings forming the speaker areas 441, pressure-sensitive adhesive double coated tapes 442 are attached. The pressure-sensitive adhesive double coated tape 442 is cushioned and has an annular shape surrounding a periphery of the opening by one turn without a seam. Each of the speaker areas 441 has two standing pieces 443 for aligning the speaker (described below) and two standing pins 444.

Figure 25:
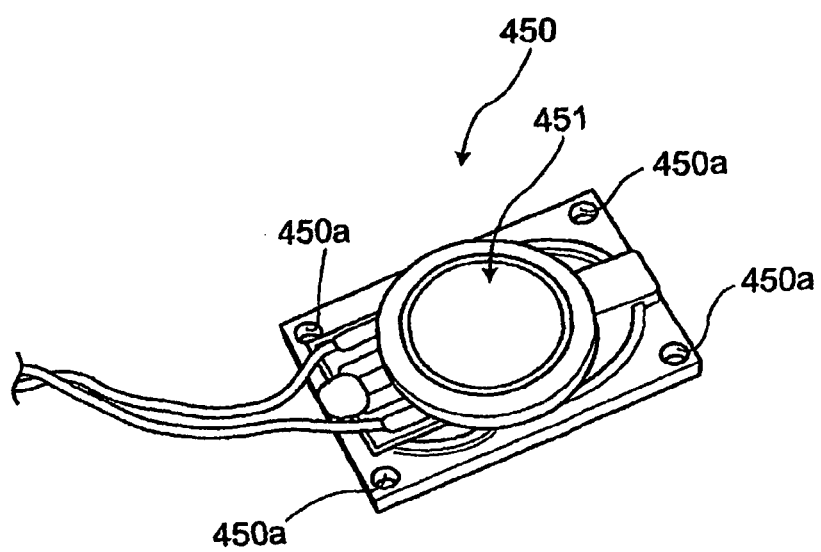
FIG. 25 is a perspective view of the speaker viewed from a back surface side of the notebook PC.

FIG. 25 is a perspective view of the speaker viewed from a back surface side of the notebook PC.

The speaker 450 has a sound emitting face 452 (see FIG. 26 and FIG. 27) for emitting sound with vibration on the opposite face of a back face 451 illustrated in FIG. 25. The speaker 450 is shaped like a rectangle in plan views of the back face 451 and the sound emitting face 452. Holes 450a are formed in four corners of the rectangle. The back face of the speaker 450 specially protrudes as illustrated in FIG. 25. The opening formed in the speaker area 441 of the base plate 440 has a shape of accommodating a back face of the speaker 450. The opening is formed to partially support a periphery of the speaker 450 as described below.

Figure 26:
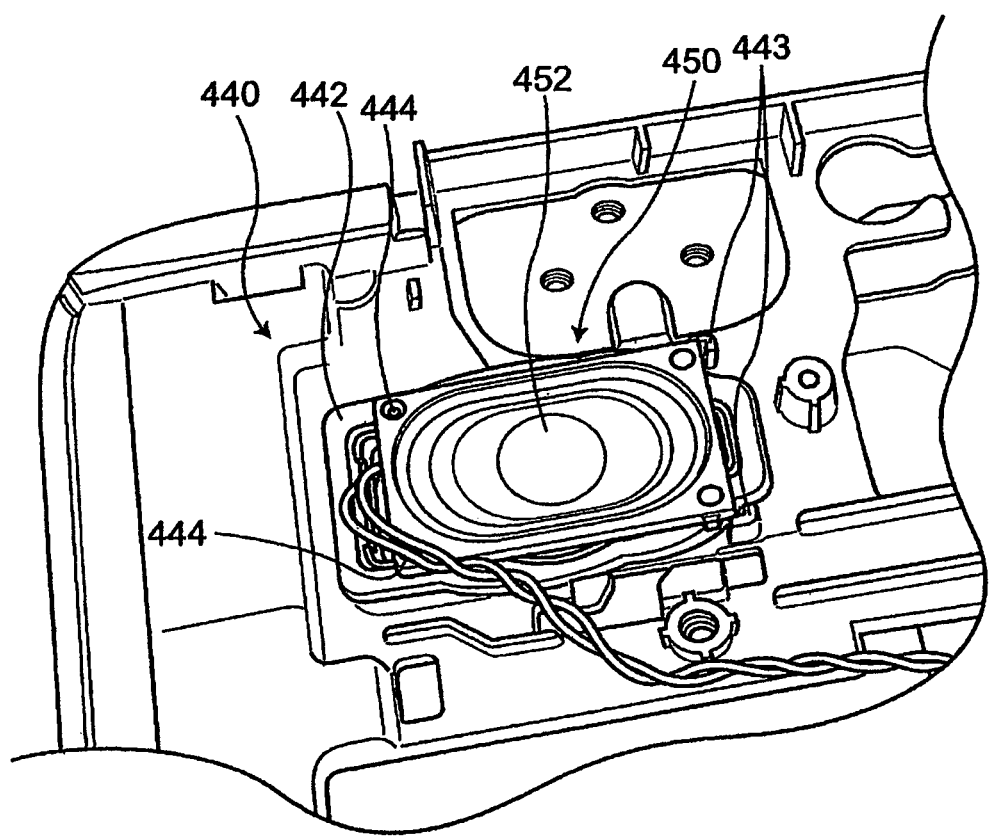
FIG. 26 is an enlarged perspective view of the notebook PC in which the speaker is mounted on the speaker area on the left side of the notebook PC.
Figure 27:
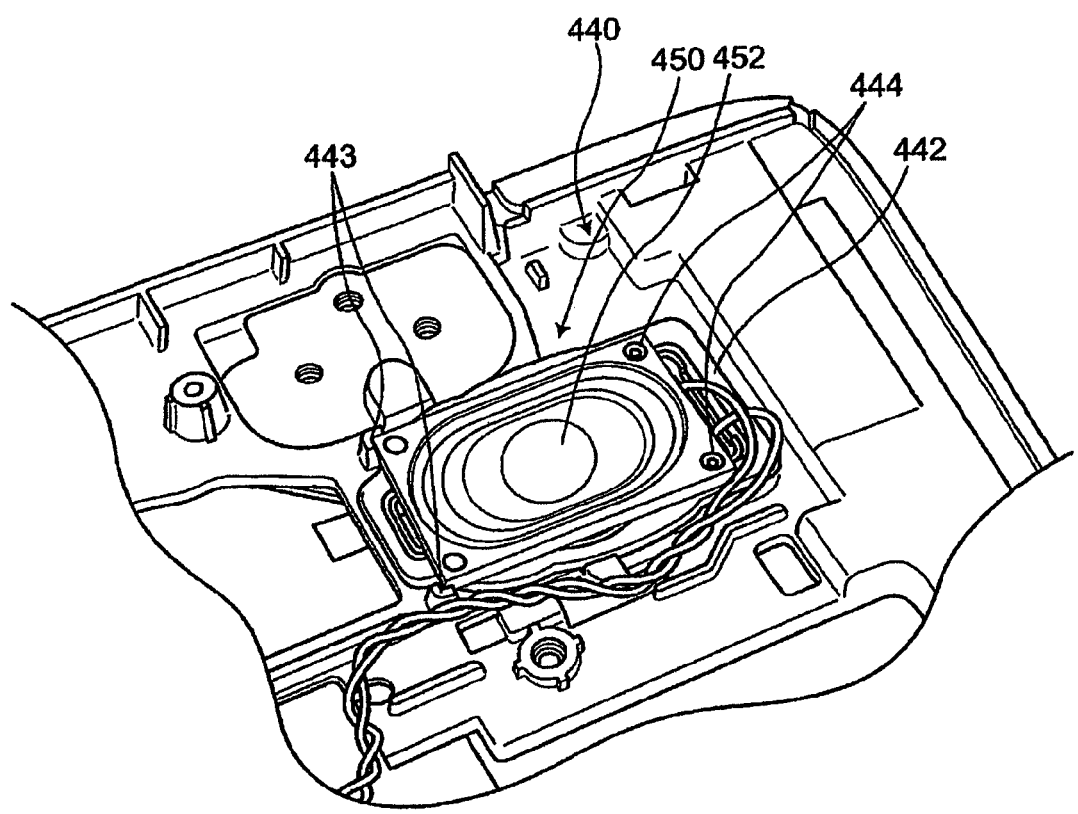
FIG. 27 is an enlarged perspective view of the notebook PC in which the speaker is mounted on the speaker area on the right side of the notebook PC.

FIG. 26 and FIG. 27 are enlarged perspective views of the notebook PC in which the speakers have been mounted on the speaker areas on the right and left sides of the notebook PC 10.

The speaker 450 is arranged so that a protrusion on a the back face 451 (see FIG. 25) is accommodated in the opening and the periphery of the back face mounts the pressure-sensitive adhesive double coated tape 442. The speaker 450 is aligned so that the two corners of the rectangle are fit to the standing pieces 443 and the standing pins 444 are inserted into the two holes of the four holes 450a.

The special opening is formed in the speaker area 441, and the pressure-sensitive adhesive double coated tape 442 is placed so as to trace the edge of the special opening. Therefore, the speaker 450 is arranged in the speaker area 441 while the peripheral edges of the back face 451 may intermittently overlap the pressure-sensitive adhesive double coated tape 442. Specifically, the four corners of the speaker 450 overlap the pressure-sensitive adhesive double coated tape 442, and middle portions of four sides of the rectangle may not overlap the pressure-sensitive adhesive double coated tape 442 because the pressure-sensitive adhesive double coated tape 442 outwardly surrounds the speaker 450 at around the sides of the rectangle as illustrated in FIG. 27. By using the cushioned pressure-sensitive adhesive double coated tape 442, it is possible to prevent vibration of the speaker 450 from transmitting to the base plate 440. Further, by intermittently supporting the peripheral edges of the speaker 450, it is possible to further prevent the vibration of the speaker 450 from transmitting to the base plate 440.

Figure 28:
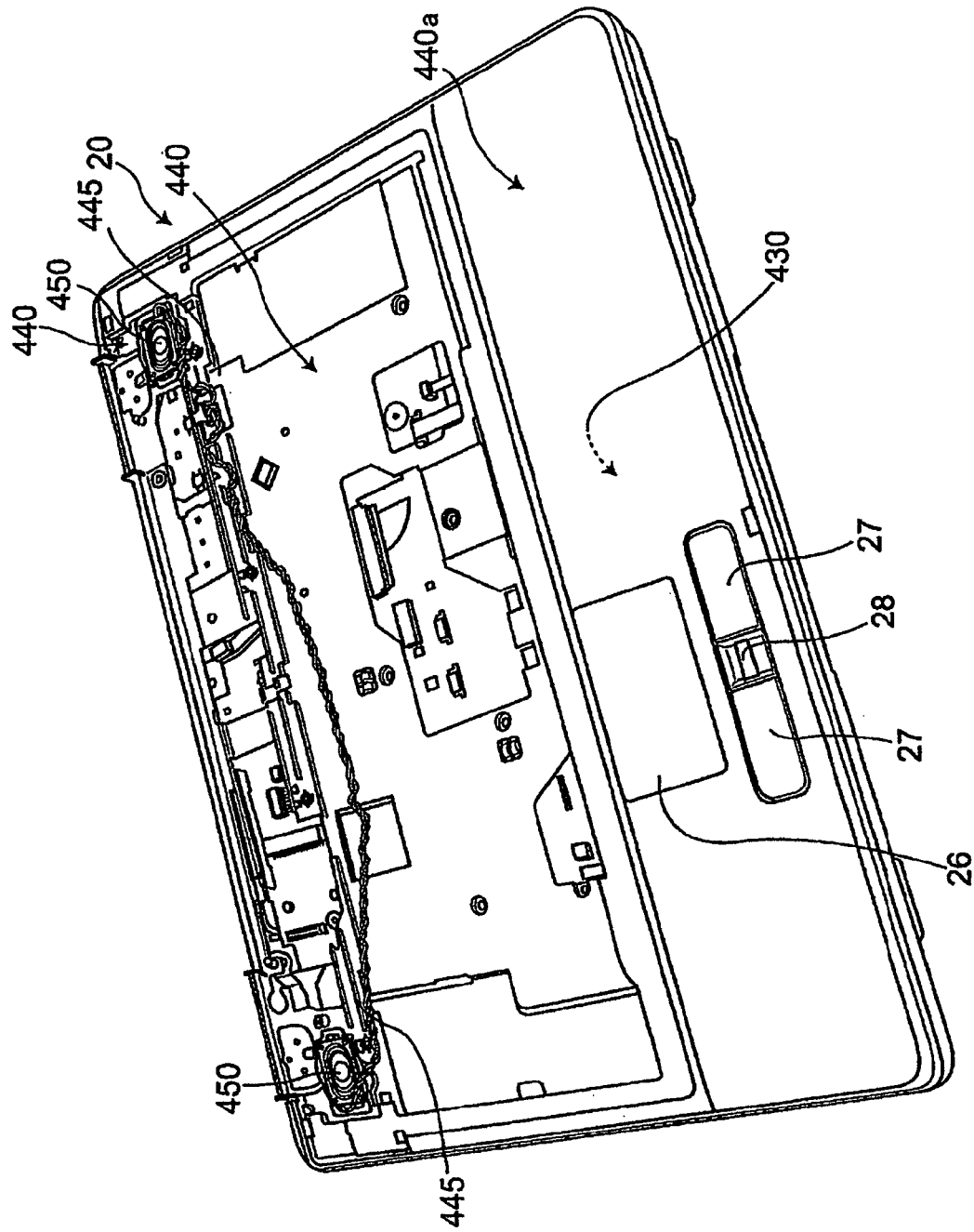
FIG. 28 illustrates an upper surface of the computing unit from which the cover member covering the speaker and a key board are removed.
Figure 29:
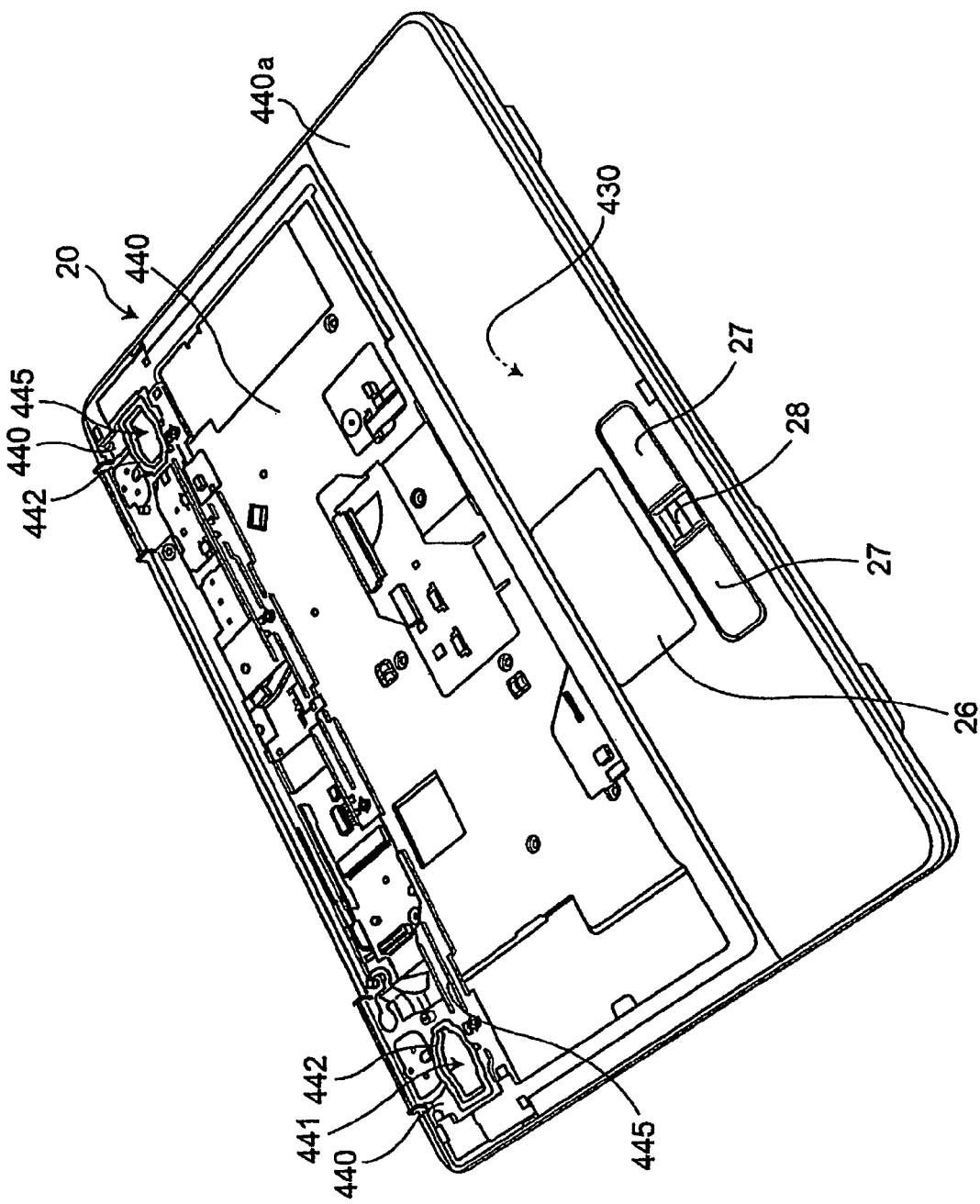
FIG. 29 illustrates the upper surface side of the computing unit illustrated in FIG. 28 from which the speakers are removed.

FIG. 28 illustrates the upper surface of the computing unit from which the cover member covering the speaker and the keyboard are removed. FIG. 29 illustrates the upper surface side of the computing unit illustrated in FIG. 28 from which the speakers are removed.

The base plate 440 functions as the supporting member which extends below the keyboard 25 to support the keyboard 25. The base plate 440 forms the outer surface of the computing unit 20 on the near side of the keyboard 25. The base plate 440 is an upper cover for covering the upper surface of the casing of the computing unit 20. In the base plate 440, the speaker areas 441 (see FIG. 22) are connected to an area extending below the keyboard by narrow arms 445. The HDD unit 430 is mounted on a far side viewed from the side of the speakers 450. The HDD unit 430 is relatively pervious to vibration. The reason why the arm 445 is provided in the base plate 440 may be prevention of vibration of the speakers 450 transmitting to the keyboard and the HDD unit 430 on the far side of the key board.

(Click Button Structure)

Figure 30:
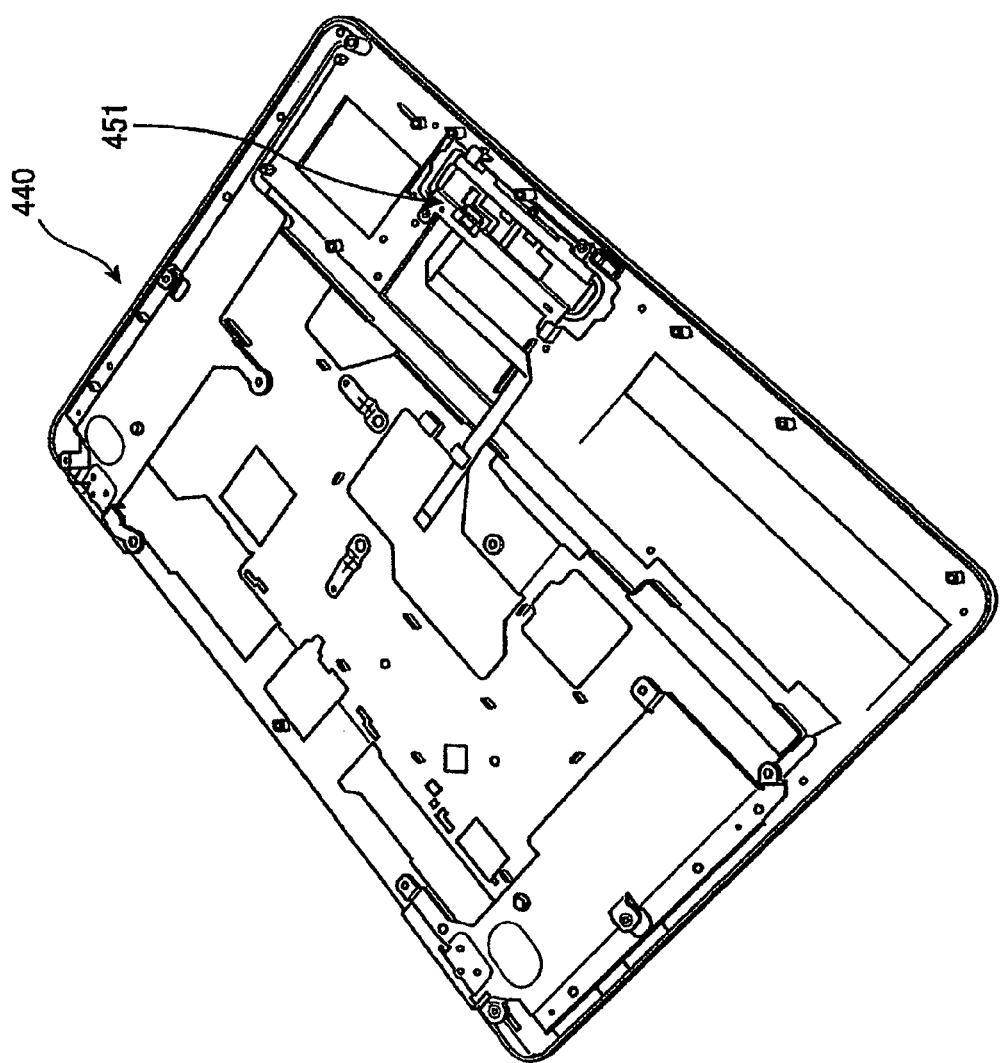
FIG. 30 illustrates the back surface side of an upper cover used also as a base plate for supporting the speakers.
Figure 31:
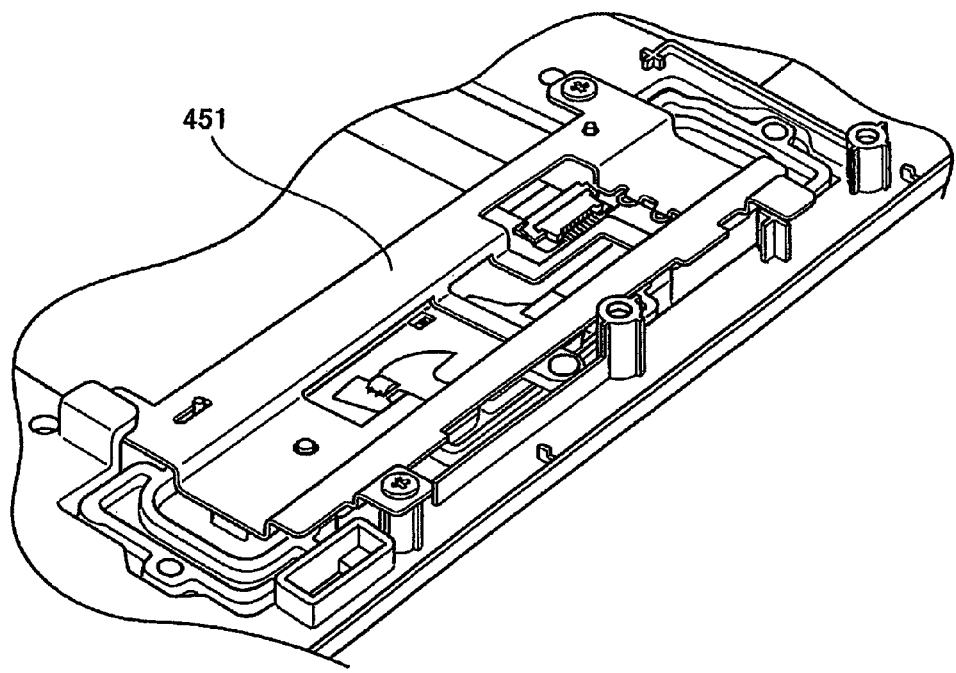
FIG. 31 is an enlarged perspective view illustrating a supporter provided on the back face of the upper cover.

FIG. 30 illustrates the back surface side of an upper cover used also as the base plate for supporting the above-described speakers. FIG. 31 is an enlarged perspective view illustrating a supporter provided on the back face of the upper cover.

Referring to FIG. 30 and FIG. 31, the supporter 451 positioned on the back face of the upper surface cover 440a is illustrated. On the opposite front face of the upper surface cover 440a, a fingerprint sensor 28 and right and left operations buttons 27 sandwiching the fingerprint sensor 28 as illustrated in FIG. 2 and FIG. 29 are provided.

Figure 32:
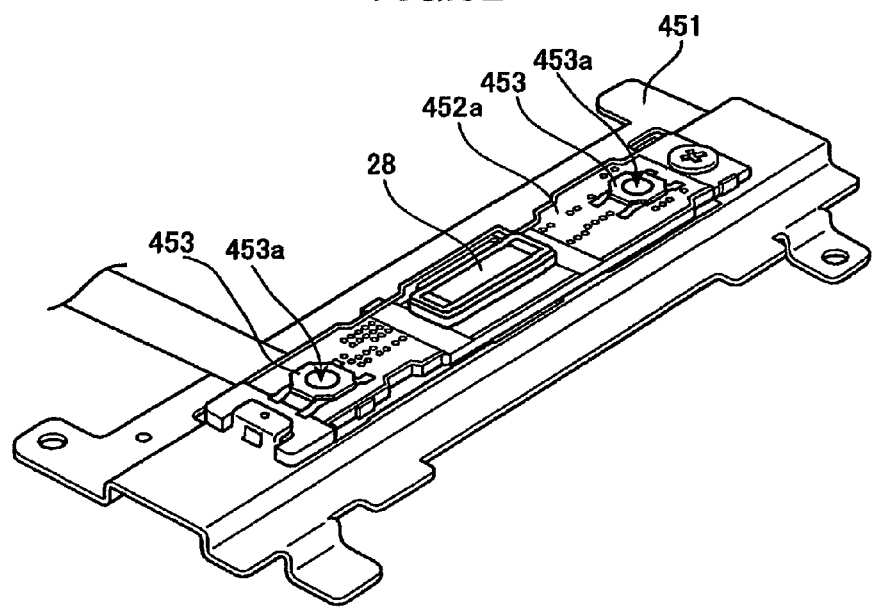
FIG. 32 is an enlarged perspective view of the supporter on its upper surface side where the supporter is removed from the front face cover.

FIG. 32 is an enlarged perspective view of the supporter 451 removed from the front face cover and directed to expose the upper side opposite to the bottom face illustrated in FIG. 30 and FIG. 31.

Figure 33:
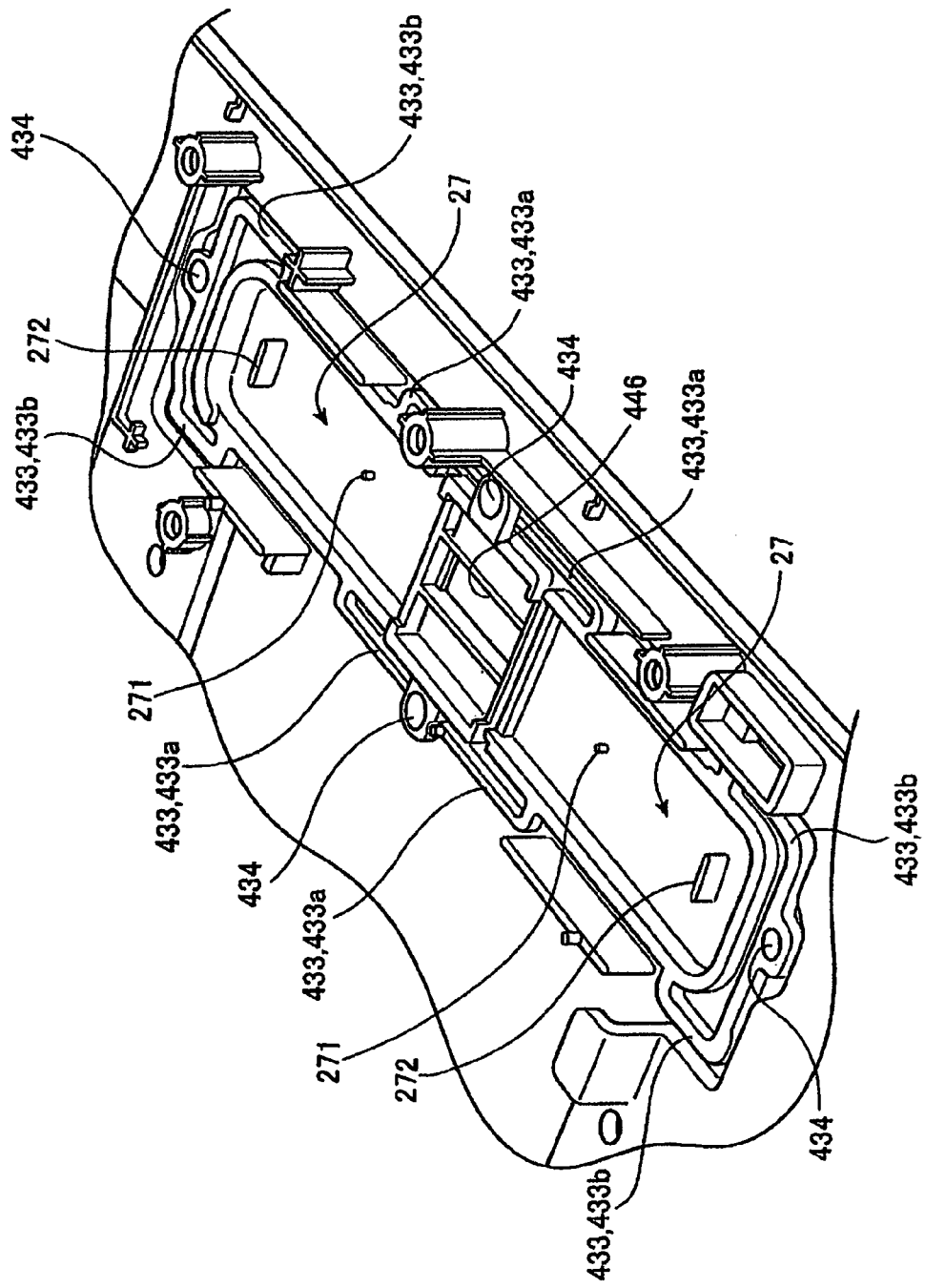
FIG. 33 is a perspective view illustrating inner faces of two operations buttons sandwiching a fingerprint sensor where the supporter attached to the main circuit board is removed.
Figure 34:
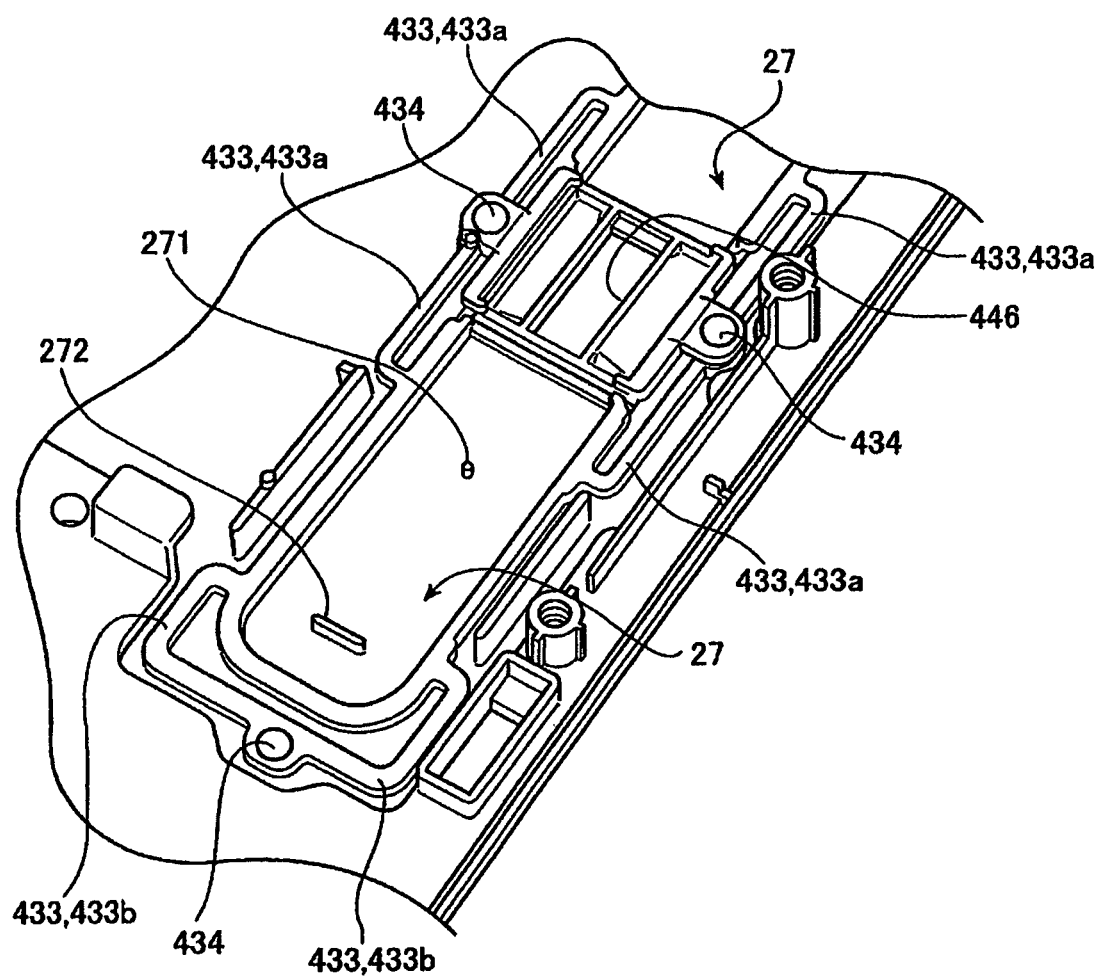
FIG. 34 is an enlarged view of the inner face of a right operations button.
Figure 35:
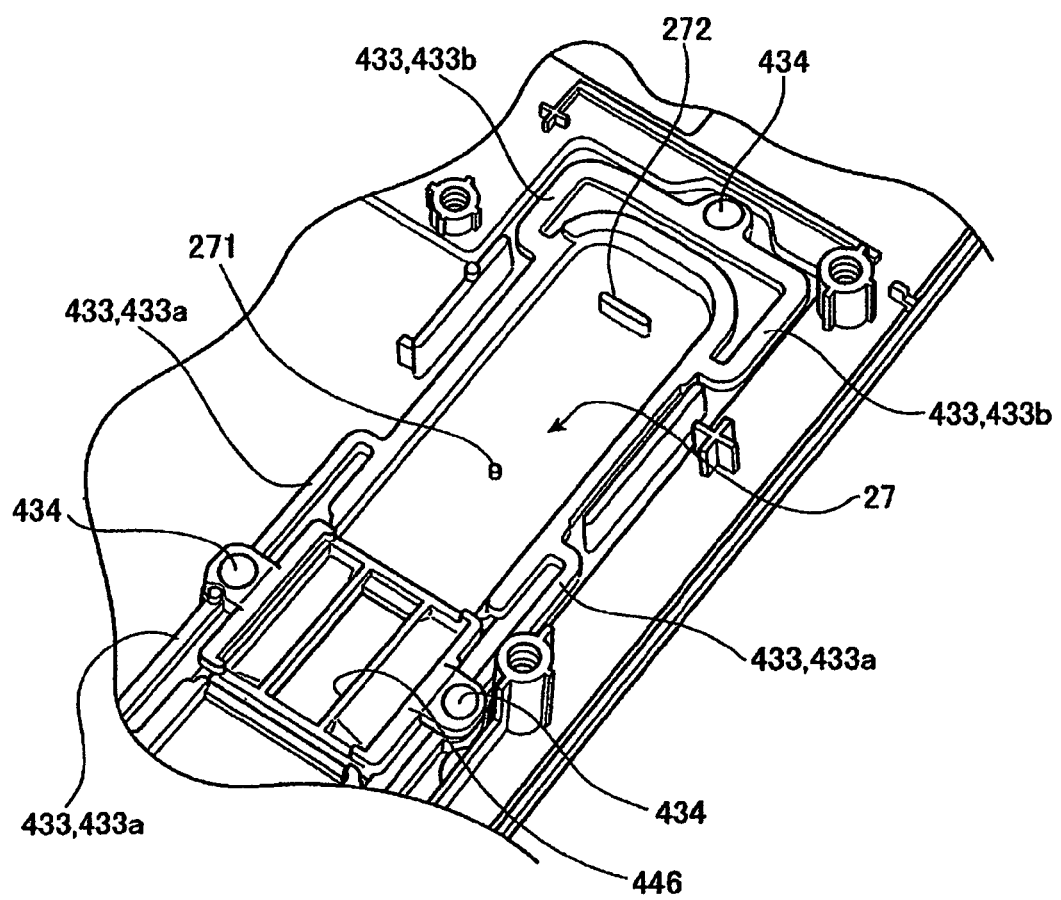
FIG. 35 is an enlarged view of the inner face of a left operations button.

Referring to FIG. 32, the circuit board 452a is fixed to the upper face of the supporter 451. On the left and right sides of the fingerprint sensor 28 on the circuit board 452a, the switches 453 are mounted. The fingerprint sensor 28 is exposed on the upper surface of the computing unit 20 from an opening 446 (see FIG. 33) formed on the upper surface cover. Statuses of the right and left switches 453 are changed upon pressing of pressure points 453a in the centers of the switches 453. As the structure of the switches 453, if the operations buttons 27 (see FIG. 2 and FIG. 29) on the upper surface of the computing unit 20 are pushed, the pressure points 453a are pushed by the operations buttons 27. FIG. 33 is a perspective view illustrating insides of the two operations buttons sandwiching the fingerprint sensor 28 where the supporter 451 (see FIG. 31 and FIG. 32) attached to the circuit board 452a is removed. FIG. 34 and FIG. 35 are enlarged perspective views illustrating insides of the right and left operations buttons.

Referring to FIG. 33 to FIG. 35, the operations buttons have a substantially rectangular shape extending left and right the notebook PC 10. The operations buttons 27 have action pins 271 protruding from the inner faces of the operations buttons at positions closer to the opening 446 for providing the fingerprint sensor 48 from the centers of the rectangles. The action pins 271 face the pressure points 453a of the switches 453 on the circuit board 452a. Said differently, the distance between centers of the two operations buttons 453 is grater than the distance between the switches 453. If the operations button 27 is pushed, the action pin 271 pushes the pressure point 453a of the switch 453 to thereby change the status of the switch 453. The operations switches 27 have ribs 272 protruding from insides of the operations switches 27 at positions being outwardly apart from the action pins 271 from the centers of the rectangles. The rib 272 hits the upper face of the supporter 45 (see FIG. 32) if the operations switch 27 is strongly pushed to thereby prevent the operations button from being pushed any more.

Referring to FIG. 33, four elastic arms 433 extend from peripheries of the operations button 27 and fixed to the upper surface cover by fixing pins 434. The elastic arms 433 support the operations button 27 to the upper surface cover and elastically deform to displace the operations button 27 if the operations button 27 is pushed. Although the operations button 27 has the four elastic arms 433, 433a, 433b, the two elastic arms 433a connected on the side of the opening 446 among the four elastic arms 433, 433a, 433b are relatively thin (a narrow feature in width) and the other two elastic arms 433b connected on the side apart from the opening 446 are relatively thick (a wide feature in width). The difference of the width relates to the shifted position of the action pin 271 on the operations button closer to the side of the opening 446. The sizes of the operations buttons 27 may be large in comparison with the widths of fingers in right and left directions. Therefore, the operations button 27 may be pushed on the side closer to the opening 446 or on the side apart from the opening 446. Referring to FIG. 32, irrespective of positions where the operations button is pushed, it is preferable to operate the switch 453 with the action pin 271.

By adopting the relatively narrow feature for the elastic arm 433a supporting the side of the operations button 27 closer to the opening 446, the side closer to the opening 446 is supported with a relatively small elastic coefficient. By adopting the relatively wide feature for the elastic arm 433b supporting the side of the operations button 27 apart from the opening 446, the side apart from the opening 446 is supported with a relatively large elastic coefficient. With these features, the switches 453 are certainly pushed and operated. Said differently, if a position of the operations button 27 closer to the opening 446, i.e., a position of the operations button 27 closer to the elastic arm 433a than the elastic arm 433b, is pushed, the pushing force causes the elastic arms 433a on the side of the opening 446 to deflect thereby pushing the switch 453 with the action pin 271. If a position of the operations button 27 apart from the opening 446, i.e., a position of the operations button 27 closer to the elastic arm 433b than the elastic arm 433a, is pushed, the pushing force scarcely causes the elastic arms 433b on the side apart from the opening 446 to deflect due to their wide features and causes the elastic arms 433a on the side of the opening 446 to deflect thereby pushing the switch 453 with the action pin 271. Therefore, even if the side of the operations button 27 apart from the opening 446 is pushed, the switch 453 is securely pushed by the action pin 271.

Assuming that the action pin 271 is formed in the center of the operations button 27, the switch 453 is arranged so as to face the action pin 271 (see FIG. 32). Then, the size of the circuit board 452 having the switch 453 becomes large and therefore the size of the supporter 451 also becomes large. In this case, the circuit board 452a or the like becomes large to reduce a space for arranging the parts and components. Therefore, compact or high-density mounting are not achieved.

On the other hand, the size of the operations button 27 can be reduced so that the action pin 271 is positioned at the center of the operations button 27 while maintaining the position of the switch 453 illustrated in FIG. 32. However, the arrangement and dimensions of the operations button 27 may influence operability and design of the notebook PC 10. Therefore, the center of the operations button may not overlap the switch 453.

By changing the widths of the elastic arms, the above-mentioned situations are considered and a degree of freedom in determining the dimensions and arrangement of the operations button 27 relative to the arrangement of the switch 453 is enhanced.

If the side of the operations button 27 closer to the action pin 271 is supported with a relatively small elastic coefficient and the side of the operations button 27 apart from the action pin 271 is supported with a relatively large elastic coefficient, the switch is certainly pushed. As such, by adjusting the widths of the elastic arms 433, the switch 453 is certainly pushed. However, without adjusting the widths of the elastic arms 433 or together with the adjustment of the widths of the elastic arms 433, other factors may be adjusted. Examples of the other factors are the lengths of the elastic arms and the number of the elastic arms that are connecting positions between the elastic arms and the operations button 27. Said differently, the longer the elastic arm 433 there is, the smaller the elastic coefficient becomes. The shorter the elastic arm 433 is, the greater the elastic coefficient becomes. Meanwhile, the greater the number of the elastic arms 433 is, the greater the elastic coefficient becomes. Meanwhile, the closer the connecting position between the elastic arm and the operations button 27 is, the more the influence of pushing of the operations button 27 on pushing of the action pin 271 becomes.

(Connector Attaching Structure)

Figure 36:
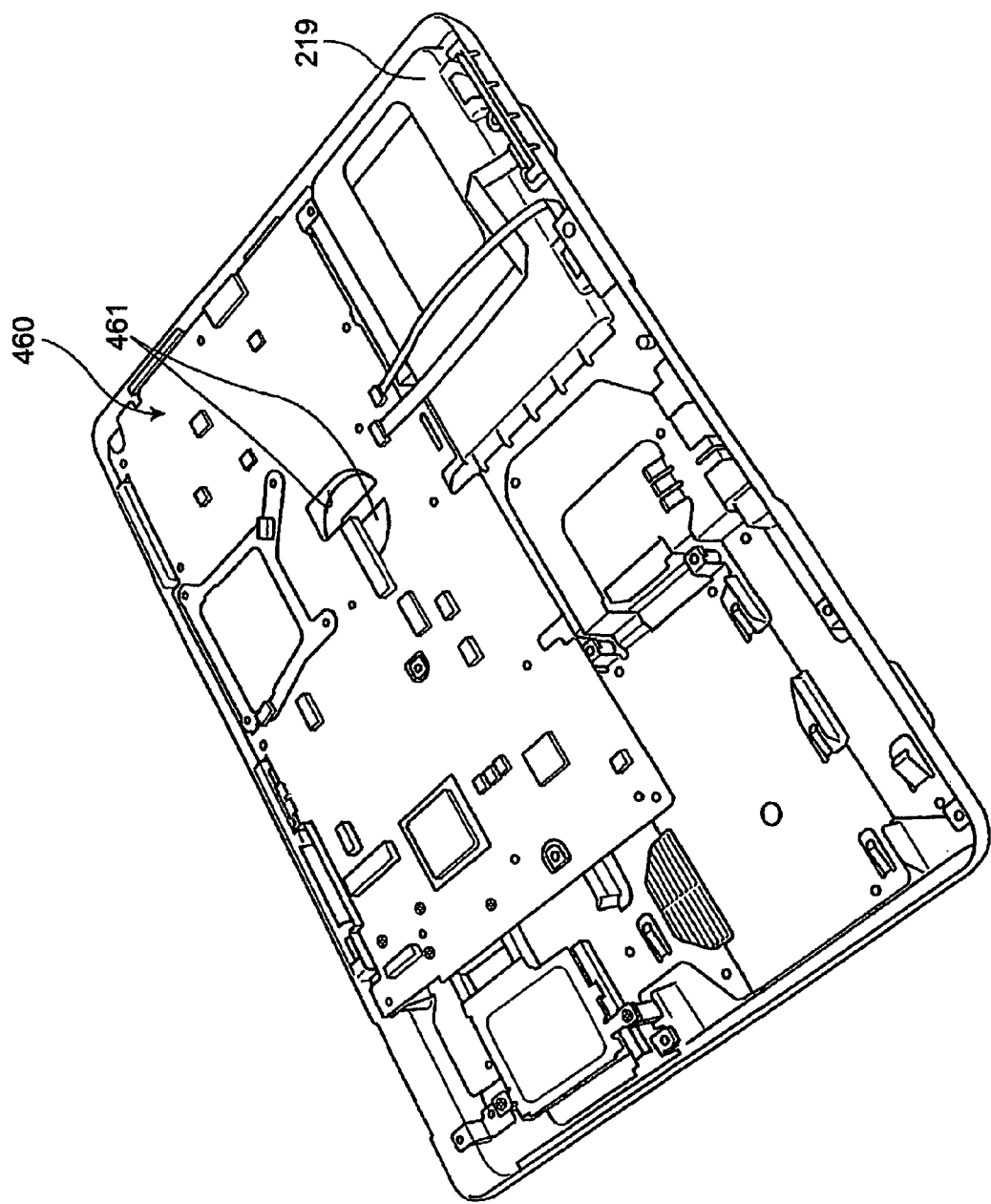
FIG. 36 is a perspective view of the computing unit from which the upper cover is removed.

FIG. 36 is a perspective view of the computing unit from which the upper cover is removed.

Referring to FIG. 36, the upper surface cover 440a illustrated in FIG. 30 is removed from the computing unit illustrated in FIG. 29.

FIG. 36 illustrates an inner face of the bottom surface cover 219 on the side of the bottom surface of the casing 21 of the computing unit 20 illustrated in FIG. 2. A main circuit board 460 widely spreading on the bottom surface cover 219 is installed in the bottom surface cover 219. Referring to FIG. 36, an opening 461 is formed to send air to a fan 471 (see FIG. 37) to be described later.

Figure 37:
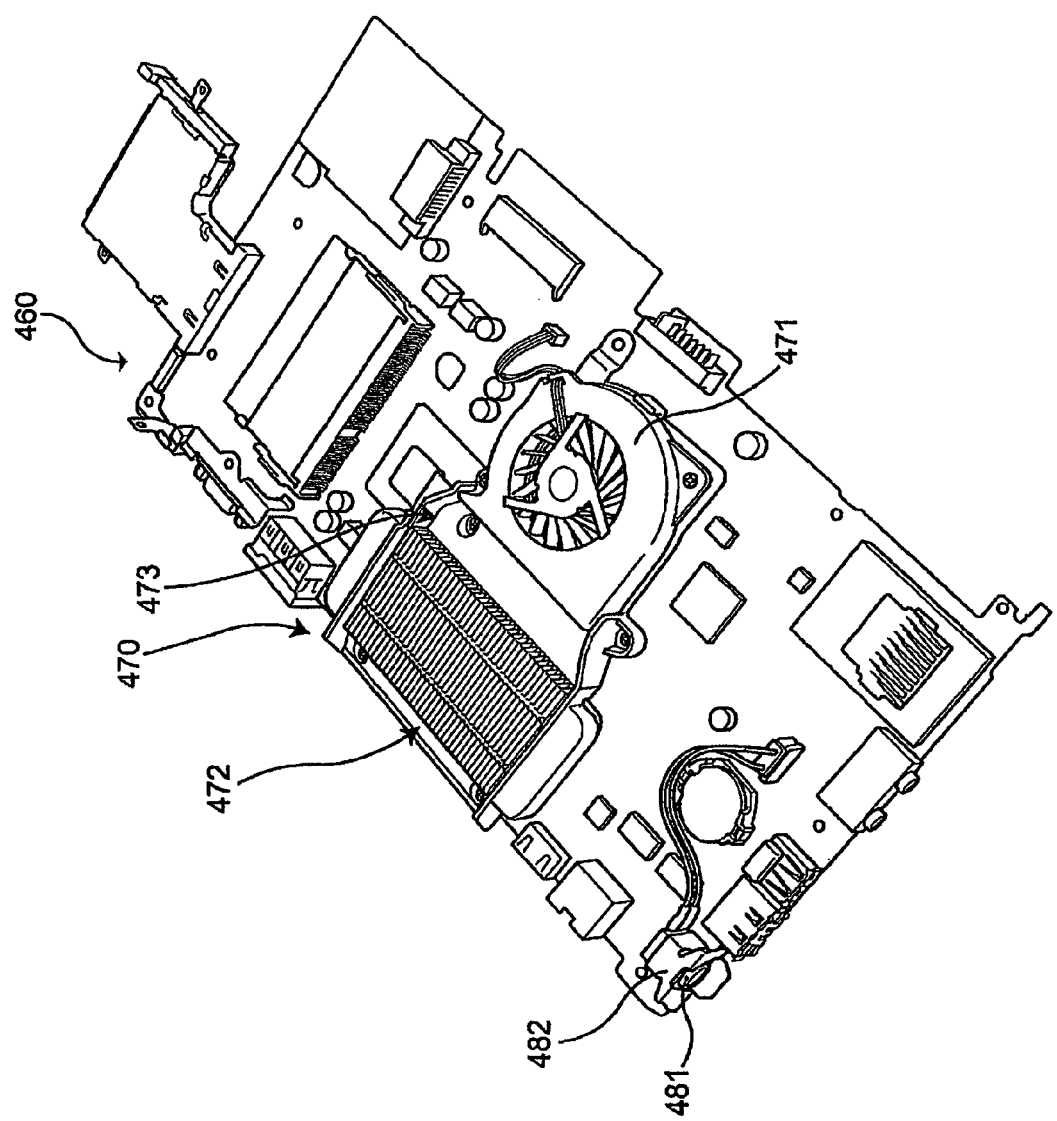
FIG. 37 is a perspective view of a main circuit board.

FIG. 37 is a perspective view illustrating a back side face of the main circuit board 460 facing the face of the bottom surface cover 219 illustrated in FIG. 36. On the main circuit board 460 illustrated in FIG. 37, many parts and components are densely arranged. Among the parts and components, only selected parts and components are described. Referring to FIG. 37, a heat dissipating module 470 as a heat generating electric component for air-cooling the CPU module 462 (see FIG. 45) is installed in the main circuit board 460. The heat dissipating module 470 includes a fan 471, a heat dissipating fin 472, and a base body 473 for supporting the fan 471 and the heat dissipating fin 472. Detailed description of the heat dissipating module 470 is given later. The main circuit board 460 has a power connector 481 and a supporter 482 for supporting the power connector 481. Hereinafter, the power connector 481 and the supporter 482 supporting the power connector 481 are described.

Figure 38:
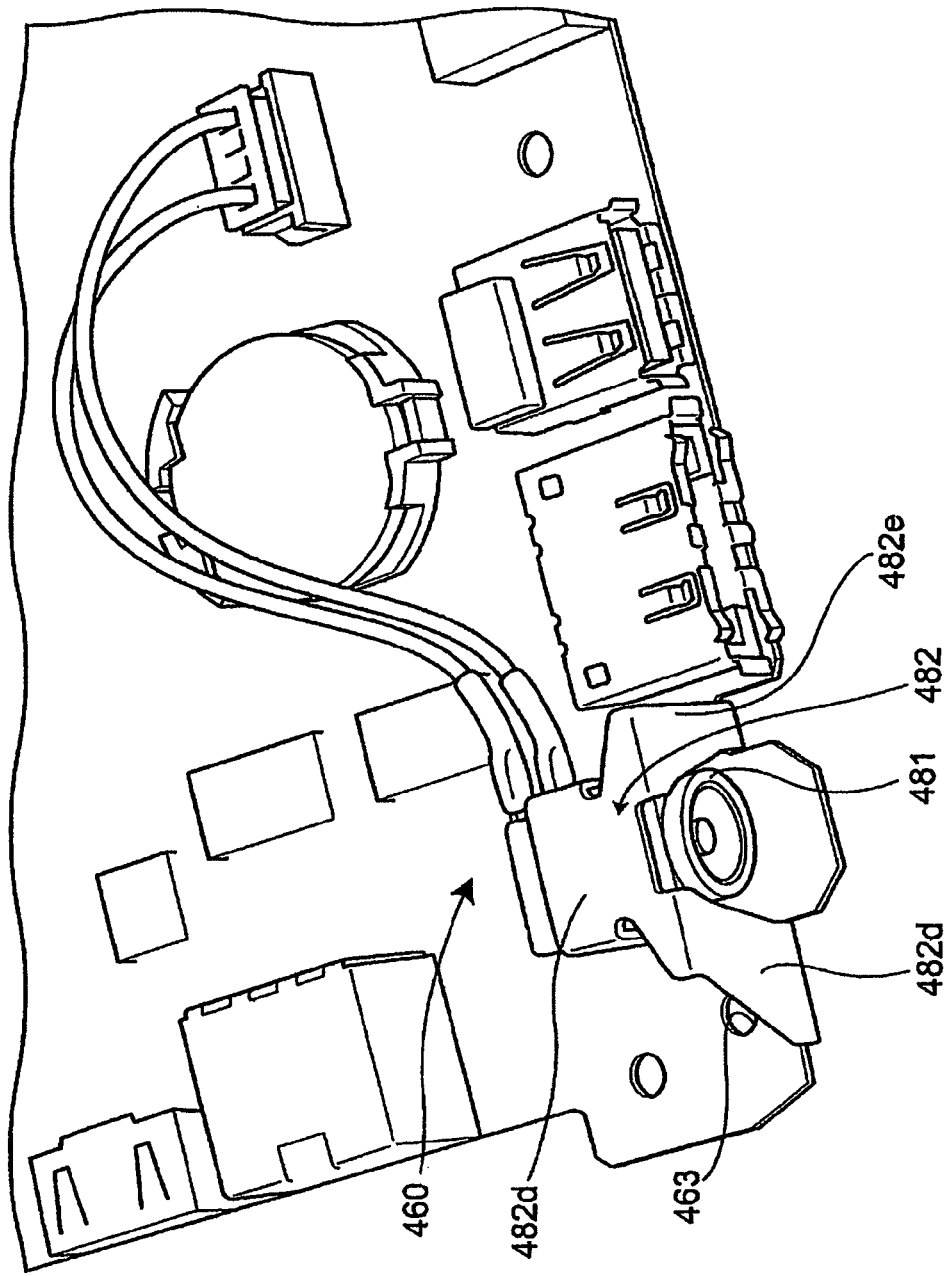
FIG. 38 is an enlarged perspective view of a connector for a power source on a side illustrated in FIG. 37 of the main circuit board.
Figure 39:
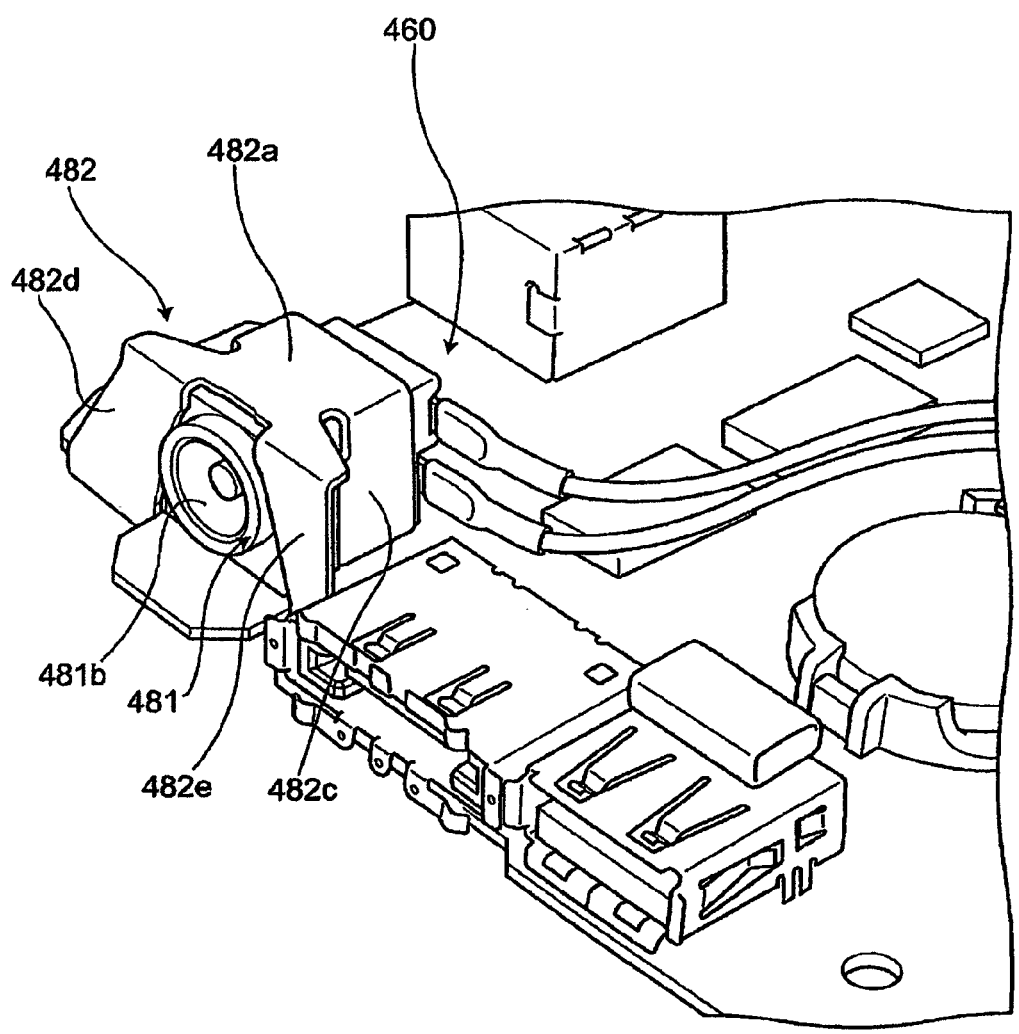
FIG. 39 is an enlarged perspective view of the power connector for the power source on the side illustrated in FIG. 37 of the main circuit board viewed from a different angle.
Figure 40:
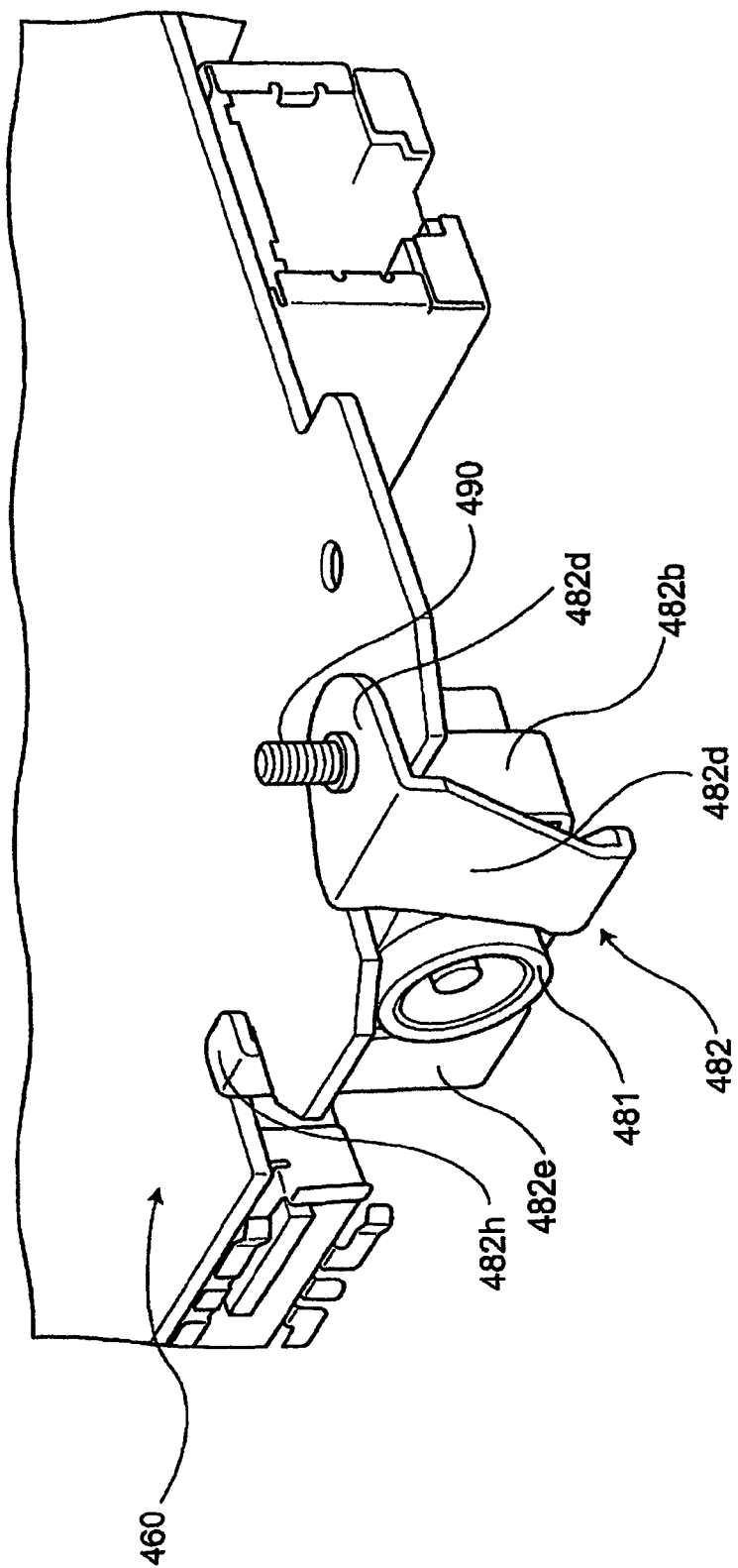
FIG. 40 is an enlarged perspective view of the power connector on a side opposite to the side illustrated in FIG. 37 of the main circuit board.
Figure 41:
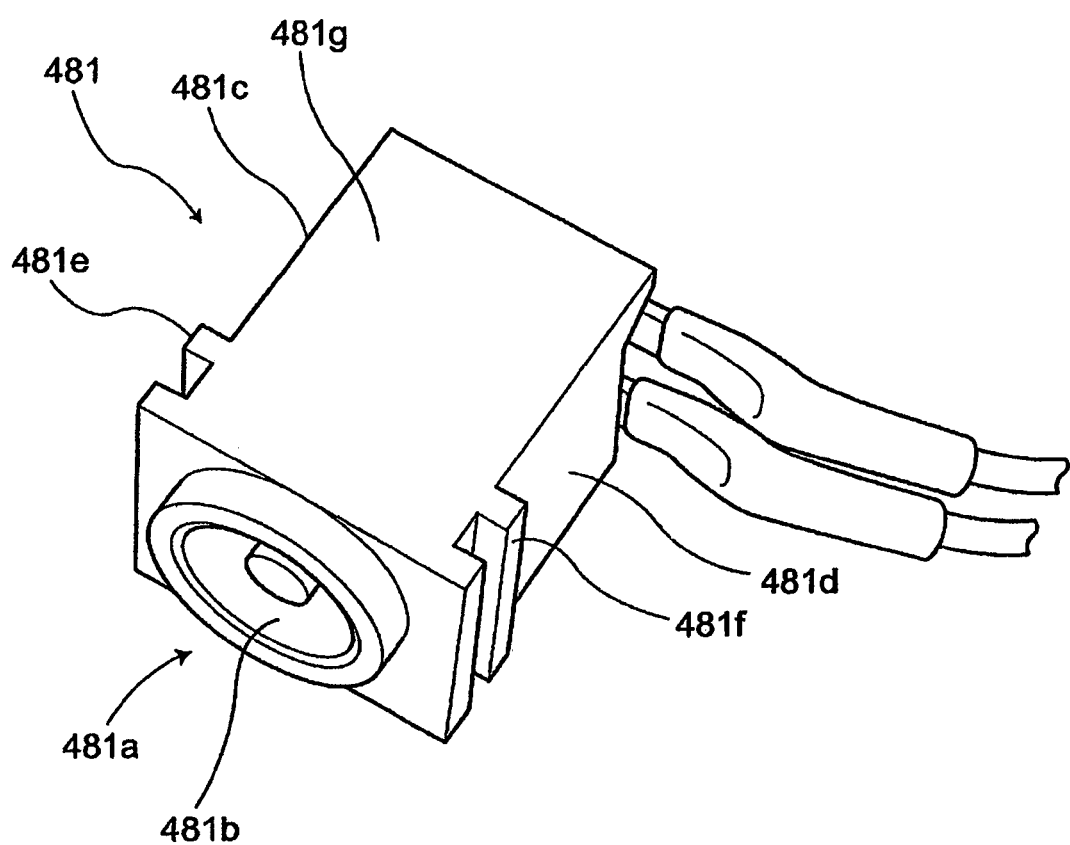
FIG. 41 is a perspective view of the power connector alone.
Figure 42:
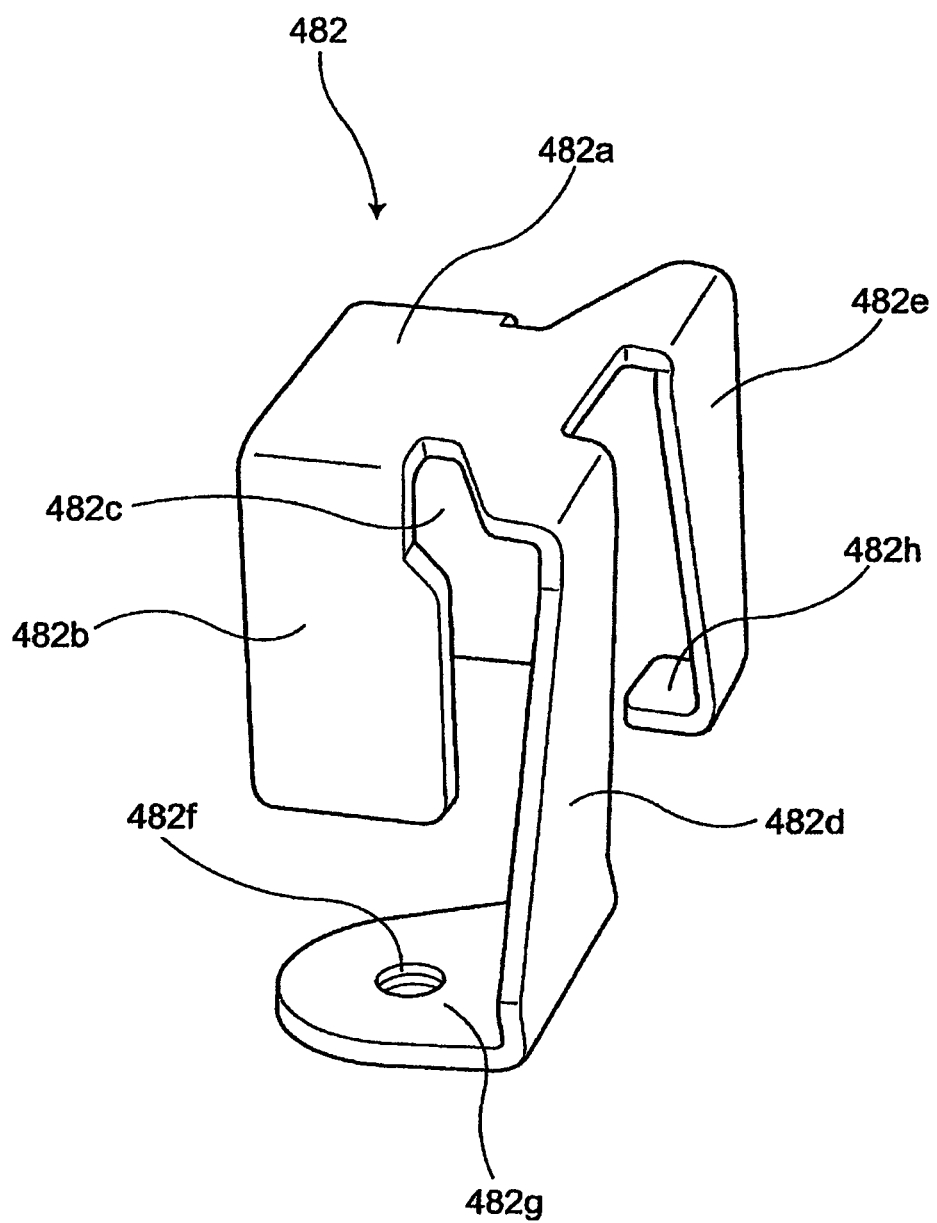
FIG. 42 is a perspective view of the supporter.
Figure 43:
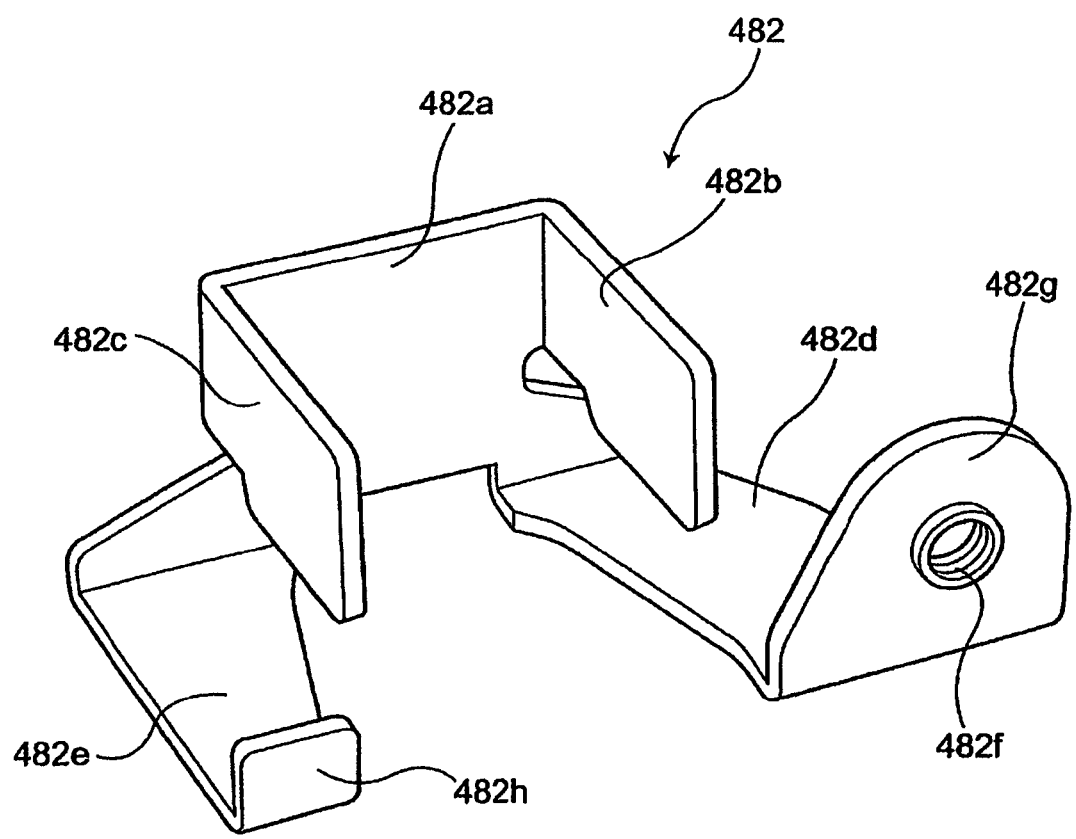
FIG. 43 is a perspective view of the supporter viewed from a different angle.
Figure 44:
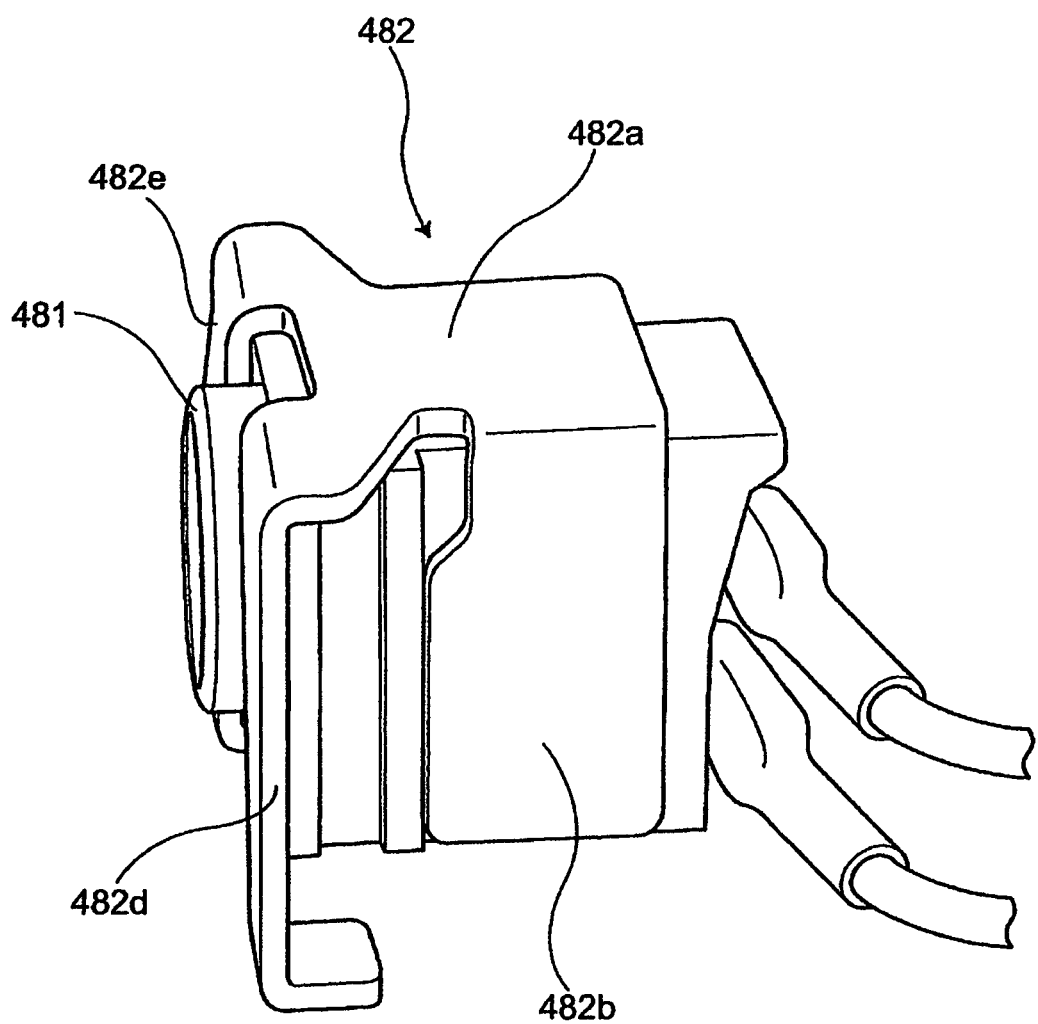
FIG. 44 is a perspective view of an assembly of the power connector and the supporter.

FIG. 38 and FIG. 39 are enlarged perspective views of the power connector for the power source on the side illustrated in FIG. 37 of the main circuit board 460 viewed from different angles. Referring to FIG. 38, a screw 490 (see FIG. 40) for fixing the supporter 482 to the main circuit board 460 is removed and a hole 463 through which the screw 490 penetrates and which is formed in the main circuit board 460 is illustrated. FIG. 40 is an enlarged perspective view of the power connector 481 on a side opposite to the side illustrated in FIG. 37 of the main circuit board 460, i.e. the side illustrated in FIG. 36. FIG. 41 is a perspective view of the power connector 481. FIG. 42 and FIG. 43 are perspective views of the supporter 482 viewed from different angles. FIG. 44 is a perspective view of an assembly of the power connector 481 and the supporter 482.

The power connector 481 is located immediately inside the power connector hole 211 on the right side surface of the computing unit 20 illustrated in FIG. 3, and is connected to the connector of an AC adapter (not illustrated) inserted through the power connector hole 211.

Hereinafter, the side face of the main circuit board 460 on which the power connector 481 is provided (the face illustrated in FIG. 37 to FIG. 39) is referred to as "a first face", and the side surface opposite thereto is referred to as "a second face".

Referring to FIG. 41, the power connector 481 has an opening 481b on a front face 481a. Protrusions 481e and 481f are formed on the left and right side faces 481c and 481d in the vertical direction. Meanwhile, as illustrated in FIG. 42 and FIG. 43, the supporter 482 includes a base portion 482a in contact with an upper face 481g (see FIG. 41) of the connector 481 and bent portions 482b and 482c which are bent from the base portion 482a and contact the side faces 481c and 481d of the connector 481. The supporter 482 further includes pushing portions 482d and 482e which are formed at positions sandwitching the opening 481b of the connector 481 in the right and left directions and clamp the right and left edges of the front face 481a of the connector 481. The supporter 482 includes a fixing portion 482g which is bent on a side of the second face of the main circuit board 460 from a tip of the left pushing portion 482d and has a screw hole 482f. Further, the supporter 482 includes a hook portion 482h which is bent to the second face side of the main circuit board 460 from the tip of the right pushing portion 482e and is engaged with the main circuit board 460.

As illustrated in FIG. 44, the supporter 482 supports the connector 481 by clamping the front face 481a (see FIG. 41) and the protrusions 481e and 481f in the vertical directions with the left and right pushing portions 482d and 482e and the left and right bent portions 482b and 482c.

Referring to FIG. 38 and FIG. 39, the supporter 482 supports the connector 481 after the connector 481 is placed at a predetermined position on the first face of the main circuit board 460. While the supporter 482 is supported, the fixing portion 482g and the hook portion 482h of the supporter 482 reach the second face of the main circuit board 460 from the left and right sides of the connector 481 and fix the supporter 482 to the first face of the main circuit board 460. The main circuit board 460 has a hole 463 (see FIG. 38) which overlaps the screw hole 482f formed in the fixing portion 482g of the supporter 482. Referring to FIG. 40, the supporter 482 is fixed to the main circuit board 460 by one screw 490 passing through the hole 463 of the main circuit board 460 and the screw hole 482f of the supporter 482 from the first face side of the main circuit board 460.

For example, processed sheet metal may be additionally prepared and the main circuit board 460 may be clamped by the processed sheet metal and a supporter, or the supporter may be screwed to a part or component positioned immediately adjacent to the supporter.

In comparison with the example, the supporter 482 is screwed to the main circuit board 460 without another part or another component. In the Embodiment, the supporter 482 is fixed without introducing an increment of the number of the parts and components and restrictions in laying out the parts and components.

(Cooling Ventilation Route Structure)

The heat dissipating module 470 on the main circuit board 460 illustrated in FIG. 37 is described next.

Figure 45:
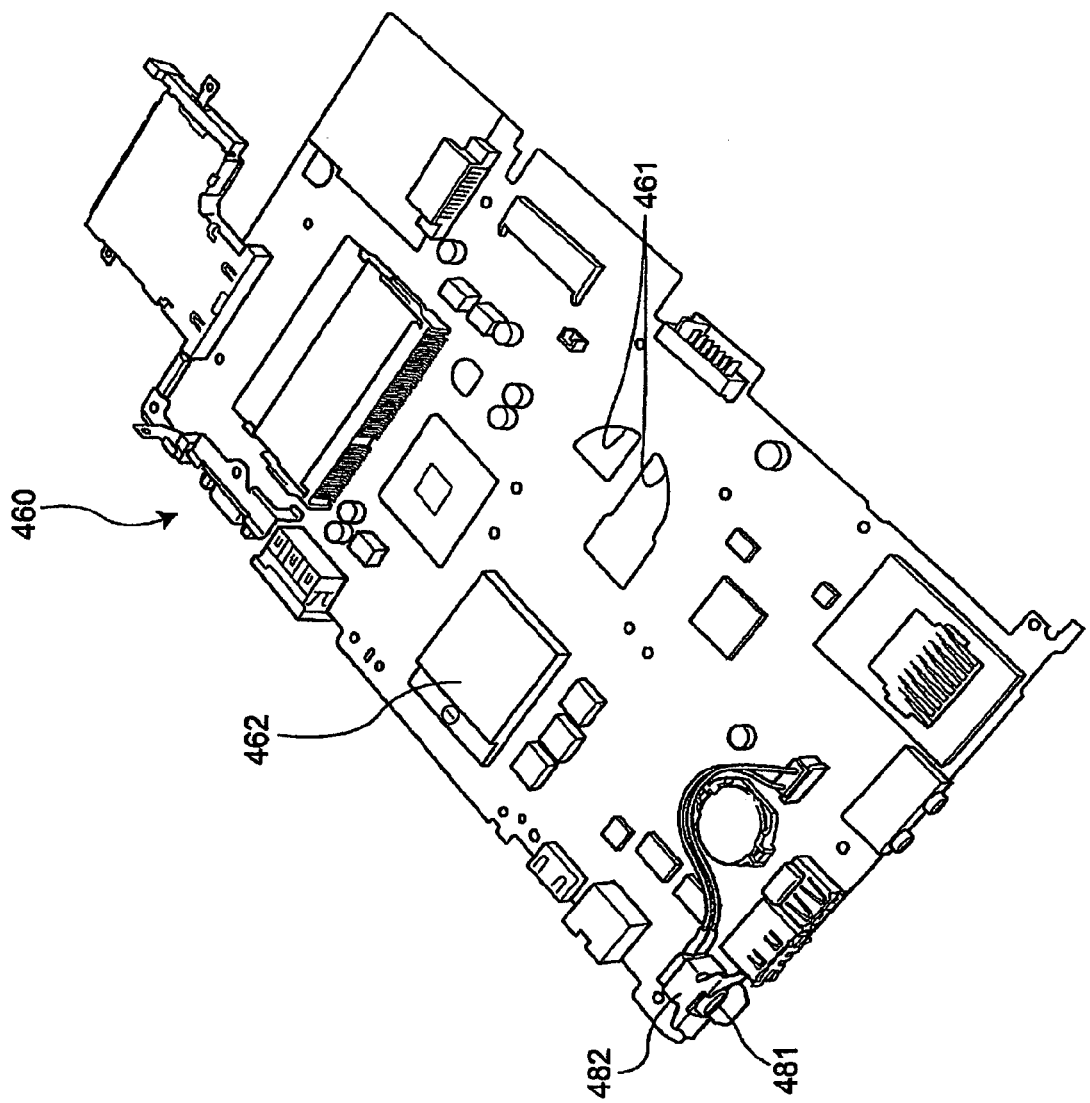
FIG. 45 is a perspective view of the first surface of the main circuit board from which a heat dissipating module is removed.

FIG. 45 is a perspective view of the first surface of the main circuit board illustrated in FIG. 37 from which a heat dissipating module is removed.

Figure 46:
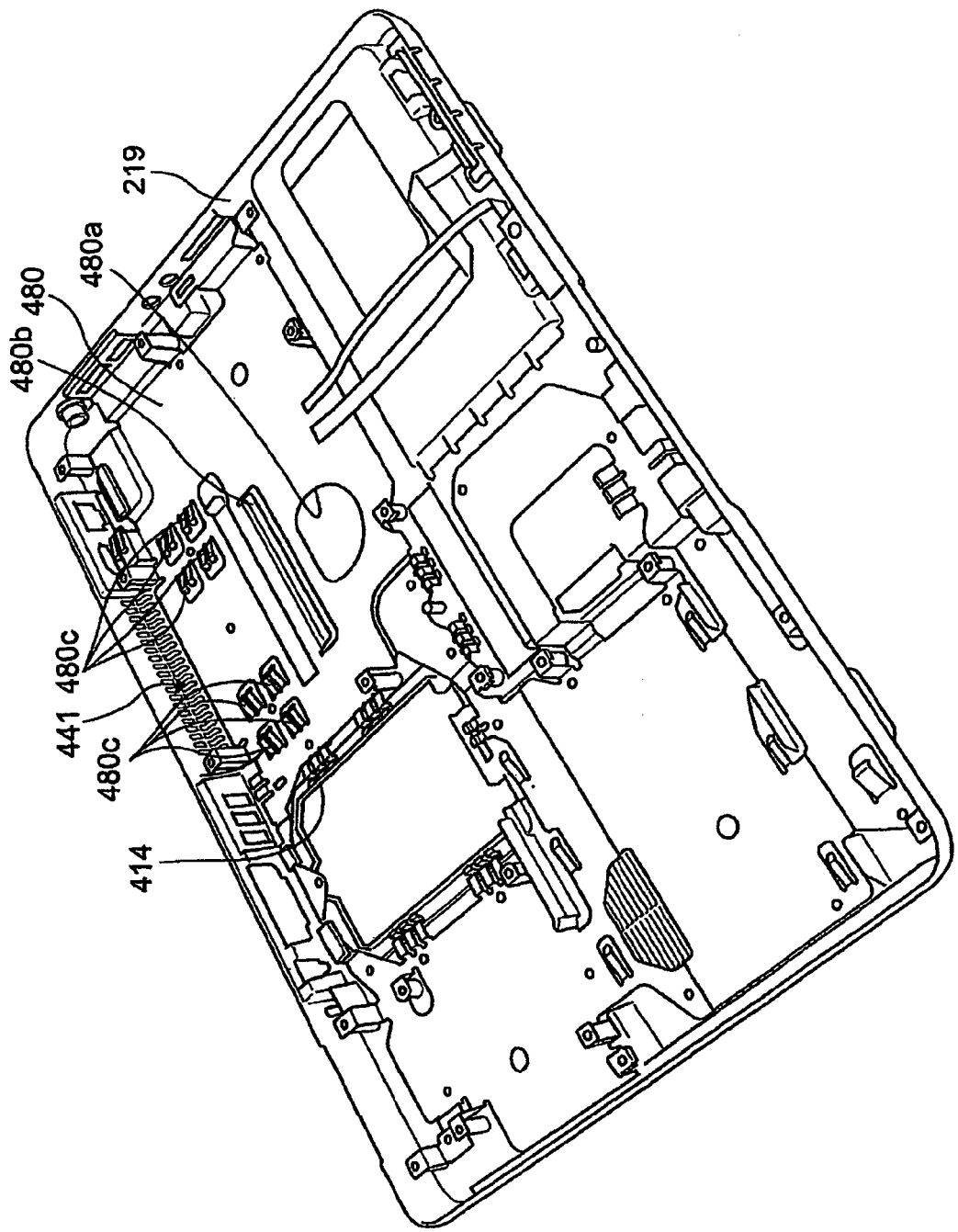
FIG. 46 is a perspective view of an inside of a bottom surface cover after the main circuit board is removed.

Referring to FIG. 45, the opening 461 for taking air on the first face side (see FIG. 37 and a face opposite to the first face illustrated in FIG. 45) into the fan 471 (see FIG. 37 and FIG. 47) is formed in the main circuit board 460. The heat dissipating fin 472 is in closely contact with the CPU module 462. The CPU module 462 generates heat when it is activated. Therefore, a heat generating electronic component such as the CPU module 462 is forcibly cooled by the heat dissipating module 470. FIG. 46 is a perspective view of an inside of the bottom surface cover 219 after the main circuit board 460 is removed.

The bottom surface cover 219 forms a part of the casing 21 (see FIG. 2) of the computing unit 20 and covers the bottom face side of the computing unit 20. The bottom surface cover 219 has an air vent 441 (see FIG. 6 and FIG. 46) for blowing air which is blown by the fan 471 (see FIG. 37 and FIG. 47) and passes through the heat dissipating fin 472. Referring to FIG. 10 and FIG. 46, the opening 414 of the HDD unit housing in which the HDD unit 430 is arranged is formed in the bottom surface cover 219. A shield plate 480 extends on the inside of the bottom surface cover 219. The shield plate 480 prevents electronic parts on the main circuit board 460 from being easily affected by electromagnetic noise and prevents electromagnetic noise generated by the main circuit board 460 from easily leaking to the outside.

An opening 480a is formed at a position facing the fan 471 (see FIG. 45) in the shield plate 480, and the bottom surface cover 219 is exposed. The opening 480a is provided to introduce more air with the fan 471 by opening a front face of an air intake port of the fan 471 as much as possible.

A piece 480b is cut and raised from the shield plate 480 in the vicinity of the opening 480a of the shield plate 480. Plural pieces 480c are cut and raised at positions closer to the air vent 441 than the piece 480b of the shield plate 480. The pieces 480c are provided to contact the heat dissipating fin 472 and the base body 473 (see FIG. 47) which form the heat dissipating module 470 and ground the heat dissipating fin 472 and the base body 473.

The main circuit board 460 illustrated in FIG. 45 is arranged on the back surface cover 219 while the heat dissipating module is mounted as illustrated in FIG. 37, the first face illustrated in FIG. 45 is directed to the shield plate 480 interposing a gap between the shield plate 480 and the main circuit board 460.

Figure 47:
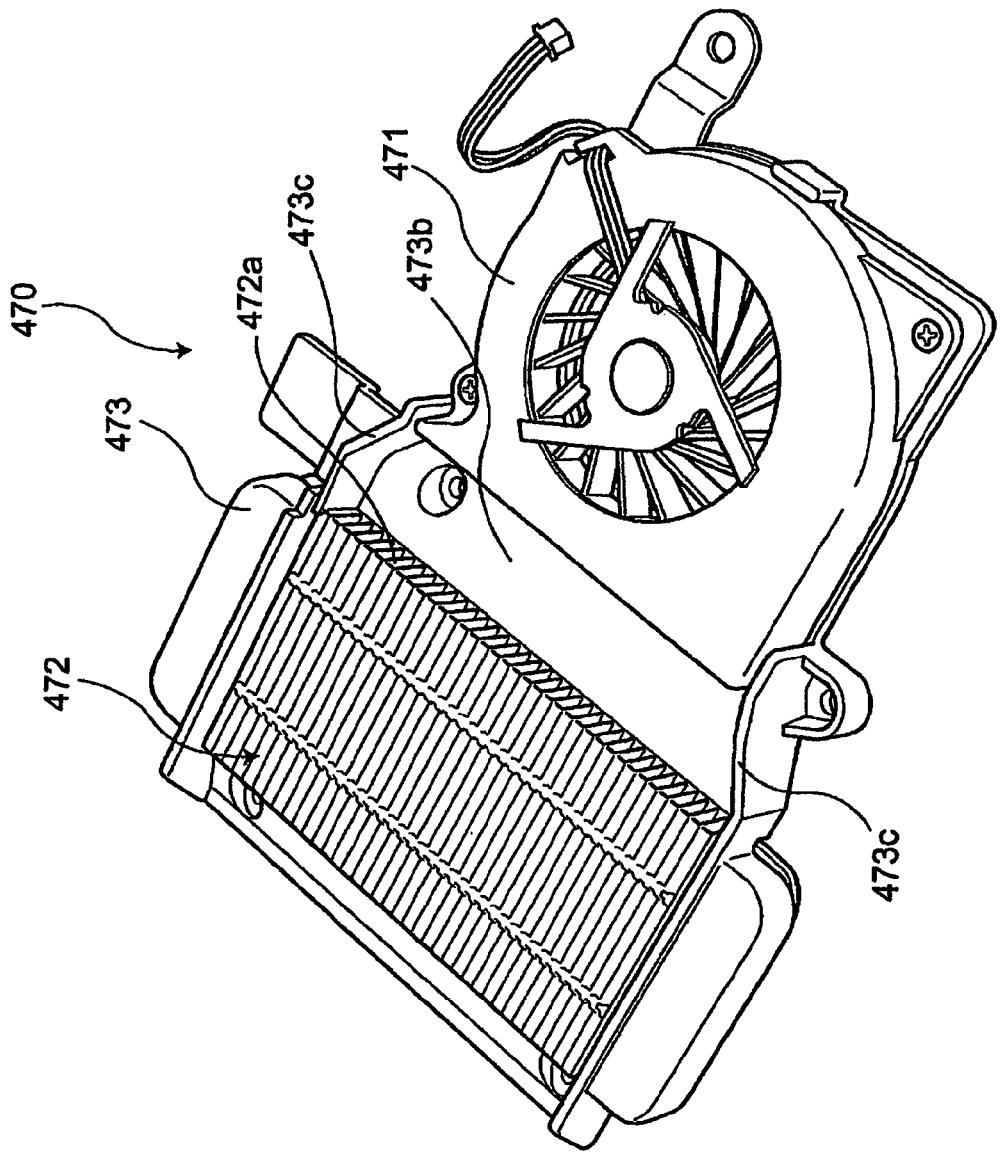
FIG. 47 is a perspective view of the heat dissipating module.

FIG. 47 is a perspective view of the heat dissipating module. FIG. 47 illustrates a face on a side facing the shield plate 480 illustrated in FIG. 46.

Figure 48:
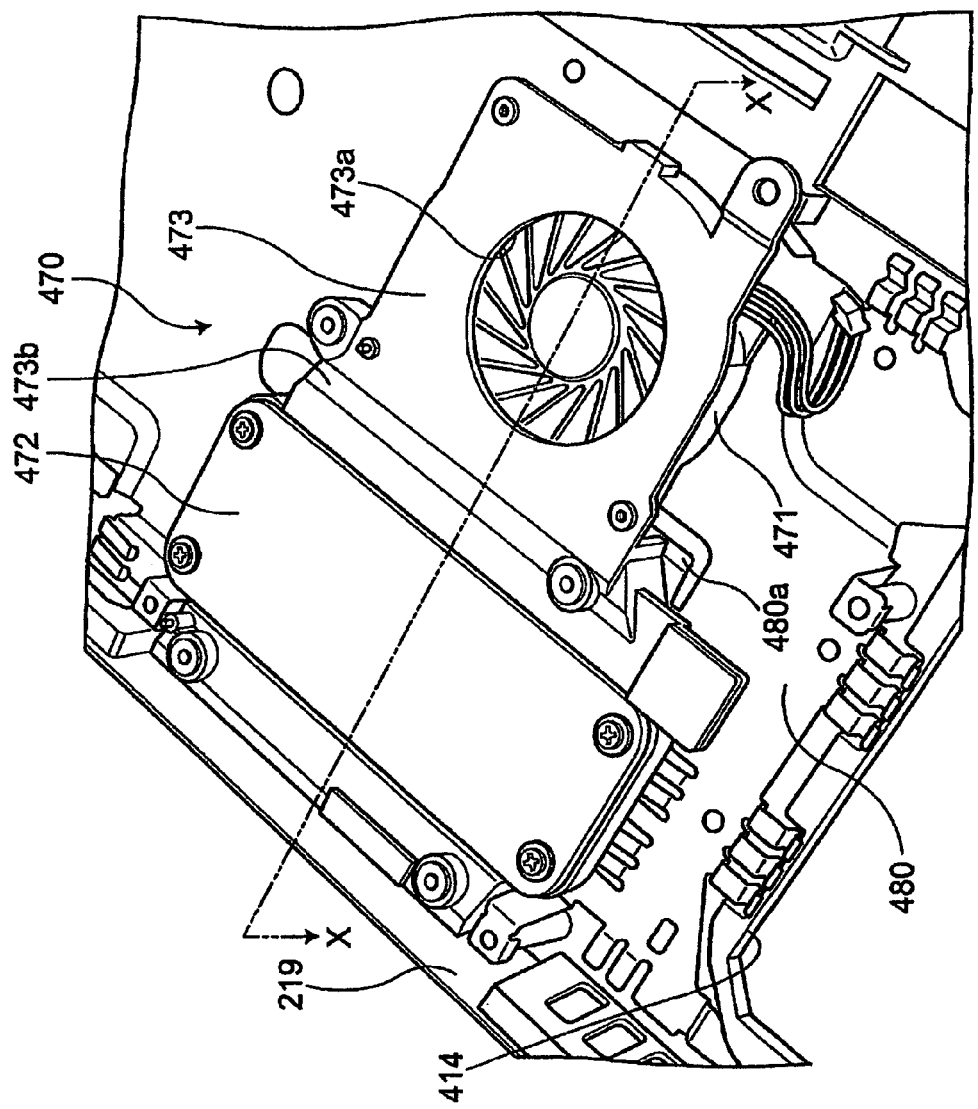
FIG. 48 is a perspective view of the heat dissipating module which is placed at a predetermined position while the heat dissipating module is removed from the main circuit board.

FIG. 48 is a perspective view of the heat dissipating module which is placed at a predetermined position while the heat dissipating module is removed from the main circuit board.

The heat dissipating module 470 includes the fan 471, the heat dissipating fin 472, and the base body 473 for supporting the fan 471 and the heat dissipating fin 472 as described above. The base body 473 is a heavy and thick metallic member manufactured by die-casting. An opening 473a is formed in a part supporting the fan 471 so as to introduce air into the fan 471. Air is suctioned from the second face side (i.e., the opposite side to the first face side illustrated in FIG. 45) of the main circuit board 460 through the opening 461 (see FIG. 45) formed in the main circuit board 460 and the opening 473a formed in the base body 473. The fan 471 is supported by the main circuit board 460 interposing a gap between the fan 471 and the shield plate 480 (see FIG. 46). Air is suctioned from the side of the shield plate 480 from the fan 471. The fan 471 blows air suctioned from the upper and lower openings 460 and 480a to the heat dissipating fin 472. The heat dissipating fin 472 is biased by a spring (not illustrated) in a direction toward the CPU module 462 mounted on the main circuit board 462 (in a direction separating from the shield plate 480) so that the heat dissipating fin 472 is in contact with the CPU module 462 mounted on the first face of the main circuit board 462. The biased heat dissipating fin 472 with the spring absorbs heat from the CPU module 462 in close contact with the heat dissipating fin. The heat dissipating fin 472 in close contact with the CPU module 462 is pushed by the CPU module 462 and is moved to a position where an air intake 472a receives air sent by the fan 471. The pieces 480b and 480c contact the moved heat dissipating fin 472 and the base body 473 to thereby ground the heat dissipating fin 472 and the base body 473. The fan 471 suctions air from both faces of the fan 471 in the computing unit 20. For this, a positional relationship is such that the heat dissipating fin 472 closely contacts the CPU module 462 on the main circuit board 460. On the other hand, the computing unit 20 is formed as thin as possible. When the fan 471 and the heat dissipating fin 472 are arranged at positions satisfying the postitional relationship described above, the heat dissipating fin 472 is arranged at positions shifted more to the bottom face side (i.e., the side of the shield plate 480) than the fan 471 in the thickness direction of the computing unit 20. Therefore, the base body 473 of the heat dissipating module 470 has a slope 473b between the fan 471 and the heat dissipating fin 472. The slope 473b makes the air sent from the fan 471 smoothly flow toward the air intake 472a. A pair of walls 473c is formed on both sides of the base body 473 substantially along the fan 471, the slope 473c and the heat dissipating fin 472 to prevent the sent air from leaking in transverse directions of the air flow. Referring to FIG. 48, the heat dissipating module 470 is mounted on the main circuit board 460 and further positioned so that the air send by the fan 471 and passing through the heat dissipating fin 472 is outwardly discharged from the air vent 441 (see FIG. 6 and FIG. 46).

Figure 49:
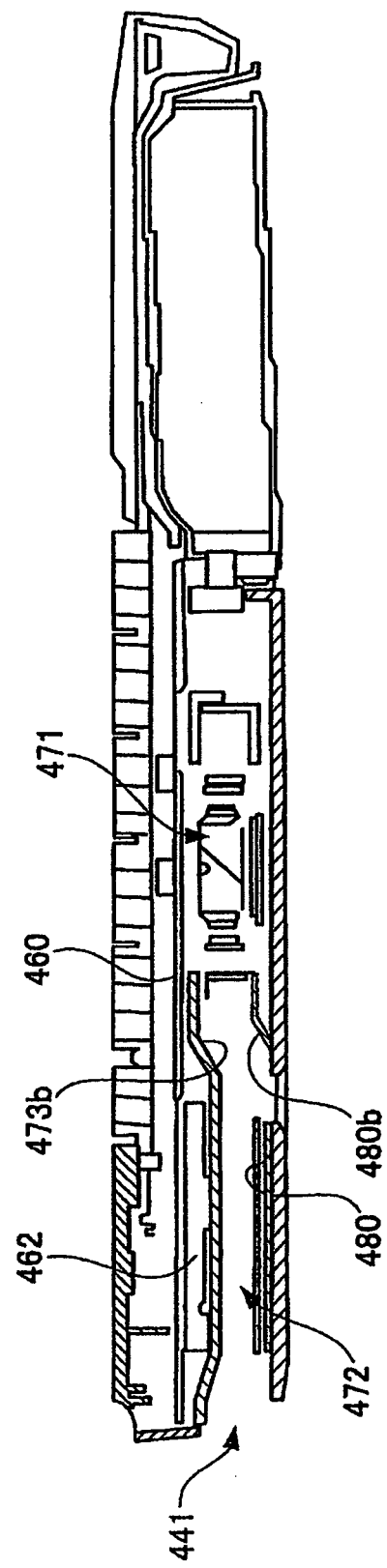
FIG. 49 is a cross-sectional view taken along a line X-X of FIG. 48.

FIG. 49 is a cross-sectional view taken along a line X-X of FIG. 48.

Referring to FIG. 47, the base body 473 of the heat dissipating module 470 has the slope 473b and the pair of walls 473c as described above in the air flow path between the fan 471 and the heat dissipating fin 472. However, efficiency may be lowered by leakage of the air sent from the fan 471. Therefore, the piece 480b (see FIG. 46 and FIG. 48) is formed in the shield plate 480. The piece 480b seals the air flow path between the fan 471 and the heat dissipating fin 472 and obliquely introduces the air flowing along the slope 473b. Said differently, the slope 473b of the base body 473, the pair of walls 473c, and the piece 480b of the shield plate 480 form a duct structure connecting the fan 471 and the heat dissipating fin 472. As described, the duct structure is realized by forming the piece 480b in the shield plate 480 without adding another member. Thus, the efficiency of the heat dissipation can be improved.

(Hook Structure in the Display Unit)

Figure 50:
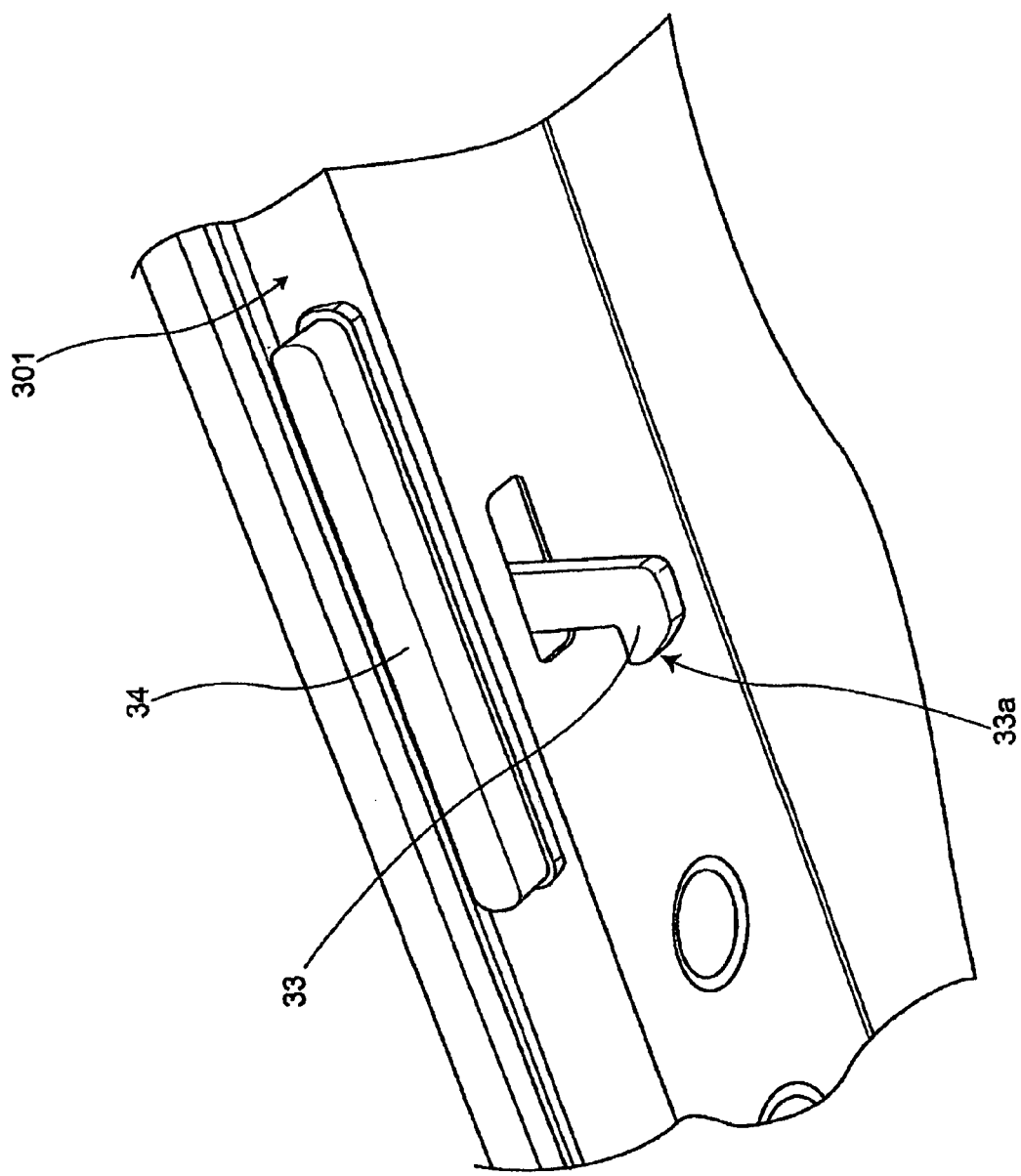
FIG. 50 illustrates an unhook button protruding from an upper surface of the display unit (a front end surface)
Figure 51:
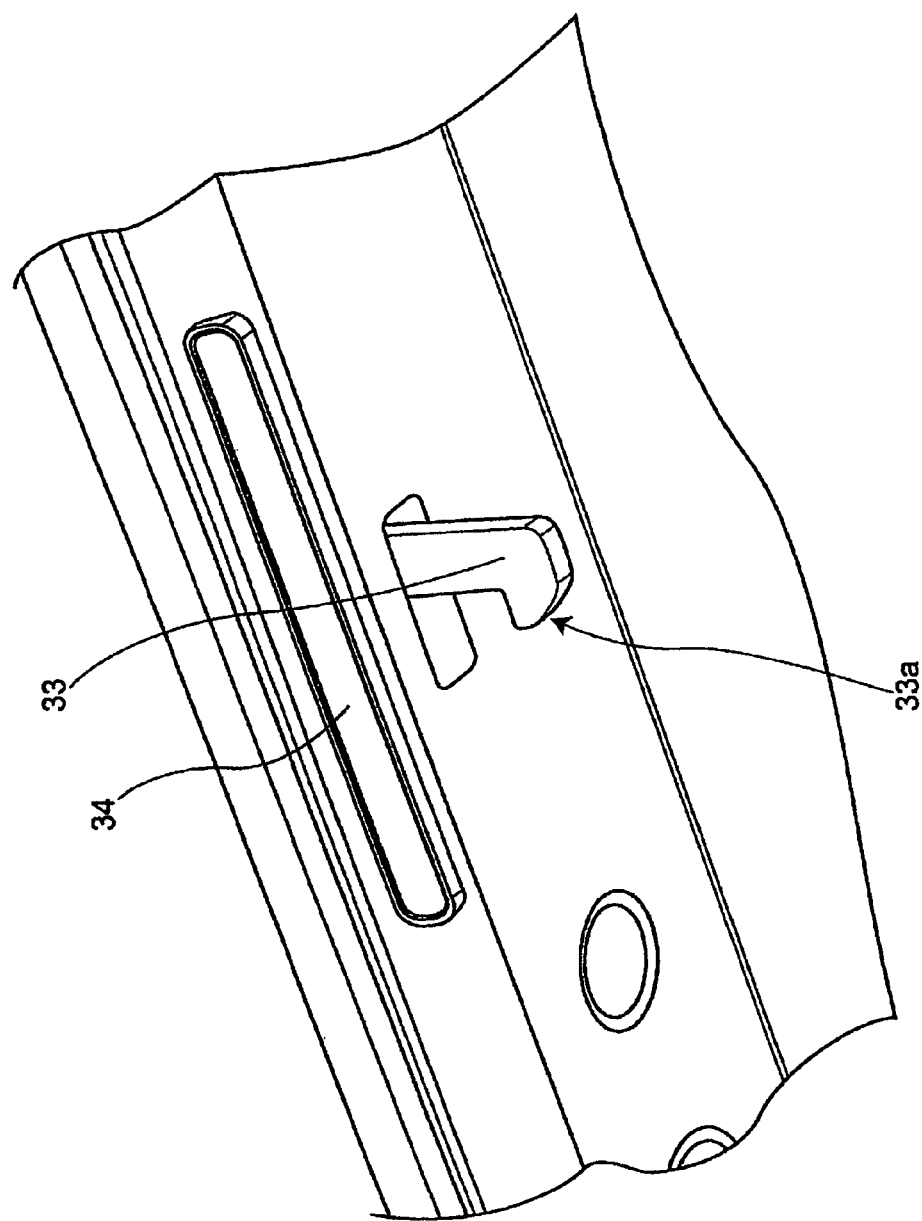
FIG. 51 illustrates the pushed unhook button.

For example, a hook structure illustrated in FIG. 2 is described. The hook structure includes a hook 33 provided in an upper portion of the display unit 30, and an unhook button 34 protruding from the upper surface 301 of the display unit 30 in the opened state (i.e., the front end surface of the display unit 30 in the closed state). The hook 33 is an engaging protrusion for locking the display unit 30 in the slosed state by entering into a locking aperture 29 provided in the upper surface of the computing unit 20 when the display unit 30 is close by folding it down on the computing unit 20. The unhook button 34 causes the hook 33 to be moved at an unhook position by pressing the unhook button 34 thereby releasing the engagement of the hook 33 with the locking aperture 29. FIG. 50 and FIG. 51 are enlarged perspective views of the hook 33 and the unhook button 34 provided in the display unit 30. Ref erring to FIG. 50, the unhook button 34 protrudes from the upper face 301 of the display unit 30 in the opened state (the front end surface 301 in the closed state). Referring to FIG. 51, the unhook button 34 is pressed. Referring to FIG. 50, if the display unit 30 is close by being folded down on the computing unit 20 while the unhook button 34 protrudes from the upper surface (the front end surface), the hook 33 is inserted into the locking aperture 29 of the computing unit 20. The hook 33 laterally moves with a contact between the locking aperture and the slope 33a of the hook 33. Thereafter, the hook 33 returns to the position illustrated in FIG. 50. Thus, the hook 33 is engaged with locking aperture 29. When the unhook button 34 is pushed as illustrated in FIG. 51, the hook 33 laterally moves. Then, if the display unit is in the closed state, the engagement between the hook 33 and the locking aperture 29 is released to enable the display unit 30 being lifted so as to be in the opened state.

Figure 52:
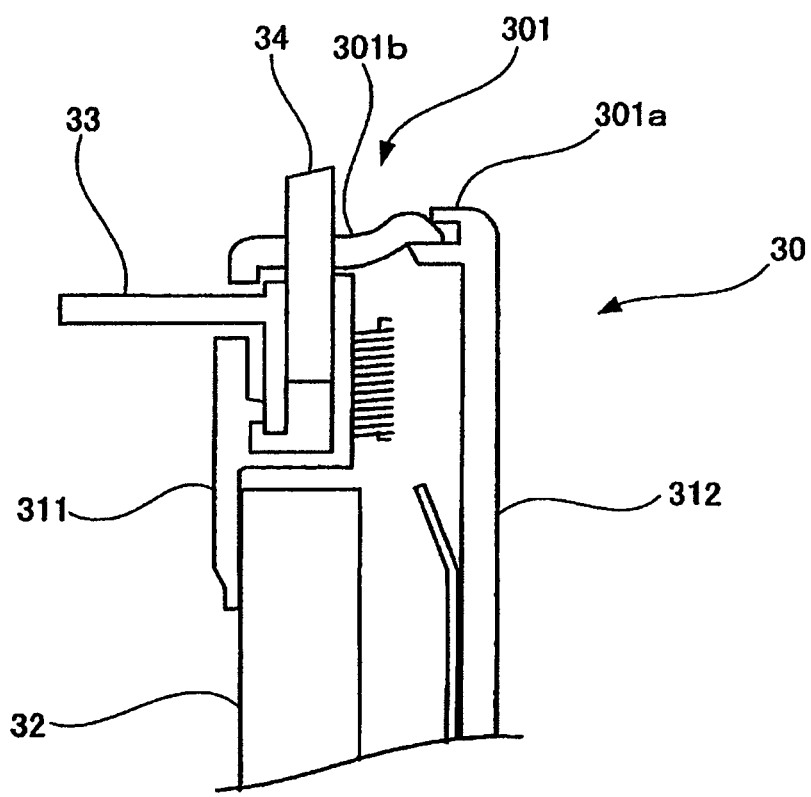
FIG. 52 is a cross-sectional view of the hook and the unhook button.

FIG. 52 is a cross-sectional view of a part of the hook 33 and the unhook button 34 of the display unit 30. The upper face 301 of the display unit 30 in the opened state includes the horizontal first face 301a from the back surface toward the front surface and a descending slope 301b is formed after the first face 301a. The first face 301a may be formed like an ascending slope from the back surface of the back surface cover to the front surface of the back surface cover. The second face 301b may be a curved face becoming gradually steep on the side of the first face 301a.

The casing 31 of the display unit 30 includes the front surface cover 311 covering a periphery of the display screen 32 (see FIG. 2) and the back face cover covering the back face of the display unit 30 (see FIG. 1). The second face 301b of the upper surface 301 in the opened state is formed on the front face cover 311. The unhook button 34 protrudes from the front surface cover 311. If the display unit 30 in the closed state is opened to be in the opened state, the unhook button 34 is pressed and simultaneously a finger is hung on the second face 301b to lift the front end surface 301 (the upper face in the opened state) of the display unit 30. Thus, the operability is good. The second face (the slope) 301b may be provided only in the periphery of the unhook button 34. However, if the second faces are provided on both sides of the front end surface (the upper surface in the opened state), the display unit 30 looks thin and therefore it is advantageous in designing the notebook PC.

Figure 53:
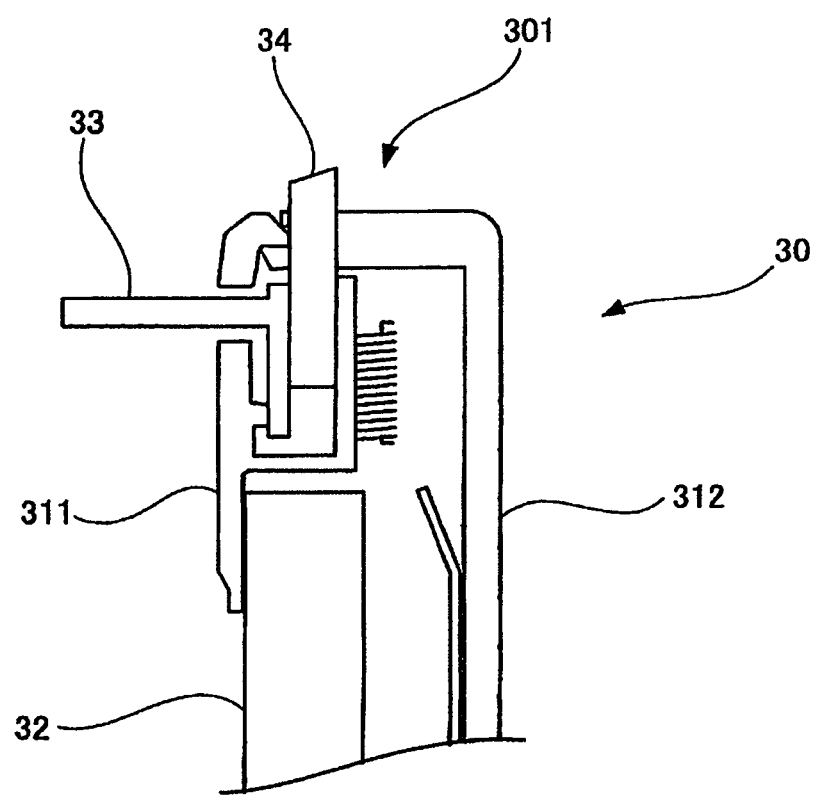
FIG. 53 illustrates a comparative example of FIG. 52.

FIG. 53 illustrates a comparative example of FIG. 52.

In the comparative example illustrated in FIG. 53, the unhook button 34 protrudes from the side of the back surface cover 312 on the upper surface (the front end surface) 301. In this case, the second face (the slope) 301b illustrated in FIG. 52 may not be formed or only a small second face extending in the thickness direction may be formed. Therefore, even if the unhook button 34 is pushed the finger does not sufficiently hang on the display unit 30. Therefore, it is difficult to lift the display unit 30 into the opened state. Thus, in the comparative example illustrated in FIG. 53, the operability is insufficient. Further, the display unit 30 does not look thin. Therefore, it is disadvantageous in designing the notebook PC.

Figure 54:
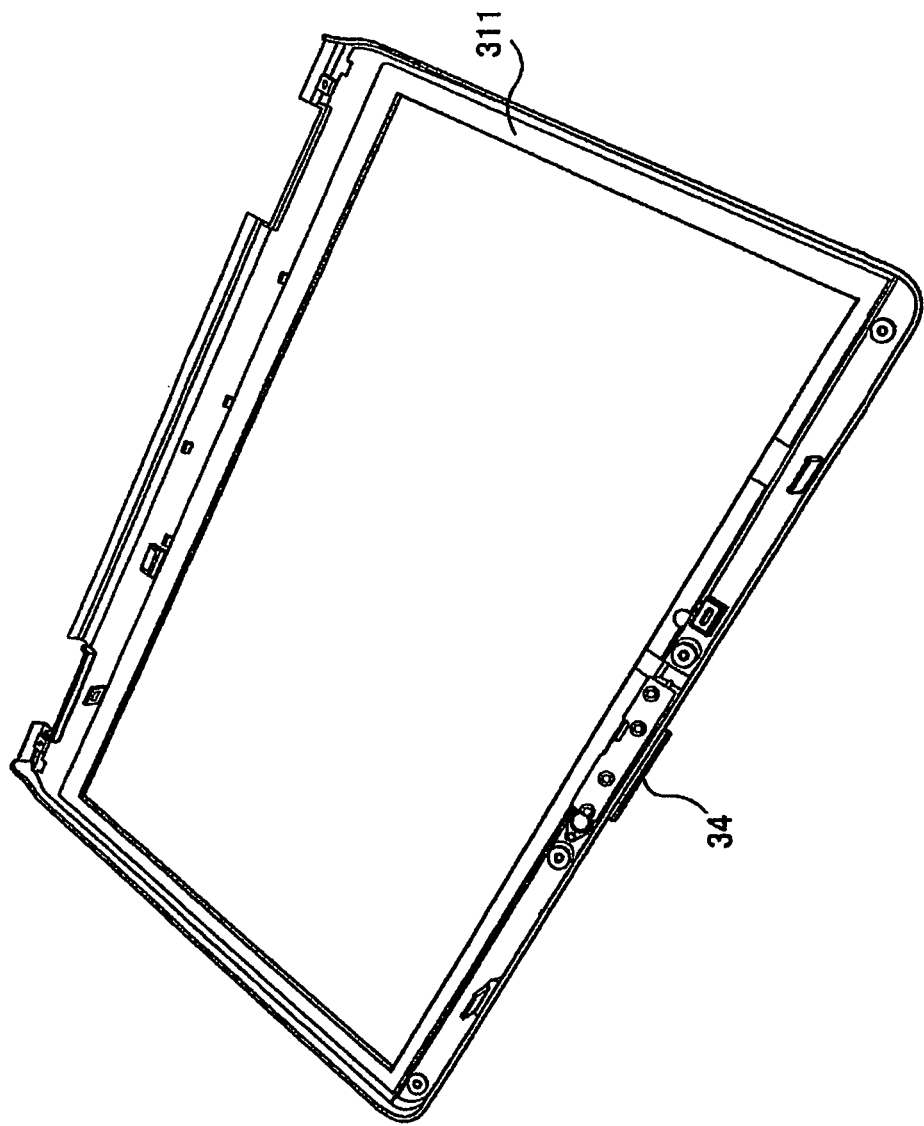
FIG. 54 is a perspective view of an inner face of the front cover of the display unit.
Figure 55:
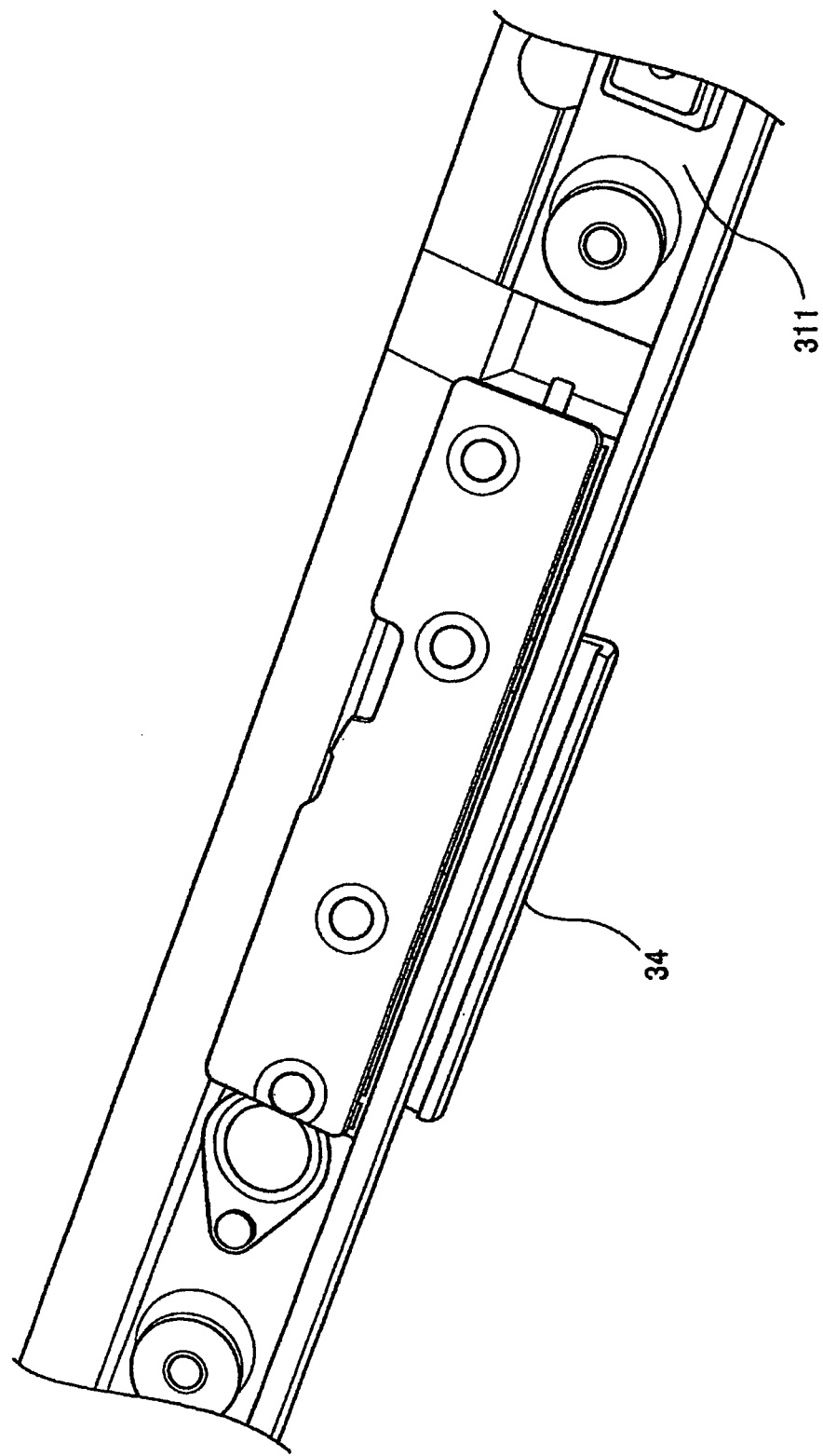
FIG. 55 is an enlarged perspective view of a hook structure including the hook on the inner face of the front cover.

FIG. 54 is a perspective view of an inner face of the front cover of the display unit 30. FIG. 55 is an enlarged perspective view of the hook structure including the hook on the inner face of the front cover.

The hook structure including the hook 33 and the unhook button 34 is assembled in the inner face side of the front surface cover 311 as illustrated in FIG. 55.

Figure 56:
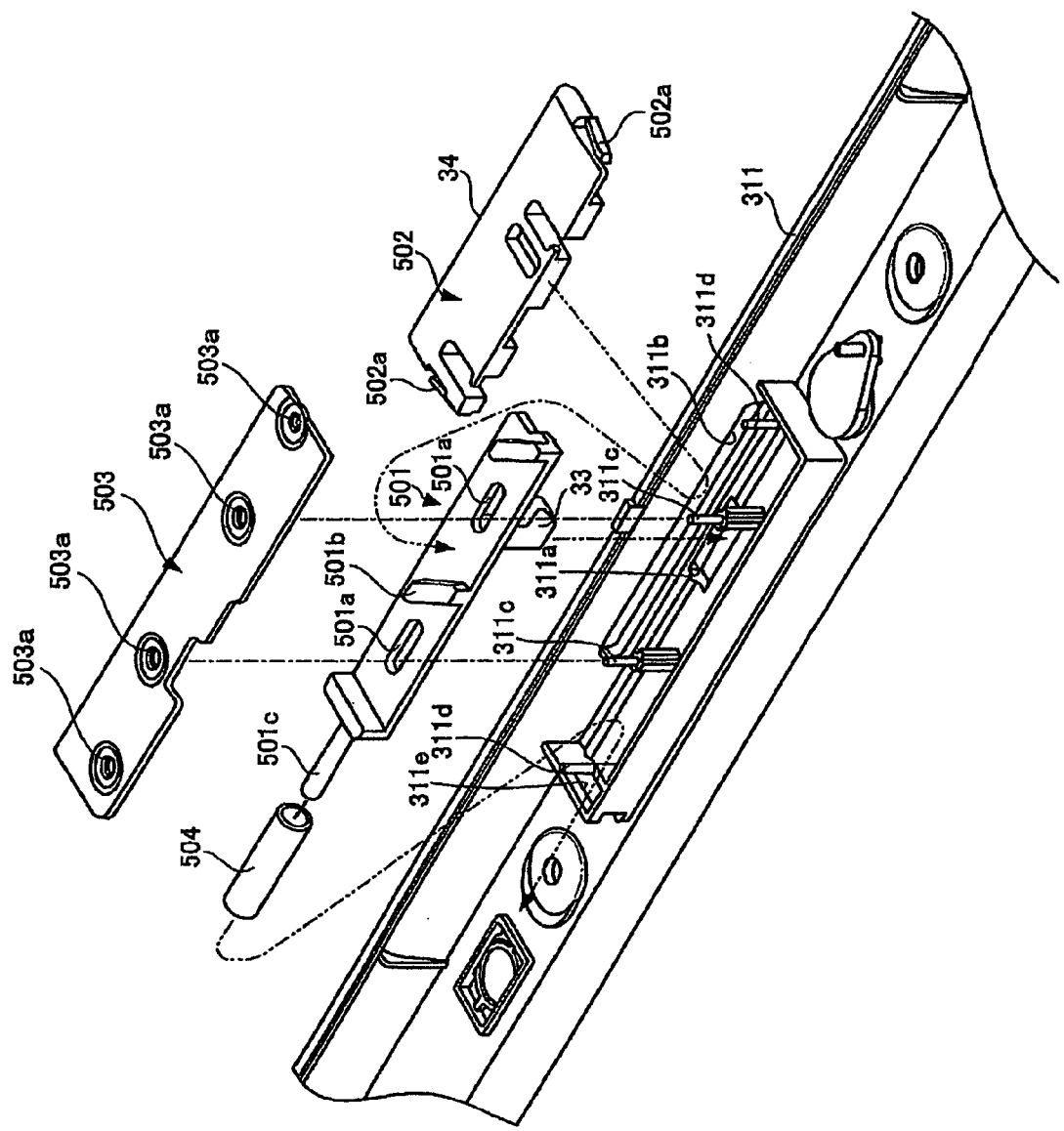
FIG. 56 is an exploded perspective view of the hook structure.

FIG. 56 is an exploded perspective view of the hook structure.

Referring to FIG. 56, the front surface cover 311, a first hook member 501 having the hook 33 to be installed in the front surface cover 311, a second hook member 502 having the unhook button 34, a hook holder 503, and a coil spring 504 are illustrated.

The first hook member 501 protrudes from the opening 311a formed in an upper portion of the front surface of the front surface cover 311 in the opened state. The two elongated holes 501a of the first hook member 501 have inserted respective two pins 311c standing on the front surface cover 311. At this time, the coil spring 504 is provided in an arm 501c laterally extending from a side of the first hook member 501. A tip of the arm 501c protrudes from an opening 311e of the front surface cover 311. The coil spring 504 is interposed between peripheral walls of the opening 311e. The first hook member 501 has two protruding portions 501b obliquely extending on a face overlapping the second hook member 502.

Figure 57A:
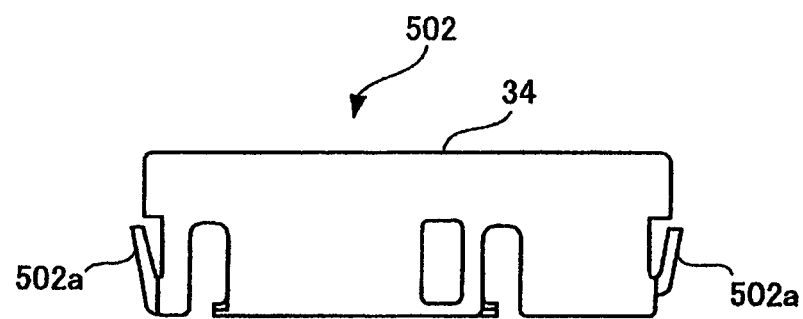
FIG. 57A is plan view of a face on a hook holder side of the second hook member.
Figure 57B:
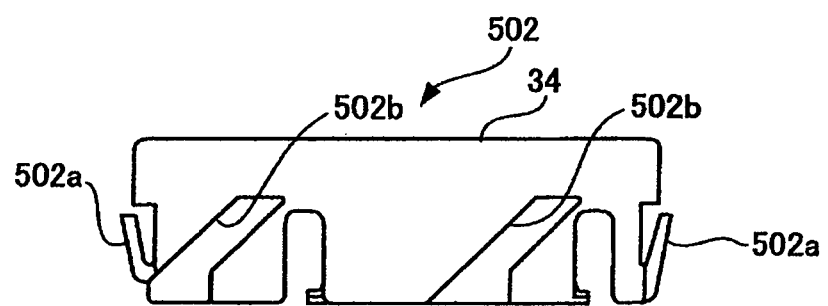
FIG. 57B is a plan view of a face on a first hook member side of the second hook member.

FIG. 57A and FIG. 57B are plan views of a face on a hook holder side of the second hook member 502 in FIG. 57A and a face on a first hook member side of the second hook member 502 in FIG. 57B. FIG. 58A and FIG. 58B are plan views of the face on the hook holder side of the second hook member 502 in FIG. 58A and the face on the first hook member side of the second hook member 502 in FIG. 58A. The second hook member 502 has engaging claws 502a on both sides. Referring to FIG. 56, an opening 3111b is formed on the upper surface of the front surface cover 311 in the opened state. The unhook button 34 protrudes from the opening 311b. The second hook member 502 including the unhook button 34 is inserted in the opening 311b of the front surface cover 311 from the outside. Then, the two engaging claws 502a inwardly deflect once by being pushed by the edges on both sides of the opening 311b. After the engaging claws 502a are inserted so as to pass through the opening 311b, the engaging claws 502a open again. Then, the engaging claws 502a are engaged with an inner face of the front surface cover 311 to thereby prevent the second hook member from being dropped off. By adopting the structure of inserting the second hook member 502 from the outside to the opening 311b, the hook structure can be easily assembled. Two guide grooves 502b are formed on the face of the second hook member 502 on the first hook member side so as to obliquely extend. Guide protrusions 501b obliquely provided on the first hook member 501 are inserted in the guide grooves 502b, respectively. Therefore, if the unhook button 34 is pushed, the second hook member 502 moves to the inside of the front face cover 311, and the oblique guide protrusions 501b of the first hook member 501 are pushed by the oblique guide grooves 502b of the second hook member 502. Then, the first hook member 501 laterally moves against the biasing of the coil spring 504. Then, the hook 33 moves to the unhook position illustrated in FIG. 51. When the finger is moved from the unhook button 34, the first hook member 501 returns to the original position with the biasing force of the coil spring 504. In response to the movement, the second hook member 502 moves in a direction of the protruding unhook button 34.

The front surface cover 311 has the two pins 311c for guiding the movement of the first hook member inside the two elongated holes 501a of the first hook member 501 and two other pins 311d. These four pins 311c and 311d are inserted into the four holes of the hook holder 503 and fixed to the hook holder 503.

With the above described hook structure, the display unit 30 is engaged with the computing unit 20 in the closed state, and the engagement is released by pushing the unhook button 34.

According to the electronic apparatus, by forming the cut and raised pieces on the indispensable shield plate 480, the air blow from the fan is effectively introduced to the heat dissipating fin without adding new parts or components.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An electronic apparatus comprising:
    a casing having an air vent;
    a shield plate extending along an inner face of the casing;
    a circuit board configured to extend along the casing spaced from the shield plate, the circuit board having a heat generating electronic component on a face of the circuit board facing the shield plate; and
    a heat dissipating module that is mounted at a position interposed between the shield plate and the circuit board and air sent from a fan through a heat dissipating fin is discharged from the air vent, the heat dissipating module including
        the heat dissipating fin in contact with the heat generating electronic component;
        the fan configured to send the air to the heat dissipating fin; and
        a base body configured to support the fan and the heat dissipating fin at a position closer to a side of the shield plate than a position of the fan, and have a slope between the fan and the heat dissipating fin for guiding the air sent from the fan to the heat dissipating fin,
    wherein the shield plate includes a cut and raised piece which faces the slope and obliquely guides the air sent from the fan to the heat dissipating fin along the slope.

2. The electronic apparatus according to claim 1, wherein the base body includes a pair of walls standing on both sides of the slope for preventing a side leakage of the air sent from the fan and flowing along the slope, and the cut and raised piece forms a duct in association with the slope and the pair of the walls.

3. The electronic apparatus according to claim 1, wherein the heat dissipating fin is biased by a spring toward the base body, and the heat dissipating fin is pushed by the heat generating electronic component to be moved at a position of receiving the air flown along the slope.

4. The electronic apparatus according to claim 1, wherein the electronic apparatus includes a computing unit having a keyboard on an upper surface of the electronic apparatus, and a display unit supported by the computing unit and being capable of rotating from the computing unit,
wherein the casing is a casing of the computing unit.

* * * * *